(12) United States Patent
Jonas et al.

(10) Patent No.: US 8,645,286 B2
(45) Date of Patent: Feb. 4, 2014

(54) CONFIGURABLE CIRCUITRY FOR SOLVING STOCHASTIC PROBLEMS

(75) Inventors: Eric M. Jonas, San Francisco, CA (US); Vikash K. Mansinghka, San Francisco, CA (US)

(73) Assignee: Prior Knowledge, Inc., San Francisco, CA (US)

( * ) Notice: Subject to any disclaimer, the term of this patent is extended or adjusted under 35 U.S.C. 154(b) by 146 days.

(21) Appl. No.: 13/032,054

(22) Filed: Feb. 22, 2011

(65) Prior Publication Data

US 2011/0208676 A1    Aug. 25, 2011

Related U.S. Application Data

(60) Provisional application No. 61/307,015, filed on Feb. 23, 2010.

(51) Int. Cl.
*G06E 3/00* (2006.01)
*G06F 15/00* (2006.01)
*G06G 7/00* (2006.01)
*G06N 99/00* (2010.01)

(52) U.S. Cl.
USPC .......................................................... 706/10

(58) Field of Classification Search
USPC ............................................................ 706/13
See application file for complete search history.

(56) References Cited

U.S. PATENT DOCUMENTS 8,352,384 B2 *    1/2013    Mansinghka et al. ............ 706/1

OTHER PUBLICATIONS

Stochastic Digital Circuits for Probabilistic Inference Vikash K. Mansinghka, Eric M. Jonas, and Joshua B. Tenenbaum.*
Natively Probabilistic Computation by Vikash Kumar Mansinghka.*
Evolutionary Algorithms: Concepts and Applications Andrea G. B. Tettamanzi.*

* cited by examiner

*Primary Examiner* — Kakali Chaki
*Assistant Examiner* — Ababacar Seck
(74) *Attorney, Agent, or Firm* — Blakely, Sokoloff, Taylor & Zafman

(57) ABSTRACT

Techniques described herein may be used to solve a stochastic problem by dividing the stochastic problem into multiple fragments. In some cases, each fragment may be related to a random variable that forms a part of the problem, such that each fragment may produce samples from a probability distribution for that variable. Each fragment of the stochastic problem may then be assigned to a configurable circuit to solve the stochastic fragment. Configurable circuits may be implemented using any suitable combination of hardware and/or software, including using stochastic circuitry. In some embodiments, stochastic circuitry may include a stochastic tile and/or a stochastic memory.

405 Claims, 12 Drawing Sheets

CONFIGURABLE CIRCUITRY FOR SOLVING STOCHASTIC PROBLEMS

RELATED APPLICATIONS

This application claims priority under 35 U.S.C. §119(e) to U.S. Provisional Application Ser. No. 61/307,015, entitled "Configurable circuitry for solving stochastic problems," filed on Feb. 23, 2010, which is herein incorporated by reference in its entirety.

BACKGROUND

Many computational problems can be categorized as either deterministic or stochastic. In general, in a deterministic problem, an "answer" to the problem, or a next state of a solution of the problem, is computable with certainty based on input values and the current state of the problem. In general, in a stochastic problem, the "answer" to the problem, or a next state of a solution of the problem, is uncertain and defined in accordance with a probability distribution. Solving a stochastic problem may involve generating one or more samples from the probability distribution.

One type of stochastic problem that occurs often in the real world arises when any of multiple possible events could have generated an observed scenario. Data can be collected about a scenario that exists and used to compute probabilities that the observed scenario is caused by each of the possible events. Based on the determined probabilities, decisions can be made. For example, decisions may be made assuming that the most probable event actually gave rise to the scenario. Though, in more complex scenarios, decisions may be made in other ways, such as by evaluating, based on the probabilities, an expectation that a particular decision will give rise to a good or bad result.

Image analysis is an example of a field that includes stochastic problems. In one stereo vision problem, two different images may be generated by two digital cameras placed close to one another—such as when approximating human eyes for a robotics problem. It may be desirable to determine, based on the images themselves, a distance to a particular object in the images. Each of the stereo images represents measurements of light traveling to a camera from the object. Because the light will travel in predictable paths when reflecting off objects, it may seem that the position of the object from which that light is reflected could be deterministically computed. However, in reality, many factors could influence the actual light measured at the camera. The shape, size and surface properties of the object as well as the position, strength and other properties of the light source may influence what is measured. As a result, any of a number of different objects at different distances from the cameras may generate the same or similar measured values.

Accordingly, when stereo image analysis is treated as a stochastic problem, what is computed is the probability that particular objects in particular locations gave rise to the measured images. This data can be used, for example, to guide a robot using the stereo vision system. The control algorithm of the robot may simply react to the data provided by stochastic analysis of the image as if the most probable objects are actually present. A more complex control algorithm may guide the robot to maximize the expectation that it will reach its intended destination without getting entangled with objects or minimize the expectation that the robot will be damaged due to collisions with objects.

Text analysis is another example of a stochastic problem: Given a set of words in the text of a document, it may be desirable to identify the topic of the document. The set of words in the document defines a scenario that could have been created by any of a number of events. Specifically, it is possible that the document could be on any of a number of topics. Similarly, if the point of the text analysis is to determine the point of view of the author, it is possible that any of a number of points of view will give rise to the words found in the document. When treated as a stochastic problem, it may be possible to determine probabilities associated with these events such as that the document describes a particular topic or that the author subscribed to a particular point of view. These probabilities can then be used in decision making, such as whether to return the document in response to a particular search query or how to catalog the document.

Other problems similarly follow this pattern and can be solved by determining probabilities of events that may give rise to a particular observed scenario. Such problems are generally characterized by a conditional probability density function. The conditional probability density function defines the probability of events within a set of events given that a particular scenario exists. From observations that tell what scenario exists and the probability density function, the probability that each event in the set gave rise to the observed scenario can be computed.

Clustering techniques may be used to solve problems like text analysis, where a goal is to determine a probability that an element (in text analysis, a document) fits into one or more categories. A clustering technique, such as the Chinese Restaurant Process (CRP), may include assembling one or more groups (or clusters) of elements by assigning elements to existing clusters and creating new clusters. For each group, statistics may be maintained regarding properties of the elements in the group, such that an indication of properties of the elements in the group is known. When a new element is to be assigned to a group, the new element may be inserted into a group to determine how well the new element "fits" into the group, by comparing properties of the new element to the properties of the elements already in the group. If the new element is not a good fit for the group, because the properties of the new element do not match the properties of elements already in the group, then the new element may not be added to the group. In some techniques, the new element may be added to each group in a sequence, and then finally assigned to a group with the best fit.

A second type of stochastic problem arises when it is desired to determine values for variables defining a scenario, but the values of these variables have a random component. This can arise in many situations where the variables cannot be directly observed, for example when they describe the microscopic structure of a chemical system of interest, or when they describe the clustering of biological, text, or demographical data. In all these settings, while the variables cannot be specified deterministically, they can be described in terms of a probability distribution. By selecting values according to the probability distribution, typical values may be obtained for inspection, or for use in solving other, larger stochastic problems.

A third type of stochastic problem arises when it is theoretically possible, but practically very difficult, to compute a value for some parameter in a scenario. If the scenario can be described in accordance with a probability distribution that assigns a high probability to the actual value of the parameter, selecting a value in accordance with the probability leads to a good approximation of the actual value. The widely used technique of Monte Carlo approximation provides a rich source of examples of this kind of stochastic problem.

Each of these types of problems has in common that it involves generating one or more samples in accordance with a probability distribution. Often, this process is complex and cannot be done by hand or mentally; accordingly, computers are necessary to solve a stochastic problem.

One traditional approach for using a conventional computer to solve a stochastic problem is to determine a set of events that are each possible under the probability distribution and then computing the probability of each potential event. In the context of the stereovision problem, this may involve identifying all potential distances to an object and calculating a probability that each distance is the correct distance.

Where this technique is used, these probabilities are typically computed with high precision to ensure that they closely approximate the actual probabilities. Accordingly, when a stochastic problem is approximated as a deterministic problem, it may be computed using 64-bit floating point processes, such that a probability of each event occurring (or each output being the "correct" output) is calculated and stored with high 64-bit precision.

SUMMARY

Applicants have recognized and appreciated that there are many disadvantages to current techniques used for computationally solving stochastic problems. Described herein are various principles and techniques that may be used, independently or in combination, to solve stochastic problems using configurable circuits that can be configured to produce samples from probability distributions.

More particularly, some of the principles and techniques described herein may be used to solve a stochastic problem by dividing the stochastic problem into multiple fragments. In some cases, each fragment may be related to a random variable that forms a part of the problem, such that each fragment may produce samples from a probability distribution for that variable. In other cases, each fragment may be assigned to a cluster of a clustering technique and/or a property of a cluster. Each fragment of the stochastic problem may then be assigned to a configurable circuit to solve the stochastic fragment. Each configurable circuit may be configured to solve the stochastic fragment, such as by providing to the configurable circuit information about a random variable, previous and/or possible values of the random variable, a probability distribution related to the random variable, other variables upon which the value of the random variable may be conditioned, or other information. In some cases, multiple stochastic fragments of a stochastic problem may be assigned to one configurable circuit and the configurable circuit may be periodically reconfigured to solve each fragment of the stochastic problem.

Configurable circuits may be implemented using any suitable combination of hardware and/or software. Configurable circuits and examples of configurable circuits that may be used to solve stochastic problems are discussed below. One type of configurable circuit, a stochastic tile, is also described in detail below. A stochastic tile may be a configurable circuit that is configurable to solve one or more stochastic problems or one or more parts of a stochastic problem. The stochastic tile may include memory to store information related to one or more parts of a stochastic problems, such as a current state of a random variable and/or a history of values taken by the random variable. The stochastic tile may also include stochastic circuitry to produce a sample from a probability distribution based on the information stored in the memory. A stochastic tile may also include control functionality to configure the stochastic circuitry at a particular time with information about a part of a stochastic problem and to reconfigure the stochastic circuitry at another time with information about another part of the stochastic problem.

In some embodiments, a configurable circuit may be implemented as, or include, a stochastic memory. A stochastic memory may act to produce samples from a probability distribution with which the stochastic memory is configured and according to a technique for solving a stochastic problem with which the stochastic memory is configured. The stochastic memory may be configured with a technique for solving a stochastic problem, including, for example, a Chinese Restaurant process or a Beta-Bernoulli process. The stochastic memory may then be configured to solve the stochastic problem and to produce, when an output is requested, samples from a probability distribution by accepting and storing input conditioning the probability distribution. The input may include observations from the probability distribution, that could be samples that had been previous generated from the stochastic memory. The stochastic memory will then store any suitable information about the observations/samples, in accordance with a technique for solving a stochastic process with which the stochastic memory is configured. The stochastic memory may also be adapted to remove from storage any previously-received observations/samples. The stored information may then be used to condition the probability distribution, such that new samples are produced from the stochastic memory according to the conditioned probability distribution.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
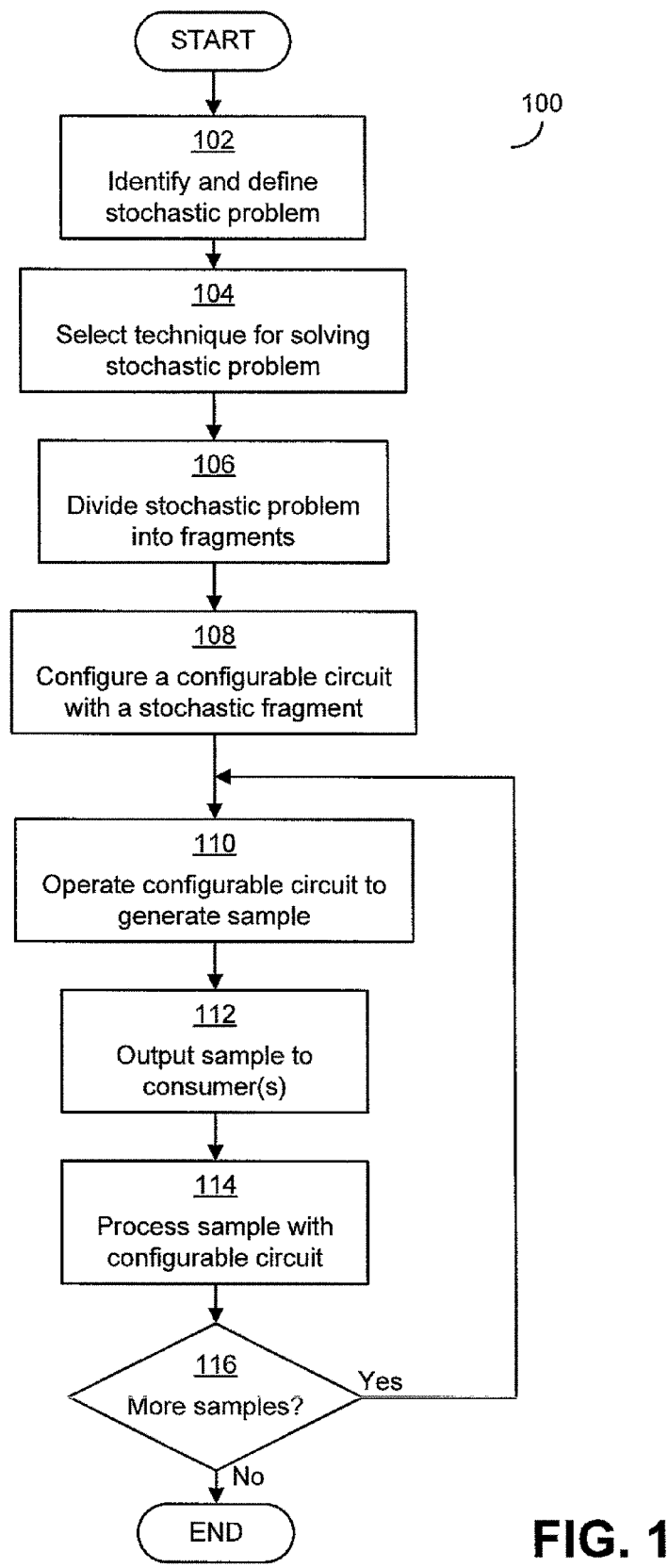
FIG. 1 is a flowchart of one process for solving a stochastic problem that may be implemented in some embodiments.

Applicants have recognized and appreciated that conventional approaches to solving stochastic problems electronically are inherently limited because they use deterministic computers. As a result, such solutions are based on deterministic approximations of stochastic processes. Additionally, the deterministic solutions tend to use high-precision floating point arithmetic. Such approximations may require amounts of time and/or processing resources that are unacceptably or inefficiently large.

As an example, deterministic approximations of a stochastic problem may involve determining first each potential event that may give rise to a set of observations and then determining the likelihood of its occurrence before making a decision. For a given problem the number of potential events may be vast, and it may take a lot of time to compute probabilities for all of the events.

As a scenario changes over time (e.g., as inputs vary or are refined), it may be necessary to recompute these probabilities. Each computation may take a large amount of time and processing resources because of the precision with which the operations are carried out; typically 64 bits. In addition to the time and processing requirements of this technique, Applicants have appreciated that the high precision—in addition to increasing the amount of time and processing resources necessary to perform each calculation—is not necessary, as stochastic problems have inherent to them some degree of randomness and uncertainty. Typically, the amount of inherent uncertainty in a problem eclipses the high precision used in computing approximations of these problems and thus time and space is used unnecessarily in solving stochastic problems.

Applicants have recognized and appreciated that it is generally not necessary to compute probabilities for all possible events to solve a stochastic problem. Rather, a meaningful solution to a stochastic problem is frequently obtainable using a relatively small number of samples, because of the speed with which estimates of probabilities taken from random samples may converge. Thus, if samples could be generated from a probability distribution, probabilities of multiple possible events can be quickly calculated for each of the most likely events. Moreover, because probabilities may be determined based on the aggregate results of multiple samples, the precision required for computing each sample is less, reducing the need for floating point arithmetic or other computationally-expensive techniques.

Accordingly, described herein are techniques for solving a stochastic problem using configurable circuitry, where the configurable circuitry may be configured to generate samples from one or more probability distributions related to a stochastic problem. A configurable circuit may be configured to solve a stochastic problem using any suitable stochastic processing technique, including a Metropolis-Hastings process, a Gibbs Sampling process, a Chinese Restaurant Process, a Rejection Sampling process, or any other suitable technique.

Further, Applicants have recognized and appreciated that stochastic problems may often be divided into smaller sub-problems, and that operations relating to each sub-problem and results of each sub-problem can be used to perform operations relating to the stochastic problem and to yield results of the stochastic problem. For example, a stochastic problem may include a number of random variables that each may take a value according to a probability distribution. Each of these random variables may be processed as part of a solution to another stochastic problem that is a sub-problem of the stochastic problem to be solved, also called a "stochastic fragment" herein. If a clustering technique is used, a stochastic fragment may also be related to a cluster and/or a property of an element of the cluster. The stochastic problem can be divided into stochastic fragments such that samples are generated from each of the probability distributions for each of the random variables in each stochastic fragment, and that these samples may be used to generate samples from an overall probability distribution relating to the stochastic problem.

Dividing a stochastic problem in this manner allows for the stochastic problem to be solved in parallel, which can reduce the time needed to solve the problem. Dividing the problem may also allow the stochastic problem to be solved using circuitry that is less complex, as each stochastic fragment of a stochastic problem may be less complex than the whole problem and may be executed on less complex circuitry.

To divide a problem, a stochastic fragment may be defined in terms of the variables which the configurable circuit will model and/or information about a probability distribution from which to draw samples. The stochastic fragment may also be defined in terms of a relationship the fragment has with other fragments, such as a relationship or dependence between variables solved by different fragments.

A configurable circuit may therefore be implemented using circuitry that is not complex, such as with circuitry that has low bit precision and a small amount of memory. The configurable circuit may be configured with information defining one or more fragments such that the configurable circuit can be adapted to solve the fragment(s). A configurable circuit may then be controlled to generate samples based on the information defining a stochastic fragment(s). If a configurable circuit is adapted to solve multiple stochastic fragments, the configurable circuit may also be controlled to configure the device over time. For example, the configurable circuit may be controlled to reconfigure the circuit periodically to use information defining each fragment and to generate samples from each fragment, such that the configurable circuit solves one stochastic fragment at each time.

It should be appreciated that a configurable circuit that can be configured to solve stochastic problems and/or stochastic fragments can be implemented in as any suitable combination of hardware and/or software. Accordingly, in some implementations each configurable circuit may be a core of a multi-core processor that is adapted to execute instructions. These instructions may be implemented as a thread that is adapted to solve a particular stochastic problem or fragment by generating samples from a probability distribution. The configurable circuit, when implemented as a core of a multi-core processor, may be configured by being assigned the thread to process and by being given access to variables and other information that may be stored in the thread's stack as well as the instructions to be executed in the thread, where the variables and other information may be information that defines the stochastic problem/fragment. In other implementations, at least a portion of a configurable circuit may be implemented in hardware, such that the configurable circuit may include stochastic circuitry to perform one or more stochastic computations and produce from a probability distribution. Such stochastic circuits may be implemented in any suitable manner, including using stochastic circuits and stochastic circuit elements described in U.S. patent application Ser. No. 12/397,754 ("the '754 application"), filed on Mar. 4, 2009, entitled "Combinational stochastic logic." Where configurable circuits are implemented using stochastic circuitry, any suitable hardware and/or software may be used to control operations of the stochastic circuitry, such as by providing information describing a part of a stochastic problem or fragment to the stochastic circuitry to be processed.

Examples of ways in which a configurable circuit may be used to solve stochastic problems and stochastic fragments are described below. Though, it should be appreciated that each of the techniques and circuits described below are merely illustrative of the types of techniques and circuits that may be used in embodiments.

For ease of description, each of the examples below will be discussed in terms of a stochastic problem that is divided into stochastic fragments and solved using a plurality of configurable circuits. Though, as discussed above, a stochastic fragment is a stochastic problem, in addition to being a part of another stochastic problem. Further, some techniques described below for configuring and operating a plurality of configurable circuits could be used with one configurable circuit. It should be appreciated, then, that each of the techniques and circuits described below may be used to solve a stochastic problem and are not limited to operating with stochastic fragments that are part of another stochastic problem or with a plurality of configurable circuits.

FIG. 1 shows one illustrative process that may be used to configure a configurable circuit to solve a stochastic fragment. The process 100 may be carried out by any suitable computing device, including at a computing device adapted to configure configurable circuits of another computing device or a control component associated with at least one configurable circuit.

The process 100 of FIG. 1 begins in block 102, in which a stochastic problem is identified and defined. Any suitable stochastic problem may be identified in block 102. Further, the stochastic problem may be defined in any suitable manner, including according to any suitable constraints on a number of random variables, possible values of random values, dependence or independence between variables, or any other constraints. The type and manner of defining of the stochastic problem is not essential.

In block 104, a technique for solving a stochastic problem is selected and defined. Many different techniques are known in the art for solving stochastic problems, and many other techniques are being developed and will be developed. Any suitable stochastic technique may be used in embodiments. Exemplary techniques include the Metropolis-Hastings algorithm, the Gibbs Sampling algorithm, the Chinese Restaurant Process algorithm, and the Importance sampling algorithm. One of skill in the art will be able to select a technique for solving a stochastic problem and will be able to define how the stochastic problem identified in block 102 will be solved using the technique selected in block 104.

In block 106, the stochastic problem is divided into stochastic fragments. Techniques for dividing a stochastic problem into fragments are known in the art, and any suitable technique that is or will be known may be used. For example, techniques associated with developing Markov Random Fields (MRFs) and identifying independent variables may be used to determine how to divide a stochastic problem. As another example, each random variable of a stochastic problem may be identified as a stochastic fragment. As another example, a factor graph may be used to determine how to divide a stochastic problem. In some cases, a graph (e.g., a factor graph or an MRF graph) may be received as a portion or an entirety of input that is received in block 102 at a computing device carrying out the process 100, while in other cases the graph may be calculated using known techniques based on other input received at the computing device. Though, techniques other than graphing may be used to identify stochastic fragments. For example, if a clustering technique is to be used to solve a stochastic problem, then each stochastic fragment of the stochastic problem may be related to at least one cluster, or to at least one property of a cluster, or to both at least one cluster and at least one property. Where other techniques are used for solving stochastic problems, the stochastic problem may be divided according to any suitable part of those techniques. As another example, in some embodiments, groups of related random variables may be identified as a stochastic fragment. Individual variables or groups may, in some embodiments, be identified based on the independence of the variables. If, in such embodiments, a random variable is independent of other random variables, then the random variable may be assigned to a stochastic fragment.

In some embodiments, once a number of stochastic fragments are identified, the number of stochastic fragments and/or an amount of resources that may be used to process the number of stochastic fragments is compared to the available resources of the plurality of configurable circuits to determine whether the number of stochastic fragments can be processed by the plurality of configurable circuits. For example, a number of configurable circuits, an available memory of each configurable circuit and/or an available bandwidth for interconnections between configurable circuits may be considered. Additionally, memory and bandwidth may be adjusted based on a desired accuracy or precision for solving stochastic fragments, such as where greater precision is desired and so information regarding fewer stochastic fragments may be stored in a memory.

The number of stochastic fragments may be compared to the available resources to determine whether, for example, the stochastic fragments are able to be stored in memory or whether the stochastic fragments may be able to exchange information between configurable circuits using the available bandwidth.

If it is determined that the number of stochastic fragments is not possible to be solved with the available resources, then one or more stochastic fragments may be merged to reduce a number of stochastic fragments, such that the number of stochastic fragments may be solved with the available resources.

Techniques for merging random variables or creating stochastic fragments with multiple random variables are known in the art. Any merging technique may be used in embodiments of the invention, including merging techniques that are known or will be known.

In block 108, stochastic fragments are assigned to configurable circuits, and each configurable circuit is configured to solve at least one stochastic fragment identified in block 106. Stochastic fragments may be assigned to configurable circuits in any suitable manner. In some embodiments, stochastic fragments may be assigned in a round-robin fashion to configurable circuits, until all stochastic fragments are assigned to a configurable circuit. In other embodiments, a coloring process may be performed on stochastic fragments to identify conditionally-independent stochastic fragments. The coloring process may be performed in connection with a graph of the stochastic fragments, such as a MRF or factor graph. For each color that is applied, each stochastic fragment having the color will be assigned to configurable circuits in a round-robin fashion until all the stochastic fragments for a color have been assigned.

In some embodiments, when a configurable circuit is assigned to solve multiple stochastic fragments over a plurality of iterations, solving one stochastic fragment per iteration, the stochastic fragments may be assigned based on one or more considerations relating to a desired accuracy of a probability distribution for the stochastic fragments and/or a stochastic problem of which the stochastic fragments are a part.

For example, as discussed in greater detail below, if a first stochastic fragment is conditionally dependent on a second stochastic fragment, then the first stochastic fragment will use information about the second stochastic fragment when generating a sample for the first stochastic fragment. If the first and second stochastic fragments are assigned to different configurable circuits, then an ability to exchange information between the first and second stochastic fragments may be limited by an available bandwidth of connections between the different configurable circuits. For example, based on the available bandwidth, less than all or none of the information may be able to be exchanged between first and second fragments, based on how many other fragments are exchanging information. Exchanging less than all of the information may lead to a loss of accuracy, but this loss may be acceptable for some stochastic problems. In other stochastic problems, though, a desired level of accuracy may require that more or all of the information be exchanged, which may not be possible given the available bandwidth.

Where bandwidth may lead to a loss of accuracy, two stochastic fragments that are conditionally dependent on one another may be assigned to a same configurable circuit, such that information exchange between the stochastic fragments may be carried out with internal connections of the configurable circuit and not with bandwidth-limited interconnections. In some stochastic problems, an assignment may be carried out such that no stochastic fragments that are conditionally dependent are assigned to different configurable circuits, while for other stochastic problems a number of conditionally dependent stochastic fragments assigned to different configurable circuits is reduced or minimized.

A similar loss of accuracy, and a similar assignment, may be carried out to prevent or reduce the chances of conditionally-dependent stochastic fragments being solved at a same time by different configurable circuits. When the conditionally-dependent stochastic fragments are being solved at a same time, the stochastic fragments cannot exchange information that can be used in configuring each configurable circuit to solve one of the stochastic fragments. Rather, when one configurable circuit, in being configured to solve a first stochastic fragment, retrieves a value from another configurable circuit associated with another stochastic fragment on which the first stochastic fragment depends, then that value will be unavailable or out of date. This is because the other configurable circuit is, at that time, solving the other stochastic fragment and generating the value or updating the value. When the value is unavailable or out of date, then the configuration of the configurable circuit will be slightly inaccurate, and a sample generated by the configurable circuit will be slightly inaccurate.

In some stochastic problems, one or a few of these inaccurate operations may not produce an inaccuracy in an overall solution of a stochastic fragment or a stochastic problem, but many of these inaccuracies may lead to a noticeable deviation from the true solution. A control may therefore be carried out to maintain a level of inaccuracy below a threshold, such as by assigning conditionally-dependent stochastic fragments to a same configurable circuit or by reducing a number of conditionally-dependent stochastic fragments that are assigned to different configurable circuits.

Assigning stochastic fragments to configurable circuits may be done in any suitable manner based on any suitable information about the stochastic problem and/or stochastic fragments. Where a graph is received or calculated that describes a stochastic problem and conditional dependencies in the stochastic problem, the graph may be used to perform the assigning, such as by treating nodes in the graph as stochastic fragments and assigning nodes to configurable circuits.

While exemplary techniques for assigning have been described above, it should be appreciated that embodiments are not limited to performing an assignment of stochastic fragments to configurable circuits in any particular manner When a stochastic fragment has been assigned to a configurable circuit, the configurable circuit may be configured with information describing the stochastic fragment. The information describing the stochastic fragment could be any information that is useful for calculating a sample from a probability distribution or in configuring a probability distribution from which to draw a sample.

For example, for a random variable or group of random variables, the configurable circuit may be configured with a definition of the range of possible values of the random variable(s) or other constraints on the value of the random variable(s). The constraints on the random variable(s) may also include relative constraints, such as constraints on a value of one random variable given that another random variable has another value (e.g., one variable must have a value less than double that of another variable). The information describing the stochastic fragment may also include constraints on one or more probability distributions. A constraint on a probability distribution may be defined in terms of a current value and/or previous values of a random variable, which may indicate limitations on a probability distribution of the random variable. A constraint on a probability distribution may also be defined in terms of an initial guess or a most recent guess regarding the probability distribution for the random variable.

In some implementations, the information describing the stochastic fragment may include configuring the configurable circuit to operate according to a particular probability distribution. The particular probability distribution may be an exact match for a probability distribution for the stochastic fragment, based on information known about the probability distribution, or may be an approximation of the probability distribution.

The particular probability distribution may be determined in any suitable way to configure the configurable circuit. The particular probability distribution may be computed based on any suitable values (e.g., according to constraints on the probability distribution) by the configurable circuit or by another unit and input to the configurable circuit. In other cases, the configurable circuit may be configured with an identification of a probability distribution from which to produce a sample. In some cases, a configurable circuit may have stored a plurality of predefined probability distributions in a table of probability distributions. Predefined probability distributions may include canonical probability distributions, such as a normal distribution and a poisson distribution. In such cases, configuring may comprise selecting one of the plurality of probability distributions by which the configurable circuit should operate and produce samples and providing the probability distribution to the configurable circuit, or providing the table to the configurable circuit along with an identification of one of the probability distributions that is to be selected. In some such cases where a table of predefined probability distributions is used, each predefined probability distribution may accept one or more parameters to configure the distribution. For example, for a normal distribution, a mean and/or a variance for the probability distribution may be accepted as input, and the normal distribution may be parameterized based on the parameters to change the probability distribution. Though, it should be appreciated that in embodiments that include a table of predefined probability distributions, a selection may be carried out in any suitable manner, including by identifying one of the plurality of probability distributions that is proportional to a desired probability distribution.

The configurable circuit may also be configured with instructions regarding how the stochastic fragment is to be solved. The instructions may comprise instructions on selecting or configuring circuits elements to perform certain tasks relating to the technique for solving a stochastic problem that was selected in block 104. The instructions may also comprise one or more executable software instructions that are to be processed to perform certain tasks relating to the technique for solving the software problem that was selected in block 104.

The configurable circuit may also be configured with instructions regarding a manner in which to process multiple stochastic fragments. A configurable circuit may be adapted to process a single stochastic fragment at a time, but may be configured with multiple stochastic fragments to solve in an order. In accordance with the order, operations may be carried out for a first stochastic fragment (e.g., to generate a sample), then operations may be carried out for a second stochastic fragment, then operations may be carried out for a third stochastic fragment, etc., until the end of the order is reached and the order is restarted. Any suitable order may be used, including a sequential order, a random order, and orders that repeat some stochastic fragments within the order.

In some cases, an order may be selected for the configurable circuit based on conditional dependencies of the stochastic fragments with which a configurable circuit is to be configured. The order may be selected such that a sample for another stochastic fragment on which a stochastic fragment is conditionally dependent will be available when the stochastic fragment is solved by the stochastic fragment.

While several examples of configuration information have been described above, it should be appreciated that some embodiments may use only one or some of these types of configuration information, while other embodiments may use all of these types of configuration information.

Further, portions of the configuration information may be provided to configurable circuits in any suitable manner. In some cases, data or instructions may be provided to configurable circuits to carry out the configuration and provide configuration information. In other cases, the configuration may include providing an identification of a selected configuration to the configurable circuit, and the configurable circuit will retrieve the configuration information from a local memory. In other embodiments, the configuration information may be hardcoded into the configurable circuit or implemented in hardware in the configurable circuit. Where a plurality of configurable circuits are being configured, each configurable circuit may be provided the configuration information or may be configured in a different way or in the same way.

In block 110, once the configurable circuit is configured with the information describing the stochastic fragment, the configurable circuit may be operated to begin solving the stochastic fragment by generating a sample from a probability distribution. The sample that is generated is a possible value of a random variable that is being modeled by the stochastic fragment. Theoretically, each value that may be held by random variable will be produced as a sample in a same proportion to the probability of the random variable having that value, according to the probability distribution.

In block 112, the sample generated in block 110 may be output to one or more consumer of samples. A consumer may be another configurable circuit processing a stochastic fragment and that may use the sample generated in block 110 in generating its own sample. A consumer may also be any entity (e.g., a person or hardware and/or software agent) that may make decisions based on samples. For example, if the stochastic problem is a stereovision problem, a consumer may be a process for determining how to react to locations of objects in the room, based on samples that are guesses as to locations of objects. Embodiments are not limited to providing samples to any particular consumer or type of consumer.

In some cases, as in the stereovision example, samples may be output to a consumer that is able to use the sample to make a decision. In the case of the stereovision example, the sample may relate to a value for an individual pixel of an image generated by a camera. The sample may relate to an estimate or guess for a distance to an object seen by that pixel of the camera. Such a sample, as discussed above, may be useful in generating a decision regarding how to control a movement.

In other cases, samples may not be themselves used to make decisions, but may be processed to provide data in making decisions. For example, in a text clustering technique, one or more configurable circuits may be used to assign each of multiple documents to clusters based on topics. Each sample output from a configurable circuit may identify a cluster to which a document has been assigned. Samples may be used to determine a most common topic for documents, which is related to a most common cluster to which documents have been assigned. The individual samples may therefore be used in an operation to generate an output regarding a most common topic. In some cases, the output may be a sample, and the clustering technique may be repeated multiple times over a plurality of iterations, and assignments of documents to clusters in each iteration may be used to generate samples regarding a most common topic.

In the examples given above, the consumers of samples may be deterministic processing units (e.g., deterministic processors executing software) that perform deterministic operations on samples produced by configurable circuits that are solving stochastic problems. Though, it should be appreciated that not all embodiments are limited in this manner. Other embodiments may operate with consumers of samples that are other configurable circuits that are solving other stochastic fragments or other stochastic problems and producing samples.

In some cases, a sample may be output from one configurable circuit to another configurable circuit. The other configurable circuit may then use the sample to produce another sample from a separate probability distribution. This may be the case, for example, in a geophysics problem relating to discovery of oil. A first configurable circuit may be configured to produce samples from probability distributions indicative of properties of rock below a surface of the ground, such as being configured with information about known types of rocks and configured with observations about the rock below the surface. The first configurable circuit may then output a sample indicative of a type of rock below the surface. A second configurable circuit may be configured to produce samples form probability distributions indicative of whether oil is below the ground, based on geophysical properties associating oil with types of rock. Based on a sample received from the first configurable circuit, the second configurable circuit may produce a sample indicative of whether there is oil below the surface of the ground. The second configurable circuit may be configured, as discussed above, to condition a probability distribution on samples received from the first configurable circuit.

Another example of configurable circuits acting as consumers of other values may be seen in some implementations of the stereovision problem discussed above. A first configurable circuit may produce a sample indicative of a distance to an object observed by a first pixel, and a second configurable circuit may produce a sample indicative of a distance to an object observed by a second pixel. The second configurable circuit may be configured to condition the sample produced by the second configurable circuit on the value of the sample produced by the first configurable circuit. This may be the case where two pixels, next to each other, have a high likelihood of producing samples that are similar in value to one another, as it is likely that the pixels are observing the same object at the same distance.

It should be appreciated, as well, that in each of the examples described above, samples were described as being output to other circuits, including other processing circuits and other configurable circuits. Though, as discussed above, a configurable circuit may be reconfigured at different times to perform different operations and solve different problems, including to solve different stochastic problems or stochastic fragments. Accordingly, in some cases a sample may not be output to a different circuit, but may be processed by the same circuit that generated the sample at a different time.

In block 114, the sample generated in block 112 may be used to reconfigure the configurable circuit that generated the sample. For example, the sample may be used to alter a probability distribution for the random variable by requiring that the probability distribution be consistent with the sample. This may be done where, for example, the probability distribution initially indicates that a value of "2" for a random variable has a low probability, but a sample of "2" is generated frequently. Because a "2" is generated often, that value must have a high probability, meaning that the probability distribution may be incorrect. The probability distribution may therefore be altered to reflect a higher probability for the value "2." Additionally or alternatively, if the sample is to be rejected for any reason (e.g., violating a constraint), the probability distribution may be altered to reflect that the sample was not generated, or may not be altered in any way to reflect the sample.

In some embodiments, a probability distribution may be altered by calculating a new probability distribution and storing the calculated probability distribution. In other embodiments, a different probability distribution may be selected from a table of probability distributions. In other embodiments, one or more parameters of a probability distribution may be recalculated, so as to alter a probability distribution. In some cases, parameters may be used to configure (and reconfigure) predefined probability distributions, such as canonical probability distribution like a normal distribution or a poisson distribution.

It should be appreciated, though, that any suitable process may be carried out to reconfigure the configurable circuit based on the sample, as embodiments are not limited in this respect.

In block 116, if more samples are to be generated, then process 100 continues to block 110 to generate another sample. If no more samples are to be generated, though, the process 100 ends.

Figure 2:
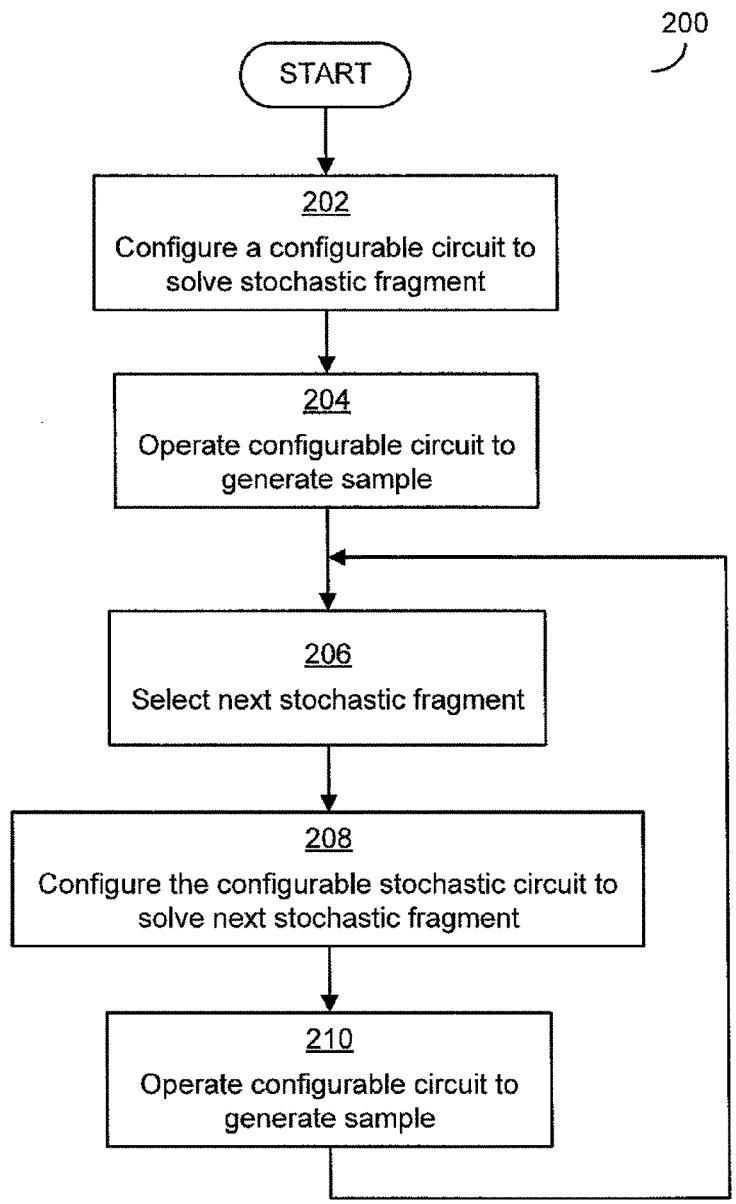
FIG. 2 is a flowchart of one process for operating a configurable circuit to solve one or more stochastic fragments as part of solving a stochastic problem that may be implemented in some embodiments.

Process 100 describes a process for configuring and operating a configurable circuit to solve one stochastic fragment. Though, in some embodiments, a stochastic fragment may be configured to solve one stochastic fragment at a particular time, but may be configured or configurable to solve multiple stochastic fragments. FIG. 2 illustrates one exemplary process that may be used to operate a configurable circuit to solve multiple stochastic fragments by reconfiguring the configurable circuit.

Process 200 begins in block 202, in which a configurable circuit is configured to solve a stochastic fragment. The configuration of block 202 may be done in any suitable manner, including as discussed above in connection with block 108 of FIG. 1. Once the configurable circuit is configured in block 202, the configurable circuit is operated in block 204 to generate a sample.

In block 206, a next stochastic fragment is selected from a set of stochastic fragments that the configurable circuit is to be used to solve. A next fragment may be selected in any suitable way. In some cases, a serial selection process is carried out, such that the fragments are assigned an order and the fragments are processed in that order. The order may be assigned in any suitable manner and may be assigned in a way that relates to a dependency of variables of fragments or a nature of the stochastic problem to be solved. The order may alternatively, in some cases, be selected on a random basis when a configurable circuit is first assigned to work with the set of stochastic fragments and then used afterward. In other cases, no defined or concrete order may be used or kept, but instead a random order may be used, such that a random selection may be made each time a next stochastic fragment is to be selected. Any suitable technique may be used for selecting a next stochastic fragment, and the technique may be selected based on the stochastic fragments, the stochastic problem, and/or the technique that has been selected for solving the stochastic problem. The configurable circuit may be hardcoded with a technique for selecting a next stochastic fragment or may be configurable with a technique, such that the technique may be changed or altered between stochastic problems or between stochastic fragments.

In block 208, after a next stochastic fragment has been selected, the configurable circuit is reconfigured to solve the next stochastic fragment. The configurable circuit may be reconfigured in any suitable manner. In some cases, reconfiguring the configurable circuit may comprise replacing information describing a previous stochastic fragment (e.g., the stochastic fragment of block 202) with information regarding the next stochastic fragment. Replacing the information may be done in any suitable manner, including by removing the information describing the previous stochastic fragment from a memory of the configurable circuit and storing in the memory information regarding the next stochastic fragment.

Alternatively, reconfiguring the configurable circuit may comprise changing one or more pointers to memory locations from pointers to memory locations storing information describing the previous stochastic fragment to memory locations storing information describing the next stochastic fragment. As another example, a change may be made from hardware of the configurable circuit that is configured for the previous stochastic fragment to hardware of the configurable circuit that is configured for the next stochastic fragment, such that when the configurable circuit is operated the configurable circuit uses the hardware for the next stochastic fragment. Though, it should be appreciated that these are merely examples of ways in which a configurable circuit may be reconfigured. Any suitable process may be used to reconfigure a configurable circuit.

In block 210, once the configurable circuit is reconfigured, the configurable circuit is operated to generate a sample. The sample that is generated will be a sample from the next stochastic fragment.

Once the sample is generated in block 210, then process 200 may return to block 206 to select a next stochastic fragment.

Process 200 of FIG. 2 was discussed generally in terms of reconfiguring a configurable circuit to operate to solve different stochastic fragments and was not explicitly described as including any steps relating to processing of samples or how samples could be used. Embodiments that implement the process 200 of FIG. 2 may include steps relating to processing of samples or any other steps that may be useful in solving a stochastic problem or solving a stochastic fragment.

Figure 3:
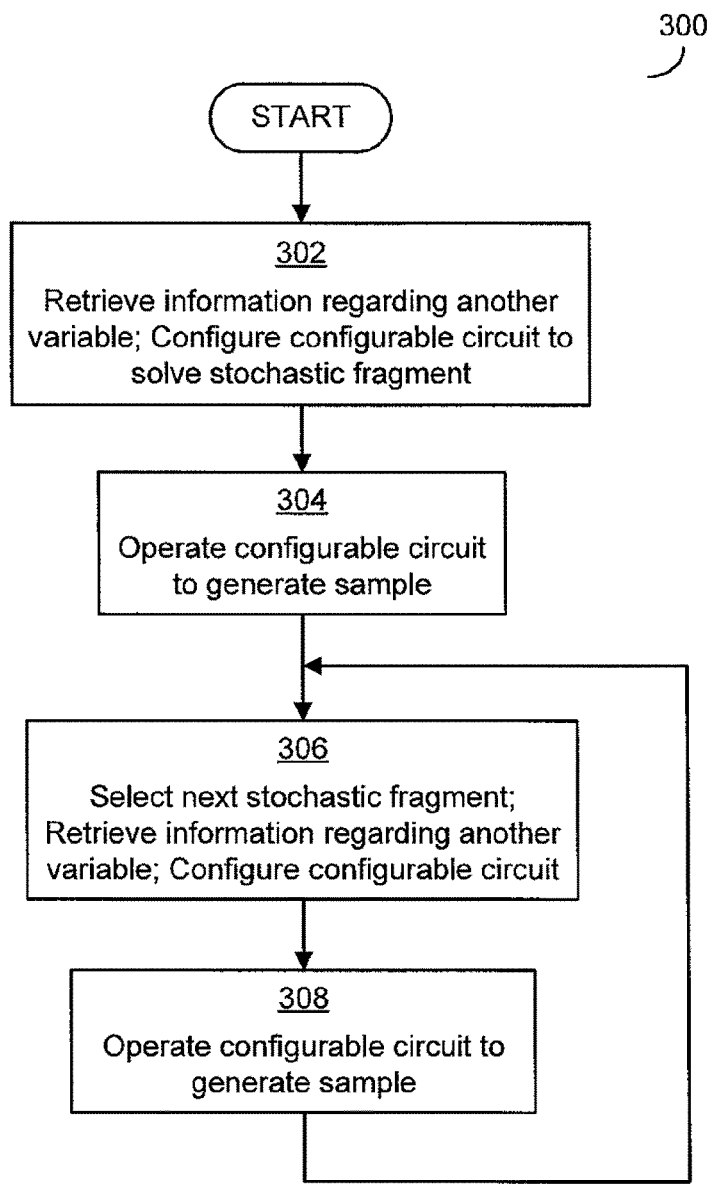
FIG. 3 is a flowchart of another process for operating a configurable circuit to solve one or more stochastic fragments as part of solving a stochastic problem that may be implemented in some embodiments.

FIG. 3 illustrates one exemplary process that may be used to generate and process samples from a stochastic fragment and to reconfigure a configurable circuit to operate to solve a next stochastic fragment.

Process 300 begins in block 302, in which a configurable circuit is configured to solve a stochastic fragment. As described above, configuring the configurable circuit may comprise making available to the configurable circuit any information describing the stochastic fragment, including a current value of variables of the stochastic fragment, a history of previous values of the variables, instructions on how to solve the stochastic fragment, and/or any other information. In block 302, the information may also comprise retrieving information about other variables calculated for other stochastic fragments that are being solved by the configurable circuit and/or by other configurable circuits, such as other stochastic fragments on which the stochastic fragment conditionally depends. This other information may include a probability distribution for the other variables and/or a current state or recent sample of the other variables, among other pieces of information. The information about the other variables may be retrieved from a memory accessible to the configurable circuit, including a memory of the configurable circuit to which information for each stochastic fragment may be written, a memory of another configurable circuit, and/or a memory shared by configurable circuits. The information about the other variables may be used in configuring the configurable circuit in block 302, including to alter a probability distribution or to alter a way in which a sample is generated, such that samples are generated in a way that is consistent with the values of the other variables. The information about the variables may be used in any suitable manner, including some of the techniques described above in connection with block 114 of FIG. 1 and processing samples to alter probability distributions.

In block 304, once the configurable circuit is configured to solve the stochastic fragment, the configurable circuit is operated to generate a sample of a value of a random variable. This sample is then stored in memory associated with the stochastic fragment.

In block 306, the configurable circuit is reconfigured to operate with a next stochastic process. The selection of a next stochastic process and the reconfiguration may be done in any suitable manner, including according to exemplary techniques described above in connection with FIG. 2. The reconfiguration of block 306 may also include retrieving from memory the sample stored in block 304 and altering a probability distribution to be consistent with that sample. In this way, a configurable circuit may operate to solve two different stochastic fragments and alter a probability distribution of each depending on a current value of a variable in the other.

In block 308, the configurable circuit is operated to generate a sample for the next stochastic fragment. The sample is then stored in memory, and process 300 continues to block 306 to reconfigure the configurable circuit for a next stochastic fragment. In this way, the configurable circuit may continue generating samples for stochastic fragments based on samples generated by the configurable circuit while processing other stochastic fragments.

Embodiments of the invention may operate in any suitable manner with any suitable hardware to implement techniques for solving a stochastic problem.

As discussed above, in some embodiments, a stochastic problem may be divided into a large number of fragments. For example, the stochastic problem may be divided into more than a hundred fragments. In some example embodiments, the stochastic problem may be divided into a thousand, ten thousand or more fragments. Configuration information may be generated for each fragment indicating how samples should be generated for the fragment. The configuration information may include observed values, probability distribution, other variables upon which the fragment is conditioned and other information indicating how the fragment should be evaluated. In some example embodiments, computer software may be used to determine how to divide the stochastic problem into fragments. The computer software may include one or more computer program modules that include instructions to be executed by a processor to divide the stochastic problem into fragments and to generate the configuration information for each fragment. In an example embodiment, the processor may be a 64-bit processor on a host computer system. Other example embodiments may use different processors or computer architectures. In addition, other embodiments, may use firmware and/or hardware to divide the stochastic problem into fragments. In some embodiments, firmware being executed on a processing unit on a system-on-chip integrated circuit device may be used to divide the stochastic problem into fragments.

In some embodiments, the software or firmware then causes the fragments to be assigned to a plurality of configurable circuits or processing units. In some embodiments, the configurable circuits may be on the same system-on-chip integrated circuit as the processing unit that divided the stochastic problem into fragments. In another example embodiment, a host processor may divide the problem into fragments and the configurable circuits may be on a separate accelerator board or integrated circuit device. For example, the host processor may assign the fragments and download configuration information through driver software to the separate board or integrated circuit device. In another example embodiment, the fragments may be assigned to multiple threads of execution on a multi-processor or multi-core system.

In some embodiments, stochastic fragments may be processed by a system having multiple configurable circuits. For example, the system may include a multi-core processor having two or more cores or processing units, each acting as a configurable circuit. In some examples, the system may have from 2 to 128 cores or processing units or any number within that range or some higher number of cores or processing units, such as thousands, tens of thousands, hundreds of thousands, or millions. In some examples, the system may have 2, 4, 8, 16, 32, 64, 128 or more cores or processing units. The cores or processing units may operate with words of any suitable size, including 64 bits or more, 32 bits to 64 bits, or less than 32 bits. In some example embodiments, the cores or processing units used to process the fragments may be 4-bit, 8-bit, 16-bit or 32-bit processors. Cores or processing units may also, in some cases, have a lower complexity or cost than a host processor used to divide the problem into fragments. In some examples, these cores or processing units may have 4-bit, 8-bit, 16-bit or 32-bit instructions, registers, buses and/or memory addresses and may not include integrated floating point hardware. In some examples, these cores or processing units may process the fragments using 4-bit, 8-bit, 16-bit or 32-bit integer operations or other fixed-point operations and not floating point operations. Where configurable circuits other than cores are used, processing units having any suitable word size (e.g., 4-bit, 8-bit, etc.) or in any suitable number (e.g., hundreds, thousands, tens of thousands, etc.) may be used.

It should be appreciated that some processing units of configurable circuits may perform operations using words of 64 bits or more, of between 32 and 64 bits, or of less than 32 bits. Additionally, where some processing units of configurable circuits may operate with words having a traditional number of bits that is a power of 2 (e.g., 8 bit, 16 bits, 32 bits, 64 bits, etc.), other processing units may operate with other words, including 6-bit words, 7-bit words, 12-bit words, etc. Words having any suitable number of bits may be used in processing units.

In some embodiments, a thread may be allocated on one of the cores or processing units for each fragment. In some examples, more than one hundred, one thousand, ten thousand or more threads may be allocated. In some examples, there may be more fragments and threads than the number of cores or processing units. In some embodiments, threads may be allocated across cores or processing units for parallel processing and multiple threads may also be allocated to individual cores or processing units to be processed sequentially or in some other order. The configuration information may be used to reconfigure the cores or processing units for the different fragments that are processed on the same core or processing unit. In some example embodiments, more than 2, 10, 100, 1000 or more fragments and threads may be allocated to an individual core or processing units (and, in some example embodiments, there may be 2-128 or more cores, each with this number of fragments and threads allocated to it).

In some embodiments, fragments may be allocated to configurable circuits on a separate integrated circuit device. The configurable circuits may be stochastic tiles or other configurable circuits on a separate integrated circuit or may be part of a system-on-chip device (that, in some embodiments, may also include the processing unit that divided the stochastic problem). In some example embodiments, the configurable circuits may include arithmetic logic units for performing 4-bit, 8-bit, 16-bit or 32-bit integer operations or other fixed-point operations and may not include circuitry for performing floating point operations. In some embodiments, the device may include an array or other arrangement of more than one hundred, one thousand, ten thousand, a million or more configurable circuits, each of which is capable of processing one or more fragments. Each configurable circuit may include memory for receiving configuration information regarding the fragments. In some embodiments, the number of fragments may exceed the number of configurable circuits. For example, there may be millions of fragments in some embodiments. Fragments may be allocated across the many different configurable circuits and many fragments may also be allocated to each individual configurable circuit as well. The configuration information for each fragment may be used to reconfigure the circuit to process each subsequent fragment. In some example embodiments, more than 2, 10, 100, 1000 or more fragments may be allocated to an individual circuit (and, in some example embodiments, there may be 100, 1000, 10000 or more configurable circuits, each with this number of fragments allocated to it).

Accordingly, in example embodiments, massively parallel processing may be used to generate samples for a complex stochastic problem. However, this may be achieved in some embodiments using reduced complexity hardware for each configurable circuit, allowing for lower cost and a high speed of execution.

As discussed above, embodiments may operate with any suitable configurable circuit. In some embodiments, the configurable circuit may be a dedicated hardware circuit, designed to be configured to solve a particular type of stochastic fragment and designed to generate samples for that stochastic fragment. In other embodiments, the configurable circuit may be multi-purpose processor adapted to execute instructions to carry out a process for solving a stochastic problem. Any suitable configurable circuit may be used in embodiments.

For illustration, several examples of configurable circuits and examples of processing units of configurable circuits are discussed in detail below. Though, it should be appreciated that embodiments are not limited to operating with these particular types of configurable circuits. In connection with each of the exemplary circuits there are discussed particular techniques that may be used to implement the processes of FIGS. 1, 2, and 3 to solve a stochastic problem. It should also be appreciated that embodiments are not limited to implementing any of these particular techniques or implementing these particular techniques with the circuits discussed below.

Figure 4A:
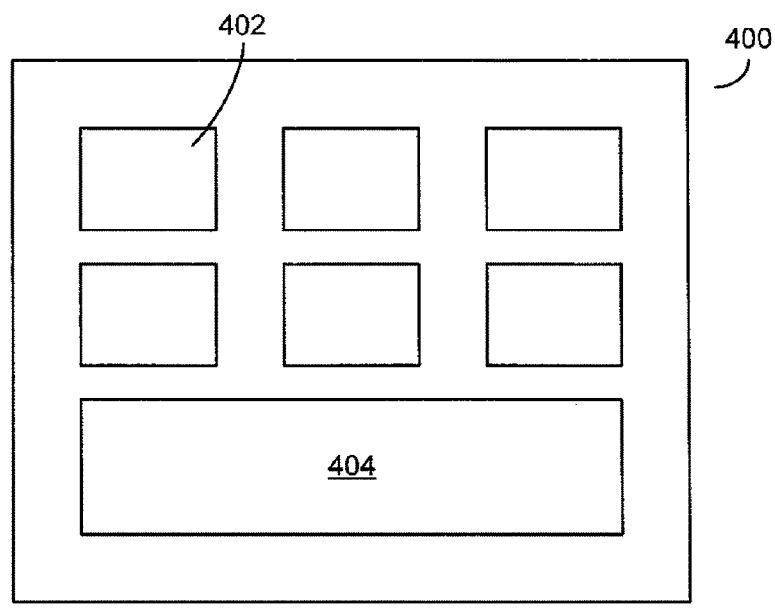
FIGS. 4A and 4B are examples of one way in which configurable circuits may be implemented in some embodiments, in which a configurable circuit includes a multi-core processor.

FIG. 4A illustrates a multi-core system 400. Each core of the multi-core system may process threads and execute instructions assigned to a thread in parallel to each yield results of the instructions. These results may be used individually or combined in some way to yield a result of a process to which the threads are related.

Figure 4B:
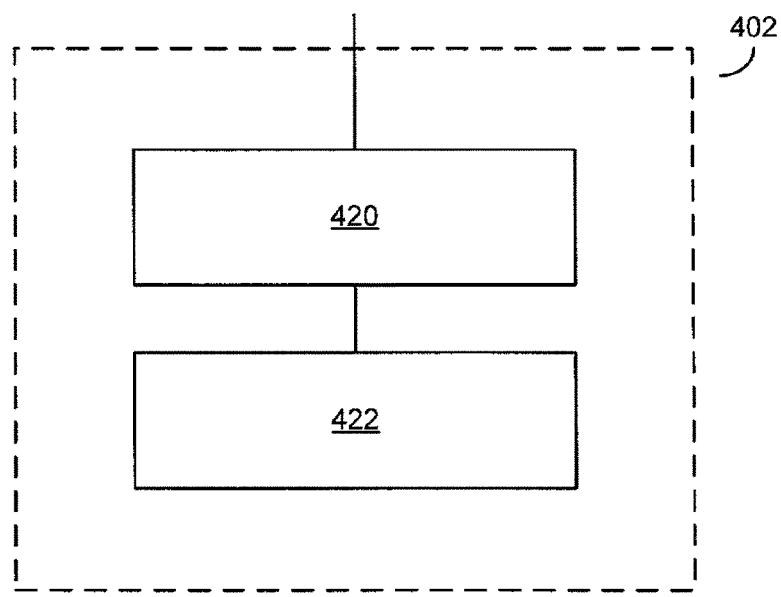

One of the cores of the multi-core system 400 is illustrated in FIG. 4B. Each of the cores 402 of the multi-core system may be used as a configurable circuit and a processing unit of a core may be configured as a processing unit of a configurable circuit to execute a thread that corresponds to a stochastic fragment. A thread may include instructions that may be executed by the core to generate samples from a probability distribution, to store the samples, to retrieve values for random variables executed by other threads (either on the same core or on other cores), and/or to alter a probability distribution based on samples generated and/or on values retrieved from other threads. Depending on a number of cores in the multi-core system and a number of stochastic fragments of a stochastic problem, many different threads may be executed in parallel on the multi-core system. For example, hundreds, thousands, hundreds of thousands, or even millions of threads may be executed in parallel at a same time or according to a sequence to each carry out operations related to a stochastic fragment of a stochastic problem, such that a stochastic problem may be solved in a massively parallel manner to reduce execution time.

A thread may be associated with an execution stack, and a core may be configured to solve a stochastic fragment when the execution stack is loaded into the core memory 420 (e.g., a cache memory and/or other types of memory accessible to a processing core). When a thread is adapted to carry out operations relating to a stochastic fragment, the execution stack may include information relating to current values of random variables and information relating to a probability distribution from which samples are to be drawn or any other suitable information. The processing unit 422 of the core 402 is adapted to retrieve instructions to execute and data to be processed from the core memory 420, execute the instructions, and to output values to the core memory 420.

The core 402 can be configured and reconfigured to execute different threads at different times. A management unit 404 can regulate which threads are assigned to which core, and can manage execution of threads on a core 402 to suspend execution of one thread, execute another thread, and then resume execution of the first thread. As threads can be implemented that act to solve a stochastic fragment, each act of assigning a thread to a core and executing the thread on the core to generate a sample corresponds to reconfiguring a configurable circuit and then operating the configurable circuit to generate a sample, as discussed above.

In one embodiment, the multi-core system of FIG. 4A is a multi-core processor. A multi-core processor may include multiple cores of full, modern complexity that include any suitable processing ability, one or more on-device caches, and one or more memory management units. Such cores of multi-core processors may also include calculation units adapted to perform 64-bit floating point operations. In other cases, the cores of a multi-core system may include cores that are adapted to perform instructions and store data with low precision and that have limited amounts of memory. The limited amount of memory may be implemented using a general purpose cache in a cache hierarchy in some implementations, or as a series of one or more registers in other implementations, or in any other suitable manner. Example of such multi-core processors are processors available from Tilera, Inc., and a picoArray available from PicoChip. These cores may not have memory management units or calculation units to perform floating point operations. As discussed above, while calculating a probability distribution can be a computationally-intensive task, generating samples from a probability distribution can be implemented in a way to be done in little time and using little resources. Accordingly, instructions can be created that allow a core with low precision and limited amounts of memory to generate samples from a probability distribution for a stochastic fragment.

In one example of a technique for using threads to process stochastic fragments, a Gibbs Sampling technique is chosen to solve a stochastic problem. The stochastic problem may be divided into multiple stochastic fragments such that each variable is assigned to one stochastic fragment. Each stochastic fragment, and thus each variable of the stochastic problem, is assigned to a thread, and each thread is assigned to a core. Each thread may include instructions to carry out part of a Gibbs Sampling process on a core.

For example, a thread, generating samples for one variable, may include an instruction to retrieve values for the last sample generated by each of the other threads, such that those values may be used in accordance with a Gibbs Sampling process to condition a probability distribution on those other values and generate a sample in accordance with that conditioned probability distribution. Accordingly, a core that is executing the thread may retrieve from one or more memories the last sample generated by each thread. Additionally, as samples are generated they may be written to memory and retrieved by one or more other processes. Samples may also be retrieved from memory by a process or thread that is not a part of the stochastic problem, but rather is using samples and results of the stochastic problem to make decisions. For example, if the Gibbs Sampling process is being used to solve a stochastic vision problem, samples may be retrieved by a process that is making decisions about how to move a robot based on locations of objects in a field of vision.

It should be appreciated, though, that Gibbs Sampling is only one example of a technique for solving a stochastic process and that any other suitable technique may be used and may be implemented in a number of threads on any number of cores.

Figure 5:
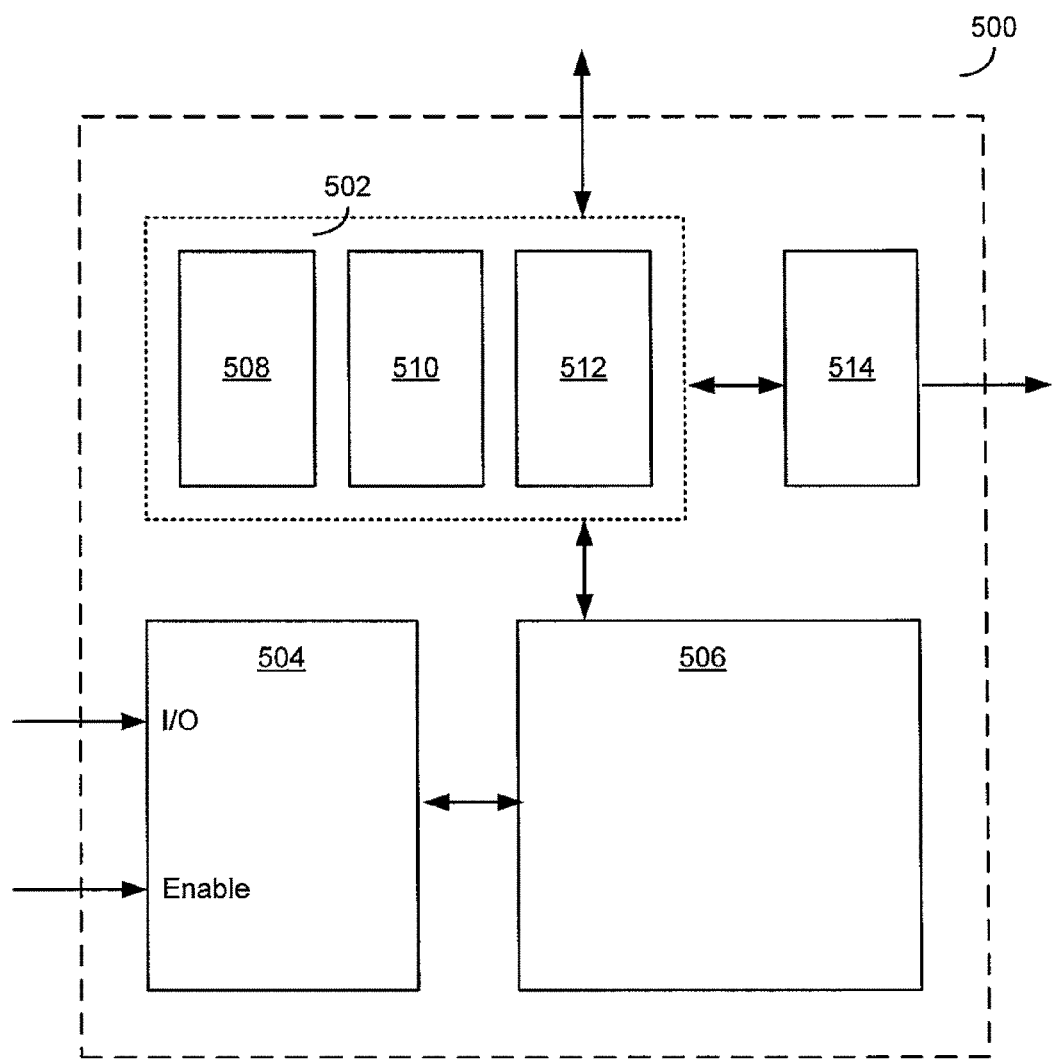
FIG. 5 is an example of one way in which a stochastic tile may be implemented in some embodiments.

Another example of a configurable circuit is illustrated in FIG. 5, with specific implementations of that configurable circuit illustrated in and discussed in connection with FIGS. 6A-6C.

The configurable circuit illustrated in FIG. 5 is implemented, in part, using stochastic circuitry as discussed in the '754 application cited above. As discussed in the '754 application, natively stochastic circuitry may be implemented that generates samples from probability distributions. Each stochastic circuit element operates on a source of randomness to generate a sample from a probability distribution, and multiple stochastic circuit elements may be combined in ways to yield other stochastic circuits and other probability distributions. For example, the '754 application includes descriptions of how to build stochastic circuits that sample from many different probability distributions based on combinations of stochastic circuits that sample from Bernoulli distributions. The '754 application also describes how to build circuits that implement various techniques for solving stochastic problems, including the Metropolis-Hastings algorithm and Gibbs Sampling algorithm.

The '754 application is incorporated by reference herein in its entirety, and at least for its description of creating stochastic circuits using combinations of stochastic circuit elements.

FIG. 5 illustrates a configurable circuit that is implemented as a stochastic tile 500 including a processing unit that includes a stochastic circuit 506. The stochastic circuit 506 may include circuitry to implement any particular technique for solving a stochastic problem and to sample from any particular probability distribution or type of probability distribution.

The stochastic tile 500 may be configured in any suitable manner to solve a stochastic fragment. In some cases, the stochastic tile 500 may be configurable by presenting different information to the stochastic circuit 506 for processing through the stochastic circuitry.

In some implementations of the stochastic tile 500, the stochastic circuit 506 may include a memory element to store information regarding probabilities. For example, the information regarding probabilities may include a Conditional Probability Table (CPT) that is stored in memory and that identifies probabilities for each of a set of possible values for a random variable. The information regarding probabilities may be used to generate samples from the stochastic circuit 506. Based on a particular set of input values, a probability value may be extracted from the memory element, and this probability value may be used to generate a sample in the stochastic circuit 506.

A stochastic tile 500 may include the ability to modify the information stored in the memory element of the stochastic circuit 506 and to modify the inputs provided to the stochastic circuit 506. By doing so, a probability distribution of the stochastic circuit 506 may be modified such that different samples are generated from different probability distributions. Changing a probability distribution in this way allows a stochastic circuit 506 to produce samples from different random variables, and as such allows a stochastic circuit 506 to be configured to solve different stochastic fragments and different stochastic problems.

The probability distribution may be changed in any suitable way, including according to any of the exemplary techniques described above. For example, one or more parameters of a probability distribution may be recalculated, so as to alter the probability distribution. In some cases, parameters may be used to configure (and reconfigure) predefined probability distributions, such as canonical probability distribution like a normal distribution or a poisson distribution.

The stochastic tile 500 includes a control circuit 504 that may operate to control the stochastic tile to begin and end processing stochastic fragments, according to input accepted by the control circuit 504 on an Enable signal line. The control circuit 504 may also act to control the stochastic circuit 506 to start and stop producing samples and to configure the stochastic circuit 506 by controlling information provided to the stochastic circuit 506. The information provided to the stochastic circuit 506 may include information that identifies and defines a stochastic fragment to be solved, a technique to be used in solving the stochastic fragment, and a probability distribution from which samples are to be drawn (as well as any other types of information described above that may be used by a configurable circuit). The information to be provided to the stochastic circuit 506 may be stored in a memory 502 of the stochastic tile 500.

The memory 502 may store different types of information. FIG. 5 illustrates the memory 502 storing three types of information in three sections of a memory 502, though it should be appreciated that any type(s) of information may be stored in any suitable structure and arrangement. Memory element 502 includes a store 508 of variables, including information related to samples drawn from a probability distribution by the stochastic circuit 506 and other information related to variables. Memory element 502 also includes a store 510 of remote variables, including information about samples from other stochastic tiles that are solving other stochastic fragments. Memory 502 also includes a store 512 of density information, which may include information about probability distributions from which samples are to be drawn by the stochastic circuit 506. The control circuit 504 may control how this information is retrieved from the memory 502 and presented to the stochastic circuit 506.

In some implementations, memory 502 may store information regarding multiple stochastic fragments, such that control circuit 504 can control the stochastic circuit 506 to generate samples for each of multiple stochastic fragments over time by providing information to the stochastic circuit 504 that is related to each stochastic fragment. For example, the control circuit 504 may, at a first time, cause the information related to a first stochastic fragment to be provided to the stochastic circuit 506 from the memory 502 and, at a second time, cause the information related to a second stochastic fragment to be provided to the stochastic circuit 506. The control circuit 504 may operate in any suitable manner to select which stochastic fragment to be provided to the stochastic circuit 506. For example, the control circuit 504 may operate to provide information about stochastic fragments in a pre-set order or according to a random selection, or in any other suitable manner. In some embodiments, the control circuit 504 may be configurable with techniques for how to provide information about stochastic fragments to the stochastic circuit 506.

Additionally, when memory 502 stores information regarding multiple stochastic fragments, including a current value of random variables for each stochastic fragment, the memory 502 may act to provide to the stochastic circuit 506 the current values for each random variable. These values may be provided in response to control from the control circuit 504.

As illustrated in FIG. 5, a stochastic tile 500 may also include an input/output control circuit with which values from other stochastic tiles are retrieved and with which values from the memory 502 are transmitted to other stochastic tiles in response to queries from other stochastic tiles.

Figure 6A:
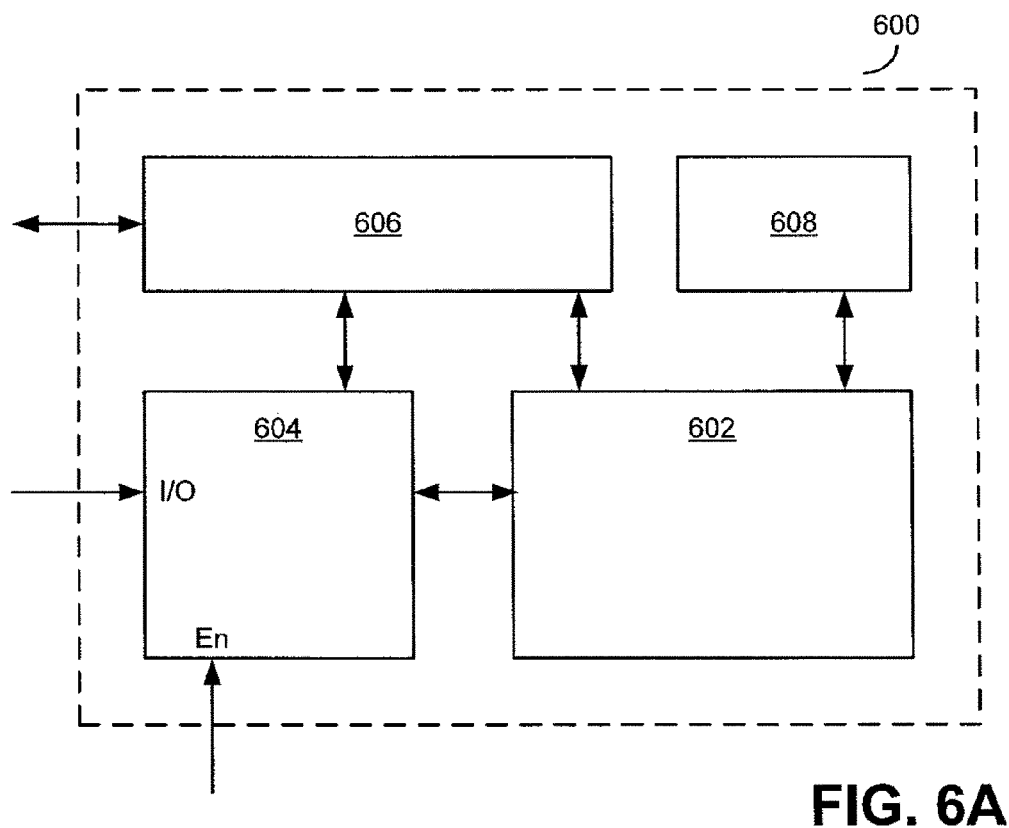
FIG. 6A is an example of a stochastic tile configured to implement a Gibbs Sampling algorithm that may be implemented in some embodiments.

FIG. 6A shows a particular implementation of the stochastic tile as a Gibbs tile 600 implementing a Gibbs Sampling algorithm. The Gibbs Tile 600 includes a Gibbs unit 602 that is configurable according to control by a control circuit 604. The Gibbs unit 602 is adapted to execute a Gibbs Sampling algorithm according to input that is provided to the Gibbs unit 602, but can be configured to apply the Gibbs Sampling algorithm to any of multiple stochastic fragments according to the control by the control circuit 604. As discussed above in connection with FIG. 5, the control circuit 604 may control what information is provided to the Gibbs unit 602 such that the Gibbs unit 602 can be configured to solve different stochastic fragments. The control circuit 604 may therefore control variable information provided from a variable memory 606 as well as probability distribution information from a density memory 608.

Figure 6B:
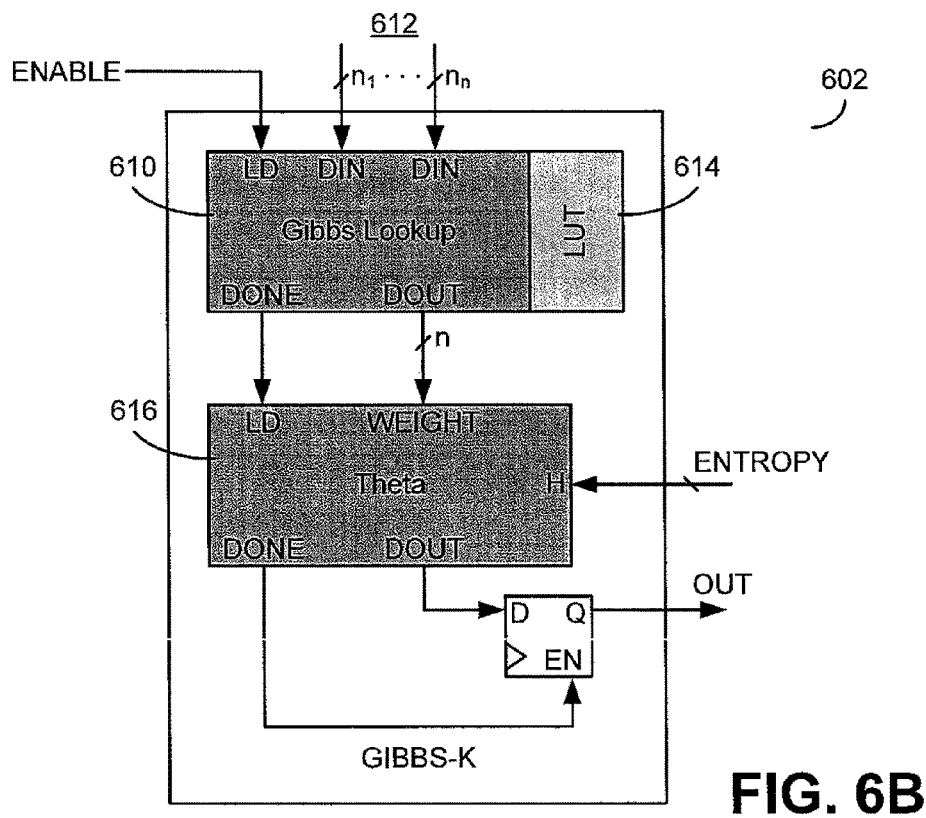
FIG. 6B is an example of a stochastic circuit that may be implemented in some embodiments as part of a stochastic tile.

FIG. 6B illustrates one potential implementation of a Gibbs unit 602. The Gibbs unit 602 of FIG. 6B includes a Gibbs lookup unit 610 that accepts multiple inputs 612 as well as a memory element storing a look-up table (LUT) 614. As discussed in the '734 application, when a number of variables to be sampled using Gibbs Sampling is relatively small, efficiency can be gained by precomputing a conditional probability table (CPT) for the variables. The CPT can include, for all permutations of the variables, a probability associated with that state. The CPT can then be stored as a look-up table, indexed according to the values of the variables.

Each of the inputs 612 to the Gibbs lookup unit 610 corresponds to a value of a variable of the LUT 614. Based on a specific set of inputs 612, the Gibbs lookup unit 610 retrieves the corresponding probability from the LUT 614 and outputs that probability to the Bernoulli gate 616.

The Bernoulli gate 616 may then use that probability to generate a sample from that probability distribution based on a source of randomness. This sample may then be output from the Bernoulli gate 616 and from the Gibbs unit 602.

When the Gibbs unit 602 of FIG. 6B is implemented in the Gibbs tile 600, the control circuit 604 can configure the Gibbs unit 602 for different stochastic fragments by controlling what variables are provided on inputs 612 and what look-up table 614 is provided to the Gibbs lookup unit 610. Variable information to be provided on inputs 612 may be provided from the variable memory 606 and a look-up table may be provided from the density memory 608. Samples output from the Gibbs unit 602 may then be stored in the variable memory 606.

The Gibbs tile 600 can be controlled by the control circuit 604 to solve multiple different stochastic fragments, as discussed above in connection with the stochastic tile 500 of FIG. 5. The variable memory 606 can store information regarding variables for multiple stochastic fragments and the density memory 608 can store information regarding probability distributions for multiple stochastic fragments. The control circuit 604 can then control the provision of information regarding specific stochastic fragments to the Gibbs unit 602, such that the Gibbs unit 602 is configured and reconfigured to solve different stochastic fragments.

Figure 6C:
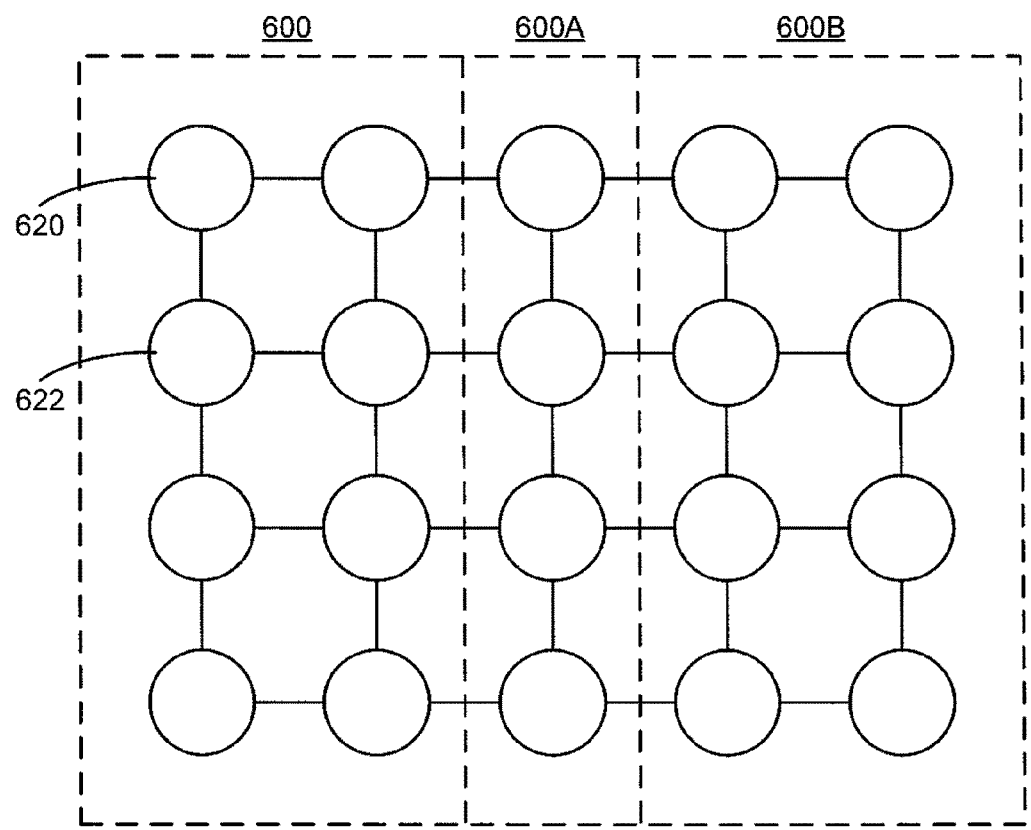
FIG. 6C is an example of one technique for assigning stochastic fragments to stochastic tiles of an array of stochastic tiles, that may be implemented in some embodiments.

Stochastic fragments can be assigned to a stochastic tile in any suitable manner FIG. 6C shows one example of a way to assign stochastic tiles based on analysis of variables using an MRF. As discussed above, in some implementations a graph may be received as input or calculated that describes a stochastic problem. Each node of the graph may then be identified as a stochastic fragment.

Stochastic fragments, corresponding to nodes in the graph, may then be assigned to stochastic tiles in any suitable manner As discussed above in connection with FIG. 1, in some cases an assignment may be carried out to reduce an amount of information exchanged between stochastic tiles or an amount of information to be stored in a memory, or to reduce a likelihood of conditionally-dependent stochastic fragments being calculated at a same time. As also discussed above, in some cases, the assignment may be carried out in connection with a desired accuracy or precision with which each stochastic fragment or a stochastic problem is to be solved. FIG. 6C shows an assignment based on a geometric proximity in the graph, but it should be appreciated that embodiments are not limited to assigning based on geometric proximity or in any other manner.

FIG. 6C illustrates an MRF that has multiple nodes, including nodes 620 and 622. In the example of FIG. 6C, each of the nodes is identified as a stochastic fragment, and each is assigned to a stochastic tile. Eight nodes, including nodes 620 and 622, are assigned to stochastic tile 600, as illustrated. Four nodes are assigned to a stochastic tile 600A, and eight nodes are assigned to a stochastic tile 600B.

When multiple stochastic fragments are assigned to the Gibbs tile 600, the memories 606, 608 may store information related to each of the stochastic fragments. The control circuit 604 may cause the Gibbs unit solve each of the stochastic fragments in a sequence. In the context of the graph of FIG. 6C, the Gibbs unit may be controlled to "slide around" the graph by providing information regarding each of the stochastic fragments in a sequence. The sequence may be deterministic, such as right-left-top-down in the graph or any other preestablished sequence, or may be stochastic, such as a random selection of a next fragment/node.

The connections in the graph of FIG. 6C illustrate a dependence between variables. In the case of dependence between variables, a Gibbs Sampling process performed on any one of the variables will take into account a present value for each of the other variables on which that variable depends. In the context of the Gibbs tile 600, that may include the control circuit 604 performing a control to provide current values for each of the stochastic fragments associated with those nodes (either on a same Gibbs tile or on a separate Gibbs tile) to the Gibbs unit 602 for use in performing a look-up in the look-up table.

In some stochastic problems that have a graph having a homogeneous topology, with each node having a same type and number of connections as all other nodes, providing the current values of other variables may be straightforward. For each stochastic fragment, a similar control is performed and a same number of values is provided.

In other stochastic problems, though, not all nodes may have a same number of type of connections. In the example of FIG. 6C, for example, the node 620 in the top left corner of the graph has only two connections to other nodes, and the node 622 has three connections to other nodes, while other nodes have four connections to other nodes. Similarly, some other stochastic problems may have variables that have many dependencies on many other variables while other variables have few or no dependencies.

A control circuit 604 may act to account for these differences in a number of values that will be provided. In some cases, design choices in the circuitry of the Gibbs unit 602 (e.g., a number of registers, or a number of inputs, on which proper look-up depends) may require that some data be provided. In one such case, a particular junk value may be provided as an indicator that a value is not real and is only a placeholder for a non-existent dependency. In other cases, any junk value may be provided, but an additional control may be performed or extra command sent that indicates that some junk values exist that are not to be considered or that are not to be used. In other cases, a control may be exercised to notify the Gibbs unit 602 of a number of variables to expect and then only those variables may be provided. Any suitable technique may be used to provide information on dependent variables to the Gibbs unit 602.

Based on the information on the dependent variables, a probability distribution for a stochastic fragment may be altered for the Gibbs unit 602. The alteration may be carried out according to any of the exemplary techniques described above, such as selecting a different probability distribution or changing parameters of a probability distribution. Where a different probability distribution is selected, in some implementations a different circuit may be used to provide a sample. In some such implementations, each stochastic tile may include a plurality of circuits that are each adapted to generate samples from probability distributions. When one of the circuits is selected, the circuit may be parameterized based on information on the dependent variables to produce a sample from a desired probability distribution.

As discussed above, the stochastic tile of FIG. 5 may be used to implement may different techniques to solve stochastic problems. The implementation of FIG. 6 shows the stochastic tile configured to solve a stochastic problem using Gibbs Sampling, by replacing the stochastic circuit 504 with a Gibbs unit 602. Stochastic tiles may be implemented with other techniques similarly. For example, the '754 application cited above describes a Metropolis-Hastings unit that may be used to produce samples according to a Metropolis-Hastings algorithm. A stochastic tile may be implemented that includes a stochastic circuit implemented as the Metropolis-Hastings unit, such that the stochastic tile implements the Metropolis-Hastings algorithm. The stochastic tile may also be able to configure the Metropolis-Hastings unit, as discussed above in connection with the Gibbs Sampling unit. As another example, the '754 application cited above describes an Importance sampling unit that may be used to produce samples according to an Importance sampling algorithm. The Importance sampling unit may be implemented as a stochastic circuit in the stochastic tile, and configured as discussed above. As a further example, a Metropolis-Hastings unit may be implemented along with an Importance sampling unit. In this implementation, the Importance sampling unit may be used as a hardware component associated with a probability distribution, and the Metropolis-Hastings unit may interact with the Importance sampling unit, using the Importance Sampling unit as a proposal distribution in accordance with that method. Both the Metropolis-Hastings unit and the Importance sampling unit may be configured when the stochastic tile is configured, during one iteration, to solve a stochastic fragment.

In each of the examples of stochastic tiles described above, each stochastic tile was described as including one stochastic circuit to generate samples from a probability distribution. It should be appreciated, though, that this is only one implementation and that others are possible. For example, in another implementation two or more stochastic circuits may be implemented, and a control circuit may control each and control the provision of information to each to generate samples for a stochastic fragment.

As discussed above, a configurable circuit can also be implemented as, or include, a stochastic memory. A stochastic memory may operate to accept as input and store information about observations related to a stochastic problem or stochastic fragment and to produce as an output, upon request, a sample from a probability distribution conditioned on the observations. The stochastic memory may also be adapted, as discussed below, to delete a previously-stored observation, such that the probability distribution is no longer conditioned on the observation.

In some implementations, a stochastic memory may be adapted to implement exchangeable random process techniques, and to accept input regarding observations and produce samples in such a manner so to implement an exchangeable random process. Exemplary techniques for implementing a stochastic memory according to exchangeable random processes are discussed below. Though, it should be appreciated that not all stochastic memories are limited to implementing an exchangeable random process, and that stochastic memories may implement other techniques.

Figure 7:
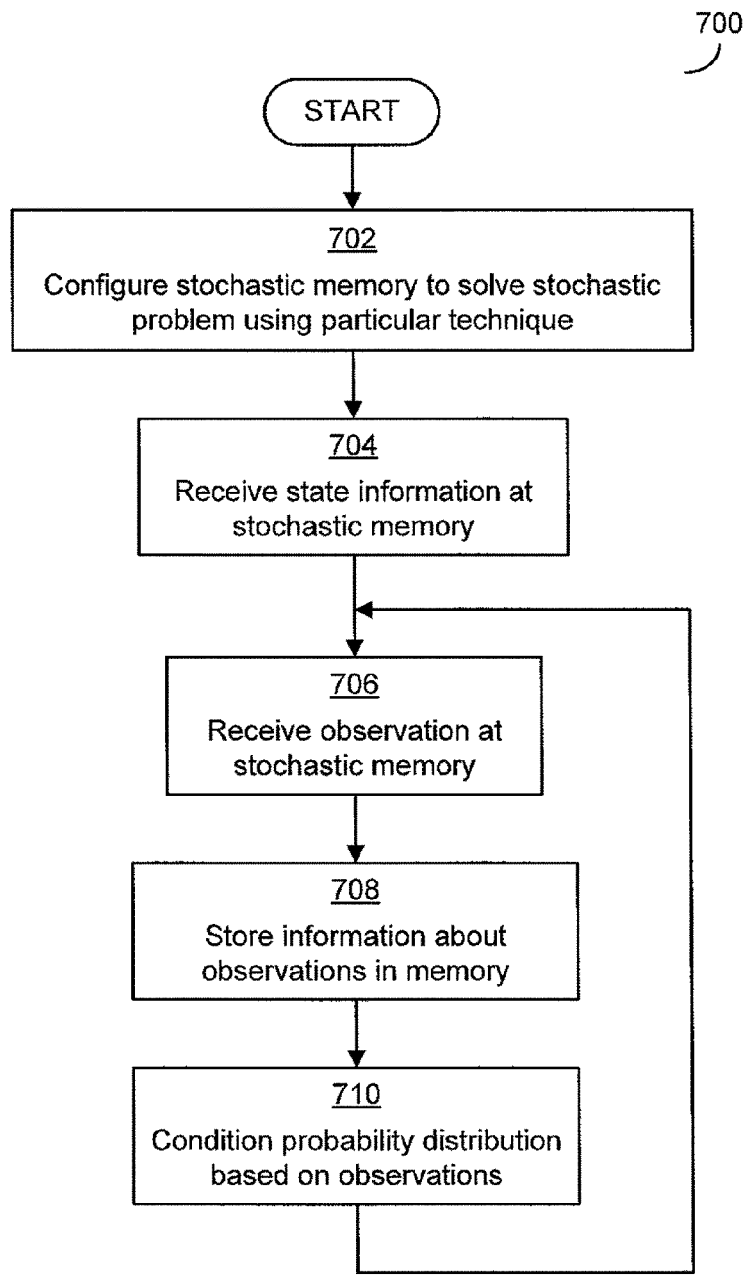
FIG. 7 is an example of one process for operating a stochastic memory to condition a probability distribution based on input values that may be implemented in some embodiments.

A process for operating a stochastic memory to produce samples from a probability distribution conditioned on prior observations is illustrated in FIG. 7. It should be appreciated, though, that the process 700 of FIG. 7 is merely exemplary and that other processes are possible.

Process 700 begins in block 702, in which a stochastic memory is configured to solve a stochastic problem and is configured to use a technique for solving the stochastic problem. The configuring of block 702 may be done in hardware and/or software. If the configuring is done in hardware, then particular circuits and other structures may be incorporated into a stochastic memory, such that the stochastic memory performs the technique by operating the circuits to solve the stochastic problem. The circuits may include circuits to store particular values for a stochastic problem and/or to perform particular operations for the technique for solving the stochastic problem. If done in software, then the configuring of block 702 may include providing particular data to the stochastic memory for the stochastic memory to use in solving the stochastic problem. For example, instructions that implement a technique for solving a stochastic problem and information describing the stochastic problem (including any suitable information describing a stochastic problem described above) may be provided to the stochastic memory. In some cases, both hardware and software may be used to configure the stochastic memory, such as where a stochastic memory includes circuits implementing a particular technique and receives as input information describing a particular stochastic problem to be solved.

In block 704, state information describing a state to be adopted by the stochastic memory is received as input and used to configure the stochastic memory. A state of a stochastic memory may describe values that are to be taken by one or more random variables of the stochastic memory, one or more probability distributions for the random variable(s), previously-observed values for the random variable(s), or other suitable information. The state information may include parameters for the technique with which the stochastic memory is configured in block 702. For example, if a clustering technique such as the Chinese Restaurant Process (CRP) is used, then one parameter may be a probability of assigning an element to a new cluster instead of an existing cluster. State information may also include default probability distributions or default values that may be taken by random variables and that may be edited or added to during operation of the stochastic memory. Any information that may be stored or processed by a stochastic memory may form a part of a state of a stochastic memory. The state information received as input in block 704 may be used to initialize a stochastic memory such that future operations of the stochastic memory may adjust that state. Alternatively, state information may comprise information on changes to be made to one or more parts of a state (e.g., one or more variables or probability distributions) in such a way as to adjust a state of the stochastic memory to another state. Any suitable information may be input as state information.

In block 706, an observation is input to the stochastic memory and, in block 708, the observation is recorded and a state of the stochastic memory is adjusted. Any suitable information may be used to provide an observation as input, and may vary based on a technique that is implemented in the stochastic memory and information stored in connection with the technique. For example, if a stochastic memory is storing information regarding multiple random variables, and an observation is related to one of the multiple random variables, then a parameter that is input to store the observation (and that would be input for other operations connected to observations described below, such as a remove operation) would include be an identification of a random variable to which the observation relates.

An observation may be a value related to a random variable, such as a value that has been taken by the random variable. Information that is known about a random variable may be used to change a probability distribution that describes the random variable. For example, many stochastic problems are aimed at determining a true probability distribution for a variable based on repeated testing. As more tests are performed and more observations are made, a probability distribution that is describing the stochastic problem may be adjusted to be made more accurate based on the observations. Accordingly, in block 708, information about the observations received as input in block 706 may be stored in the stochastic memory and used to adjust the probability distribution.

The information describing the observation may have been input from any suitable source. In some cases, the observation may be a sample previously output from the stochastic memory in the manner described below. In other cases, the observation may be a sample of another random variable generated by another stochastic memory. In other cases, the observation may have been a value created randomly as part of solving the stochastic problem. Observations may be generated in any suitable manner.

The manner in which a new observation is stored may vary based on the stochastic problem and/or the technique for solving the stochastic problem with which the stochastic memory is configured. For example, for some stochastic problems and techniques, a value of each observation may be stored in memory. For other stochastic problems and techniques, a count of each values may additionally or alternatively be stored in memory. For other problems and techniques, a total count of observations may additionally or alternatively be stored. In accordance with some techniques for solving a stochastic problem, one or more operations may be performed on the observations and information from these operations may be stored. For example, for a Chinese Restaurant Process, when an observation is accepted as input an operation may be carried out in accordance with that technique to assign the observation to a group of observations. A number of observations assigned to each group may then be stored by the stochastic memory. Though, any suitable operation may be performed in accordance with a technique for solving a stochastic problem, and any suitable information may be stored as a result of such operations.

A stochastic memory may be used to simulate an exchangeable random process by, over a plurality of iterations, sampling to produce a value and incorporating the value into the stochastic memory. When the value is incorporated into the stochastic memory, the sample may become one of a set of observations on which a probability distribution is conditioned. A value may be incorporated into the stochastic memory in any suitable manner, including using deterministic control circuitry in the stochastic memory or using control software in a computer connected to the stochastic memory.

In this way, a stochastic memory may model a process of sampling from a sequence of conditional distributions, where a final value is drawn from a joint distribution. Where three observations (labeled here $X_1$, $X_2$, $X_3$) are incorporated into the memory, this can be written mathematically as $P(X_1,X_2,X_3)=P(X_1)P(X_2|X_1)P(X_3|X_2,X_1)$.

Operating a configurable circuit in this way enables the use of techniques for producing samples from a posterior distribution on an exchangeable sequence (or from a posterior distribution over a space that includes the exchangeable sequence)

In block 710, after a probability distribution has been conditioned based on the observations received as input in block 706, one or more samples are generated from the probability distribution and output from the stochastic memory.

After the sample is generated in block 710 and output, the process 700 returns to block 706, where another observation is input and used to condition the probability distribution.

Figure 8:
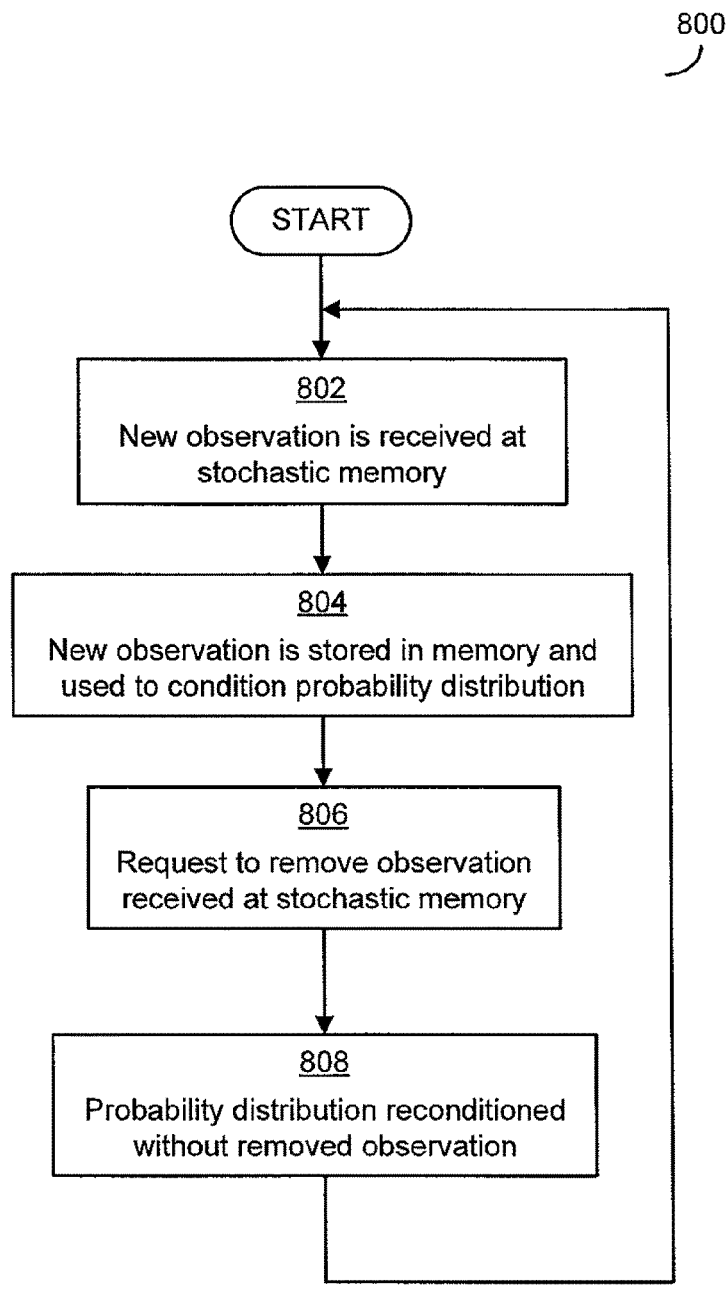
FIG. 8 is an example of one process for operating a stochastic memory to produce samples from a probability distribution condition on input values that may be implemented in some embodiments.

The process 700 discussed above described adjusting a probability distribution and generating samples based on adding new information describing observations to the stochastic memory. Some embodiments of a stochastic memory may also permit the removal of values from a stochastic memory. FIG. 8 illustrates one process that may be used for removing values from a stochastic memory.

Process 800 begins in block 802. Before block 802, the stochastic memory has been configured and/or state information has been accepted as input, including according to techniques described above in connection with blocks 702 and 704 of FIG. 7. In block 802, a new observation is received as input at the stochastic memory. In block 804, the new observation is stored in memory and is used to condition a probability distribution, as discussed in connection with process 700 of FIG. 7 or in any other suitable manner Samples may be generated according to the probability distribution that is conditioned on the observation.

In block 806, input is received at the stochastic memory requesting that one or more particular observations be removed from consideration, such that the probability distribution is no longer conditioned on those observations. The input may identify the one or more particular observations in any suitable manner, including by value and/or by an indexing value.

In block 808, the stochastic memory, in response to a request to remove an observation, may perform one or more operations to delete the observation from memory and/or adjust other values stored by the stochastic memory. Any suitable operations may be carried out to adjust other values, and the operations that are performed may vary based on the stochastic problem and/or the technique for solving the stochastic problem. For example, if a total number of observations is stored by the stochastic memory, when an observation is removed the total number of observations may be decremented. Other values may be similarly changed when an observation is removed. Any operations performed when an observation is added may be performed in reverse or rolled-back when an observation is removed.

Just as the probability distribution was changed in block 804 in response to an observation being added, the probability distribution is changed in block 808 not to be conditioned on the observation. Samples may then be generated from the probability distribution in any suitable manner. The process 800 may return to block 802 to continue accepting new observations as input and removing previously-stored observations.

It should be appreciated that any suitable circuitry and/or other hardware may be used as a stochastic memory. One exemplary embodiment of a stochastic memory is illustrated in FIG. 9.

Figure 9:
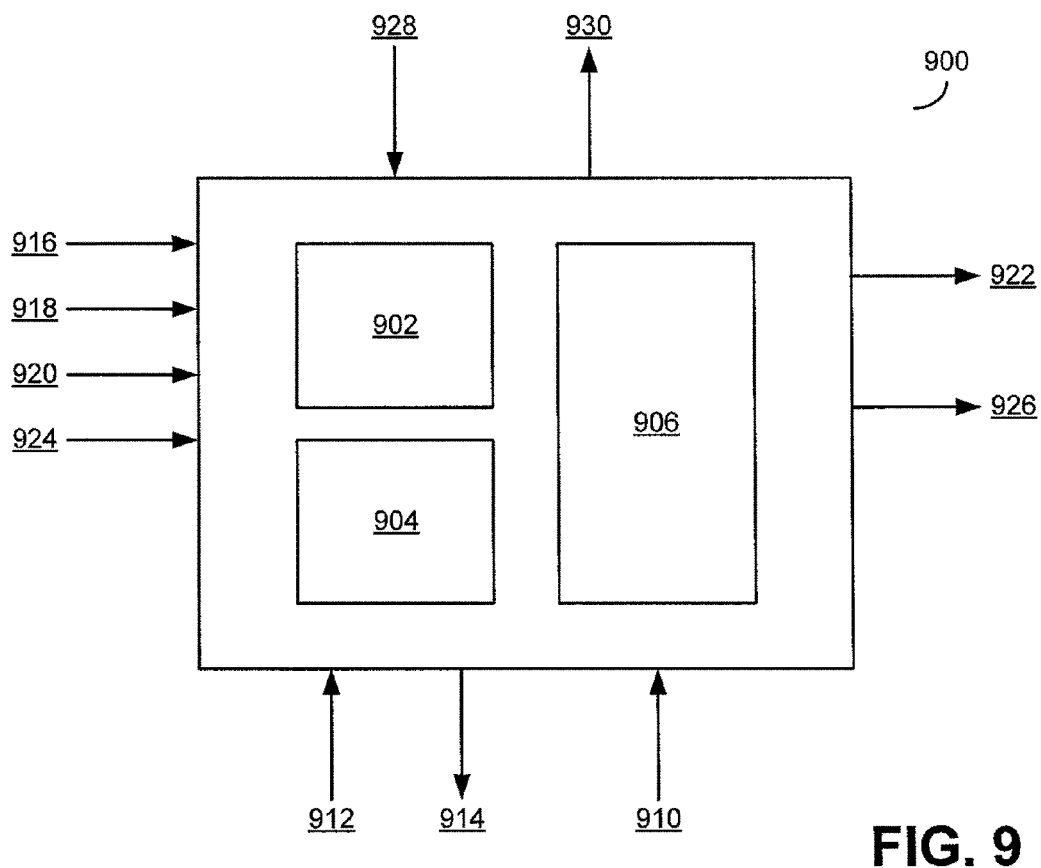
FIG. 9 is an example of a way in which a stochastic memory may be implemented in some embodiments.

The stochastic memory 900 of FIG. 9 can be configured in hardware and/or in software to solve a stochastic problem using a technique for solving a stochastic problem. For example, a Chinese Restaurant Process algorithm or a Beta-Bernoulli process may be implemented in hardware and/or in software in the stochastic memory. The stochastic memory 900 may then store and manage information that may be used to solve a stochastic problem using that information.

The stochastic memory 900 includes a memory 902 and a stochastic circuit 904. The stochastic circuit 902 may include any suitable arrangement of stochastic circuit elements, including any suitable arrangement described in the '754 application. The arrangement of stochastic circuit elements in the stochastic circuit 904 may include an arrangement to implement a technique for solving stochastic problems. The memory 902 may store information related to the technique, including information on variables related to the technique. The memory 902 may also store information related to a particular stochastic problem with which the stochastic memory 900 is configured, including information on observations that have been input to the stochastic memory 900 and/or values that have been calculated based on those observations. The information on observations or values may be information that could be used to calculate a probability distribution based on the observations on values. In some cases, the information may be the sufficient statistics that are known for each type of probability distribution or technique for solving a stochastic problem, or that may be derived by one of ordinary skill in the art when identifying a stochastic problem to be solved using a technique. Where information on sufficient statistics may be stored, any other suitable information may be additionally stored.

Stochastic memory 900 may also include a control circuit 906. The control circuit 906 may act to control operations of the memory 902 and/or stochastic circuit 904 in response to instructions received on one or more input lines or on data received on the one or more input lines. For example, the control circuit 906 may act, as described below, to store a received observation in the memory 902 and update one or more other values stored in the memory based on the received observation. The control circuit 906 may also act, as described below, to operate the stochastic circuit 904 to produce a sample from a probability distribution.

The stochastic memory 900 can be configured to implement a technique for solving a stochastic problem or to solve a particular stochastic problem by accepting state information on input leads 910. The state information may indicate any suitable information about one or more states that the stochastic memory 900 will take, including information about a current state that the stochastic memory 900 may take. Based on the state information, the stochastic memory 900 may be configured to operate in a state, according to values to be taken for variables stored by the memory 902, probability distributions from which samples will be generated for the variables and/or for the stochastic problem with which the stochastic memory 900 is configured, parameters for the technique with which the stochastic memory 900 is configured, and other information. The states and/or the transitions may be defined by the state information received on the input lines 902.

The state information may be received during an initialization phase for the stochastic memory 900, when the stochastic memory 900 is first being configured to solve a stochastic process. The state information may additionally or alternatively be received at another time, to force the stochastic memory 900 to operate in a state identified in the state information.

State information may also be input to the stochastic memory 900 to change a state of the stochastic memory 900 during operation of the stochastic memory 900. For example, if the stochastic memory 900 is solving a stochastic problem in parallel with other stochastic memories, then the stochastic memory 900 may be synchronized with those other stochastic memories during processing of the stochastic problem. State information accepted on input lines 902 may, in such a case, be a state of another stochastic memory or be a state calculated based on states retrieved from other memories, such as average values for properties of the state or values to be stored in memory 902.

State information may also be output from the stochastic memory 900. Upon request on an input line 912, the stochastic memory may retrieve information regarding a state of the stochastic memory 900, including any of the exemplary types of information above, and output that information on the output line 914.

State information that defines one or more states may include any suitable information, and may vary based on a stochastic problem that the stochastic memory 900 is adapted to solve and/or a technique that the stochastic memory 900 is adapted to use to solve the stochastic problem. For example, some stochastic problems may include only one random variable, and state information may include potential values for that one random variables, while other stochastic problems may include multiple random variables, and state information in those cases may include potential values for each.

The stochastic memory 900 may also accept on input leads 916 information describing one or more observations about the stochastic problem the stochastic memory is configured to solve. These observations may be stored as state information and/or used to transition the stochastic memory to one or more other states. Any suitable information about a stochastic problem may be an observation and may be accepted as input and stored by a stochastic memory. For example, the stochastic memory 900 may accept on input leads 916 information about one or more values that have been taken by a random variable of the stochastic problem and/or taken by other random variables to which the stochastic problem relates (e.g., random variables of other stochastic fragments of a stochastic problem).

As discussed above in connection with process 700 of FIG. 7, when accepted as input on the input leads 916, information about one or more observations may be stored by the stochastic memory in any suitable manner. The manner in which the information may be stored may be based on the technique for solving the stochastic problem with which the stochastic memory is configured.

In some embodiments, accepting information regarding an observation may be only one type of input that the stochastic memory 900 is adapted to receive. In such embodiments, then, the stochastic memory 900 may be adapted to receive a command instructing the stochastic memory that information regarding an observation is to be input. This command may correspond to an "Include" operation to be carried out by the stochastic memory 900, to include the observations in the sampling performed by the stochastic memory 900. In some cases, the command may be a sequence of data received on the input lines 916, such as an operation code ("opcode") indicating that observations are to be input. The opcode may be accompanied by one or more pieces of information regarding observations that are parameters relating to a function identified by the opcode. In other cases, one of the input lines 916 may correspond to an "enable" line that indicates that an include operation is to be carried out based on values on other data lines of the input lines 916. Any suitable technique may be used to indicate that information regarding observations is to be input to the stochastic memory 900.

A stochastic memory 900 may also be adapted to accept input describing one or more observations that the stochastic memory 900 should remove from storage, such that the probability distribution is no longer conditioned on those values. Information about one or more observations to be removed from memory may be accepted on input leads 918. The information about observations to be removed may be formatted in any suitable manner. In some implementations, information about a remove may include a specific value to be removed from memory, and the stochastic memory 900 may locate that value in memory and remove the value. In other implementations, an index value or other identifier for a value may be accepted as input and used to locate and remove a value. Any suitable input may be accepted describing a remove operation.

As should be appreciated from the discussion above in connection with including information about observations in a memory, any suitable information may be stored in connection with an observation. Accordingly, any suitable operations may be carried out to remove an observation from memory. In some cases, an operation may be carried out to delete a value from memory corresponding to an observation. In other cases, a counter variable may be decremented, to correspond to a removed observation. In other cases, an operation may be performed to recalculate one or more other values based on an observation being removed. Operations that may be carried out may vary based on the technique for solving a stochastic problem implemented by the stochastic memory 900 and/or the stochastic problem that the stochastic memory 900 is adapted to solve.

As discussed above in connection with accepting input describing one or more observations to be included in a probability distribution, information about an operation to remove observations may be accepted in any suitable manner. In some implementations, a command may be input to the stochastic memory 900 corresponding to a "Remove" operation to be carried out. In some cases, the command may be a sequence of data received on the input lines 918, such as an operation code ("opcode") indicating that observations are to be removed. The opcode may be accompanied by one or more pieces of information regarding observations that are parameters relating to a function identified by the opcode. In other cases, one of the input lines 918 may correspond to an "enable" line that indicates that a remove operation is to be carried out based on values on other data lines of the input lines 916. In the latter case, where an enable line and data lines are used, the data lines may be shared with data lines corresponding to one or more other operations, such as the "Include" operation discussed above. Any suitable technique may be used to indicate that information regarding observations is to be input to the stochastic memory 900.

In response to information about observations being input to or removed from the stochastic memory, one or more pieces of information related to a probability distribution for the stochastic problem may be calculated and stored.

When observations are input to the stochastic memory 900 or are removed from the stochastic memory 900, one or more operations may be carried out based on the observations. For example, data of the observations themselves may be stored in memory 902 or removed from memory 902. As another example, one or more calculations may be performed to store a value in memory 902 or update a value stored in the memory 902. As discussed above, the memory 902 may be configured to store sufficient statistics for a probability distribution and/or technique for solving a stochastic problem. These sufficient statistics may be calculated based on observations input to the stochastic memory 900.

As discussed above, a stochastic memory 900 may be operated to store input regarding observations for a stochastic problem and to produce as output a sample from a probability distribution conditioned based on the observations. Accordingly, the stochastic memory 900 may also include an output line 922 at which samples from the probability distribution are produced. In some embodiments, the samples may be produced continuously, such that a sample may be read from the output line 922 at any time. In other embodiments, a sample may be produced at the output line 922 in response to a request for a sample received on an input line 920. The request for a sample may be received in any suitable manner, including according to a sequence of data corresponding to, for example, an opcode for a "Sample" operation or according to a value on an enable line corresponding to a sample operation.

In some implementations, once a sample has been generated by the stochastic memory, that sample may be stored and used to condition the probability distribution on that sample/observation. In other implementations, the sample may be output and not stored, and only observations accepted as input may be stored. This may allow samples to be processed and accepted or rejected before the probability distribution is conditioned based on those samples, as may done in connection with some techniques for solving a stochastic problem (e.g., rejection sampling). In some cases, a sample may be output from the stochastic memory 900, processed by another process or component, and then accepted as input at the stochastic memory 900 to be stored.

A stochastic memory 900 may also be operated to output a probability of a particular sample being generated, based on the probability distribution. The stochastic problem with which a stochastic memory 900 is configured may have a random variable that is able to take one of a plurality of values. The probability distribution for the stochastic problem describes a probability that the random variable will take each of those values. This value may be produced as an output from the stochastic memory based on an input received at the stochastic memory 900.

A stochastic memory may accept on an input line 924 a value for which a probability is to be output. As discussed above, input may be provided to the stochastic memory in any suitable manner. For example, a command may be input to the stochastic memory corresponding to a "Probability" operation to be carried out. In some cases, the command may be a sequence of data received on the input lines 924, such as an operation code ("opcode") indicating that a probability is to be generated. The opcode may be accompanied by one or more pieces of information regarding values that are parameters relating to a function identified by the opcode. In other cases, one of the input lines 924 may correspond to an "enable" line that indicates that a probability operation is to be carried out based on values on other data lines of the input lines 924. In the latter case, where an enable line and data lines are used, the data lines may be shared with data lines corresponding to one or more other operations, such as the "Include" and "Remove" operations discussed above. Any suitable technique may be used to indicate that information regarding observations is to be input to the stochastic memory 900.

Regardless of how the input is provided, when the input is provided to the stochastic memory 900 requesting that a probability corresponding to a value be output, the probability may be calculated by the stochastic memory 900. The calculated probability may then be output on the output line 926.

The probability that is output may be any suitable probability, including a normalized probability, an unnormalized probability, and/or a logarithmically-scaled probability. In some implementations, the stochastic memory may be configured to produce a particular type of probability. In other implementations, a portion of the input provided to the stochastic memory 900 that requests that a probability be generated and output may identify a type of probability to be generated and output.

As discussed above in connection with FIG. 7, in some embodiments a stochastic memory 900 may store in the memory 902 information regarding multiple different random variables or multiple stochastic fragments of a stochastic problem. In such embodiments, when data and/or instructions are provided to the stochastic memory 900 (e.g., via an input, remove, sample, or probability operation), an indication of which variable or stochastic fragment may be provided as a parameter of the operation. The indication may be any suitable indication or identifier for the variable or fragment, including a numeric value corresponding to a value assigned by the stochastic memory 900 or a name of a variable.

A stochastic memory 902 may also include a probability accumulator 930 to output an accumulated probability across the random variables stored in the stochastic memory. The accumulated probability may be a joint probability for all information stored in the memory, by calculating a probability that each observation would have been generated as a sample, based on the probability distribution maintained at the time an observation was input. Each time an observation is input, then, the stochastic memory 900 may act to update an accumulated probability value stored in the memory 902 by multiplying a probability of the new observation being generated based on the previously-received observations or other information known about a probability distribution for the stochastic memory 900. Each time an observation is removed, the accumulated probability may be similarly updated to remove that value such that the accumulated probability does not reflect that observation. In some embodiments, a stochastic memory 900 may include an input line 928 for resetting an accumulated probability and causing the accumulated probability to be recalculated based on observations stored in the stochastic memory 900 at that time.

A stochastic memory may be implemented in any suitable circuit implementing any suitable technique for solving stochastic problems. In some embodiments, a stochastic memory may be implemented as the only configurable circuit solving a stochastic problem, and may be configured to solve a stochastic problem based on configuration input provided to the stochastic memory and on input regarding observations to be stored and removed. In other implementations, one, two, or more stochastic memories may be used together. Stochastic memories may exchange values to between them, including exchanging values with instructions to incorporate, remove, and/or provide the probability associated with those values. In some cases, one stochastic memory may operate to control other stochastic memories through use of incorporate, remove, probability, and sample instructions.

Figure 10:
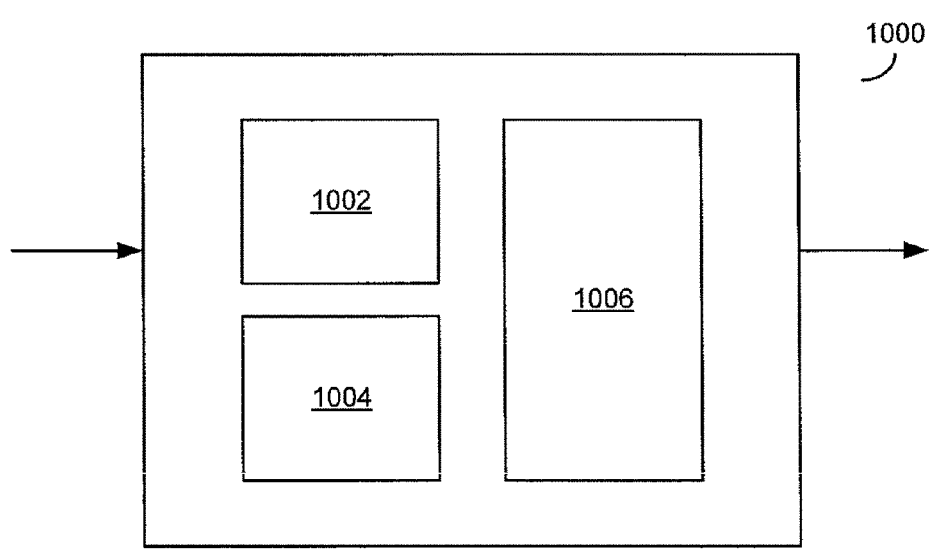
FIG. 10 is an example of a way in which a stochastic memory may be implemented in some embodiments to solve a stochastic problem.

FIG. 10 illustrates one exemplary implementation of a stochastic memory that is configured to solve a stochastic problems alone. FIG. 11 illustrates another exemplary implementation of a stochastic memory that is implemented with a stochastic tile to solve a stochastic problem.

In the implementation of FIG. 10, a stochastic memory may be configured to implement a Beta-Bernoulli process for solving a stochastic process. A Beta-Bernoulli process may be used where, as in a Bernoulli process, there are only two possibles outcomes, or two possible states of a random variable, but a probability of each state is unknown. One common example of a Beta-Bernoulli process is flipping an unfair coin with an unknown weight: only heads and tails may result, but as the coin is not fair, the probability associated with each side is not known. A stochastic memory may implement the Beta-Bernoulli process to generate samples (or flips of the coin) based on previous observations.

The stochastic memory 1000 may be configured to use a Beta-Bernoulli process in any suitable way. For example, state information may be input to the stochastic memory 1000 that includes an instruction to implement a Beta-Bernoulli process. As another example, hardware or hard-coded instructions of the stochastic memory 1000 may be configured to implement a Beta-Bernoulli process.

A memory 1002 of the stochastic memory 1000 may store information to be used to generate samples using a Beta-Bernoulli process. As discussed above in connection with FIG. 9, the memory 1002 may store sufficient statistics for generating samples using a particular technique. In the context of Beta-Bernoulli, the sufficient statistics are a total number of observations, and a number of observations of one of the two types that have been recorded. As discussed above, other information may be stored in addition to the sufficient statistics, but the sufficient statistics may be stored for each technique for a stochastic process.

State information accepted to the stochastic memory 1000 may include a default setting or first setting for the variables related to the sufficient statistics. For example, the state information may cause the stochastic memory 1000 to start from a fair probability distribution for the coin, and update the distribution based on observations. In some embodiments, though, the state information may not set values for the sufficient statistics, but rather will reset the sufficient statistics such that no information is known about the probability distribution at a start.

When an observation is input to the stochastic memory 1000, a control circuit 1004 may be used to update the information stored in the memory 1002 based on the observation. In the case of the Beta-Bernoulli process, this may involve incrementing a number of observations. Based on the value of the observation, the number of one type of observation may be incremented as well.

When an observation is to be removed from the stochastic memory 1000, the control circuit 1004 may be used to update the information stored in the memory 1002 based on the value of the observation that is requested to be removed. In the case of the Beta-Bernoulli process, this may involve decrementing the number of observations and, based on the value of the observation, may involve decrementing the number of one type of observation.

The sufficient statistics that are generated based on the observations and stored in the memory 1002 may be used to generate a sample to be output from the stochastic memory. A probability of each of the two types of observations may be generated based on the sufficient statistics. Using the Beta-Bernoulli process, a probability of a first type is the number of observations of the first type (stored in memory 1002) divided by the number of total observations. A probability of the other type is the complement of this probability, or 1−(number of first type/number of total). This probability distribution may then be provided to a stochastic circuit 1006 to produce a sample from the probability distribution. For the Beta-Bernoulli process, the stochastic circuit 1006 may include a Bernoulli/theta gate, as described in the '754 application, that will produce an output sample based on an input probability distribution. A sample produced from the stochastic circuit 1006 may be output from the stochastic memory 1000.

As discussed above, a stochastic memory may also be adapted to output an indication of a probability of a particular value being generated as a sample, based on input regarding that particular value. In the case of the Beta-Bernoulli process, the stochastic memory may accept as input one of the two types of values and, based on the value, calculate the probability of that value based on the sufficient statistics as described above. The probability may then be output from the stochastic memory 1000.

FIG. 10 showed one example of a stochastic memory that may be used to configure the probability distribution to operate based on a Beta-Bernoulli process. It should be appreciated, as discussed above, that stochastic memories are not limited to operating according to any particular technique, including the Beta-Bernoulli process. Rather, any suitable technique may be implemented with stochastic memories. FIG. 11B shows another exemplary implementation of a stochastic memory, implementing a Chinese Restaurant Process (CRP).

Figure 11A:
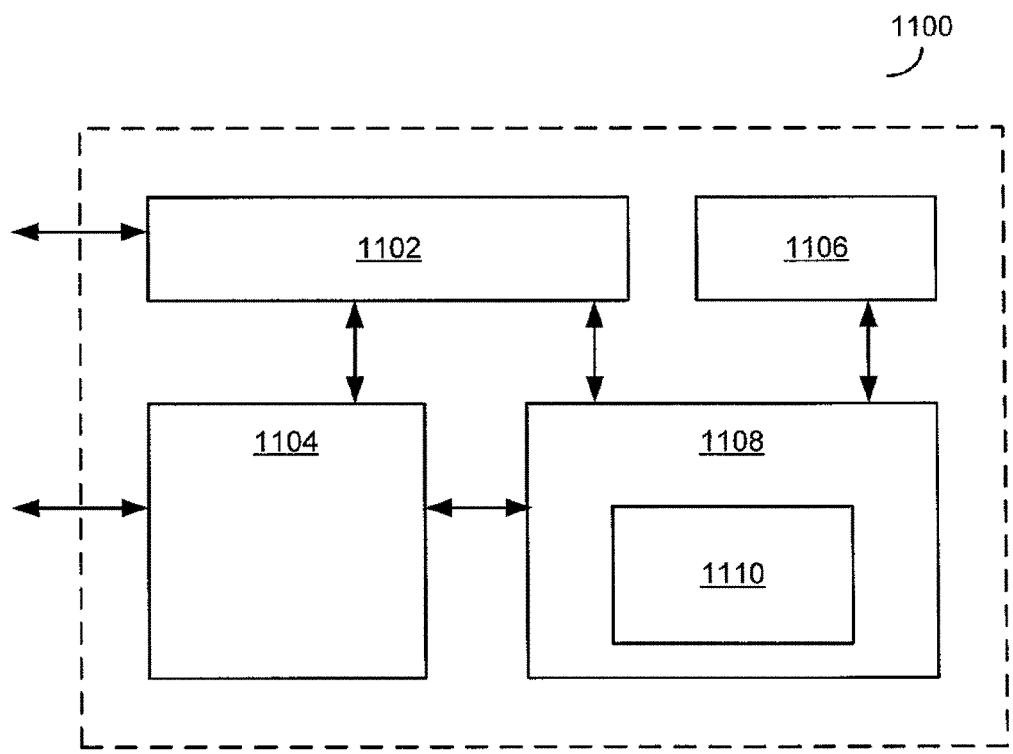
FIG. 11A is an example of a way in which a stochastic memory may be configured in some embodiments to solve a stochastic problem using a clustering technique.
Figure 11B:
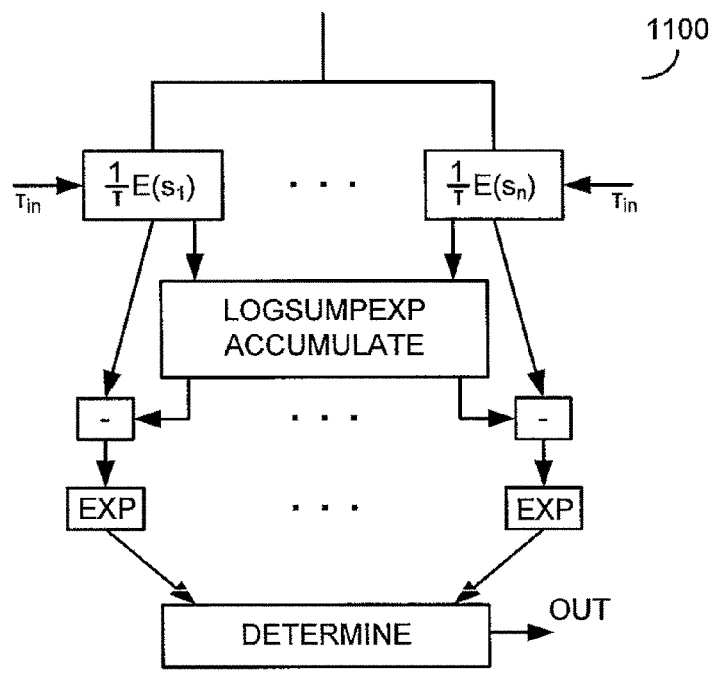
FIG. 11B is an example of a clustering technique that may be used by a stochastic memory in some embodiments to solve a stochastic problem.

The stochastic memory 1110 of FIG. 11A is implemented in connection with a stochastic tile 1100 to perform a clustering technique. The stochastic tile 1100 may include the stochastic memory 1110 as a part of a stochastic circuit 1108 for producing samples from a probability distribution. For example, the stochastic circuit 1108 may be arranged to perform a Gibbs Sampling technique or a Metropolis-Hastings technique. The stochastic tile 1100 have stored in a memory 1102 a listing of one or more elements that are to be clustered using the CRP technique, such a text documents to be assigned to topic groups or images to be grouped based on content. The stochastic memory 1110 may store information regarding one or more clusters to which the element could be assigned. Using the Metropolis-Hastings or Gibbs Sampling techniques, or other technique that creates and evaluates a proposal distribution, an element may be input to the stochastic memory 1108 by the stochastic circuit along with instructions to assign the element to a cluster, the probability of that element being in that cluster is evaluated, and a decision is made on whether to leave the element in the cluster based on the probability.

The stochastic tile 1100 may operate substantially similarly to the stochastic tile described above in connection with FIG. 6A. A control circuit 1104 may operate to configure the stochastic circuit 1108 based on information in the memories 1102 and 1106. In each iteration of operation of the control circuit 1104, the stochastic circuit 1108, including the stochastic memory 1110, may assign an element to a cluster. In each iteration, then, the control circuit 1104 may configure the stochastic circuit 1108 with information regarding a different element by making available different information from the memories 1102 and 1106. While the stochastic memory 1110 is shown as a component of the stochastic circuit 1108, it should be appreciated that in some cases, the control circuit 1104 may configure elements of the stochastic circuit 1108 other than the stochastic memory 1110, to allow the stochastic memory 1110 to be used over multiple iterations. In other cases, though, the control circuit 11104 may configure the stochastic memory 1110 along with other elements of the stochastic circuit 1108, such as by clearing the stochastic memory 1110 or by providing state information to the stochastic memory 1110.

When an element is to be assigned to a cluster, the stochastic circuit 1108 may pass an instruction to the stochastic memory 1110 to include the element in a cluster as an observation. In implementations where the stochastic memory 1110 is storing information regarding multiple clusters, then an instruction to include the element in a cluster may also include an indication of cluster in which to include the element.

As described above, the stochastic memory 1110 may, upon receiving an instruction to include an observation, store the observation in memory and/or perform calculations to update values (e.g., the sufficient statistics) stored in the stochastic memory 1110. Once the observation has been included in the cluster in the stochastic memory 1110, the stochastic memory 1110 is requested to provide a probability of that element being generated as a sample from the probability distribution for that cluster. In accordance with a Chinese Restaurant Process (CRP) technique, the stochastic memory 1110 may generate the probability based on a probability distribution for each property of a cluster and a probability distribution for the cluster itself. Generating a probability of an element being generated for a cluster is known in the art, and any suitable known technique may be implemented in a stochastic memory 1110.

If the stochastic circuit 1108 is implemented with a Metropolis-Hastings algorithm, then the stochastic circuit 1108 may evaluate the probability of the element being generated as a sample from the cluster and either accept or reject the assignment to of the element to the cluster, according to the steps of the Metropolis-Hastings algorithm. If the assignment is accepted, then the control circuit 1104 may configure the stochastic circuit 1108 with a next element, such that the stochastic circuit 1108 may make a next assignment to a cluster. If the assignment is rejected, then the stochastic circuit 1108 may instruct the stochastic memory 1110 to remove the observation from the cluster in the stochastic memory 1110. Once the observation is removed, then the control circuit 1104 may configure the stochastic circuit 1108 with a next element.

On the other hand, if the stochastic circuit 1108 is implemented with a Gibbs Sampling algorithm, then in accordance with this algorithm the probability of the element being in the cluster is stored and the stochastic circuit 1108 instructs the stochastic memory 1110 to remove the element from the cluster in the stochastic memory 1110. The stochastic circuit 1108 then instructs the stochastic memory 1110 to include the element in a next cluster and requests from the stochastic memory 1110 a probability of that element being generated as a sample from the cluster. The probability is stored and the stochastic circuit 1108 then instructs the stochastic memory 1110 to remove the element from the cluster. This process is repeated, in conjunction with the Gibbs Sampling algorithm when used with clustering techniques, until the element has been included in each cluster and a probability has been calculated for each cluster of the element being in that cluster.

Each of the probabilities of the element being in each of the clusters may then be analyzed in accordance with the process shown in FIG. 11B. As shown in FIG. 11B, a Gibbs kernel 1120 may perform a process that includes treating each probability of the element being in a cluster as a score. Once these scores are retrieved, each may be tempered, and a (log) normalizing constant may be computed and used to normalize the scores. These normalized scores may then be used to determine a best fit for the element, identifying a cluster to which the element most likely corresponds. Once the best fit is determined, then the stochastic circuit 1108 may instruct the stochastic memory to include the element as an observation in the cluster identified as the best fit.

Regardless of which technique is used, a Metropolis-Hastings technique or a Gibbs Sampling technique, the control circuit 1104 may continue configuring the stochastic circuit 1108 until each element has been assigned to a cluster. The control circuit 1104 may then retrieve from the stochastic memory 1108 state information identifying properties of each cluster, identified based on the elements included in that cluster, and/or information identifying a cluster to which each element has been assigned. The control circuit 1104 may then output this information from the stochastic tile 1100 has a solution to the stochastic problem.

In examples described above, a stochastic memory is used alone in solving a stochastic problem. It should be appreciated, though, that in some embodiments, two or more stochastic memories may be implemented together to solve a stochastic problem. Each of the stochastic memories may be configured to solve a fragment of a stochastic problem, such as by producing samples from probability distributions of different random variables of a stochastic problem. In some such implementations, a first stochastic memory may be configured to retrieve a sample from a second stochastic memory while generating a sample. For example, two or more stochastic memories may be arranged to implement a clustering technique to solve a stochastic problem, with a first stochastic memory configured to store information and produce samples regarding a cluster assignment and one or more second stochastic memories configured to store information regarding a property of a cluster. When the first stochastic memory receives a new observation as input, describing an element to be included in a cluster, the first stochastic memory may control each of the one or more second stochastic memories to include observations about the element, such as observations regarding a property of the element. Similarly, when the first stochastic memory is instructed to remove an observation, the first stochastic memory may control each of the one or more second stochastic memories to remove information about properties of the element.

Stochastic memories may be used together in an apparatus for solving a stochastic problem, including in an apparatus including multiple configurable circuits and/or multiple stochastic memories. In some cases, each of the stochastic memories of a configurable circuit may be independently and in parallel storing observations and generating samples. Periodically, the stochastic memories may be synchronized to one another, such that all memories can take advantage of information about a stochastic problem known at each of the stochastic memories.

While each of the examples of configurable circuits described above focused on implementations of configurable circuits as digital circuits, configurable circuits are not limited to being implemented as digital circuits. In some embodiments, a configurable circuit may be implemented in whole or in part as an analog circuit.

Techniques have been described for configuring a configurable circuit to solve a stochastic fragment as part of solving a stochastic problem. Though, the examples described above did not discuss a source of the stochastic problem or an environment in which the configurable circuit may operate.

Configurable circuits may be used in any suitable context to solve any suitable problems. Configurable circuits may be used in stochastic and/or deterministic computers to solve stochastic problems that have arisen.

Figure 12A:
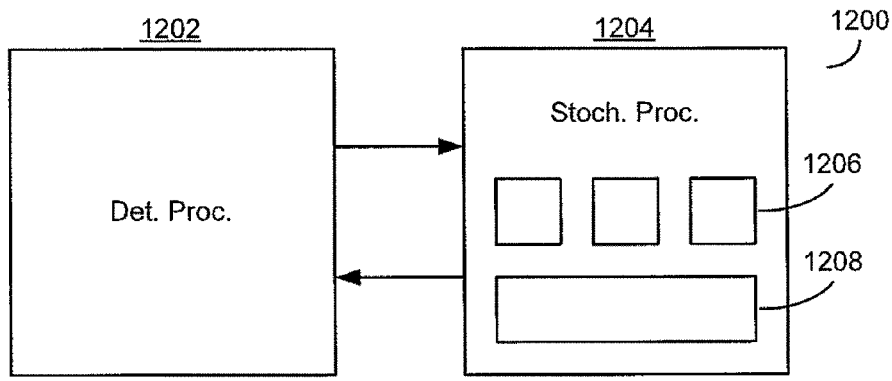
FIGS. 12A, 12B, and 12C are examples of environments in which configurable circuits may be implemented to solve stochastic problems.

In one example, as illustrated in FIG. 12A, one or more configurable circuits 1206 may be implemented in a stochastic processor 1204 and communicatively coupled to a deterministic processor 1202 in a system 1200. Configurable circuits may be implemented in this way when the stochastic processor is implemented as an accelerator component of a computer, specially adapted to solve stochastic processes and therefore relied on by the deterministic processor 1202 to solve stochastic problems that arise.

The stochastic processor 1204 may receive input describing a stochastic problem from the deterministic processor 1202, and may include a control circuit 1208 acting as an interface to the deterministic processor 1202 and that acts to partition the stochastic problem into stochastic fragments in any suitable manner and assign each stochastic fragment to one of the configurable circuits 1206. For example, upon receiving a communication from the deterministic computer including a command (e.g., an opcode) and data, the control circuit 1208 may configure and operate the configurable circuit(s) to solve a stochastic problem requested by the deterministic processor 1202. The data from the deterministic processor 1202 may include any suitable data, including a description of a stochastic problem to be performed and/or a set of instructions defining a technique for solving the stochastic problem. In some embodiments, as discussed above, the data about the stochastic problem from the deterministic processor 1202 may include a graph (e.g., a factor graph, or MRF), or a graph may be calculated by the control circuit 1208 based on the data from the deterministic processor 1202.

Samples generated by the configurable circuits 1206 may be transmitted by the control circuit 1208 to a memory of the deterministic processor 1202 and/or written to a memory associated with the configurable circuits 1206 and from which the deterministic processor 1202 can retrieve data.

Figure 12B:
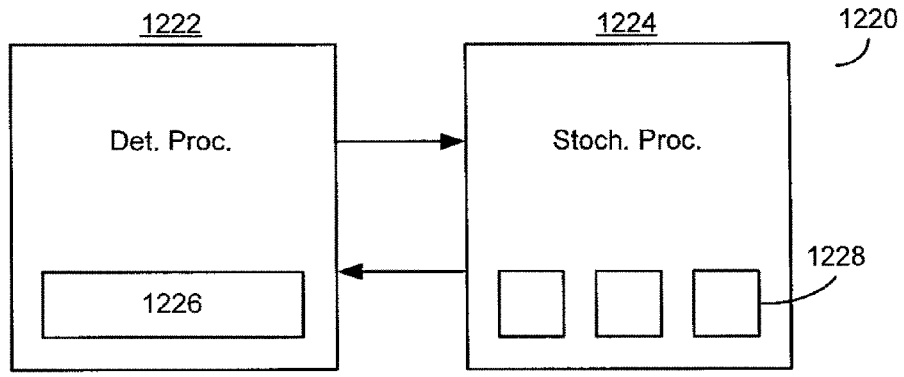
Figure 12C:
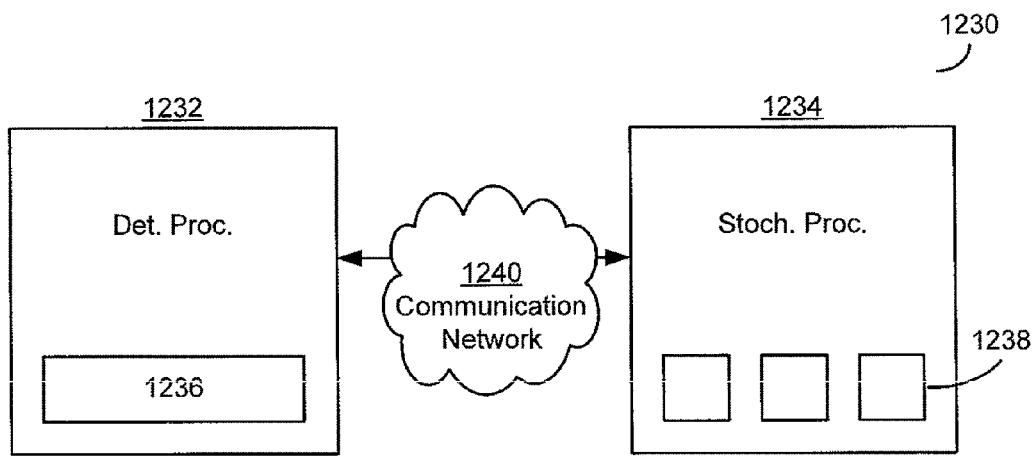

It should be appreciated that embodiments are not limited to operating in the exemplary environment described in connection with FIG. 12A, and that others are possible. FIGS. 12B and 12C illustrate other exemplary environments. In the system 1220 of FIG. 12B, a deterministic processor 1222 may include a hardware and/or software component 1226 to partition a stochastic problem into a plurality of stochastic fragments. The deterministic processor 1232 may then provide input describing the plurality of stochastic fragments to the stochastic processor 1224, which may configure and process the plurality of stochastic fragments on the configurable circuits 1228. As in the example of FIG. 12A, the stochastic processor 1224 may act as a co-processor or accelerator for the deterministic processor 1222.

In another exemplary implementation, in the system 1230 of FIG. 12C, a deterministic processor 1232 and a stochastic processor 1234 may be implemented on separate computing devices. The different computing devices may be separated by a computing network 1240. The deterministic processor 1232 may include a hardware and/or software component 1236 to partition a stochastic problem into a plurality of stochastic fragments. The deterministic processor 1232 may then provide input describing the plurality of stochastic fragments over the computing network 1240 to the stochastic processor 1234, which may configure and process the plurality of stochastic fragments on the configurable circuits 1238.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. An apparatus comprising:
 a first configurable circuit comprising:
  a processing circuit comprising at least one stochastic circuit arranged to implement a technique for solving stochastic problems; and
  at least one control circuit to configure the processing circuit to solve a particular stochastic problem by controlling a provision of information to the processing circuit, the information comprising a probability distribution from which samples are to be produced to solve the particular stochastic problem,
  wherein the at least one control circuit is adapted to provide a predetermined number of values to the processing circuit and, when a number of other stochastic problems upon which the particular stochastic problem conditions depends is less than the predetermined number, the at least one control circuit performs a masking operation to indicate to the processing circuit that fewer than the predetermined number of values are being provided.

2. The apparatus of claim 1, wherein the processing circuit solves the particular stochastic problem by producing, at a first time, a sample from a probability distribution for the particular stochastic problem.

3. The apparatus of claim 1, wherein the at least one control circuit is adapted to provide, at a first time, information describing a first stochastic problem to the processing circuit and to provide, at a second time, information describing a second stochastic problem to the processing circuit.

4. The apparatus of claim 3, wherein the information describing the first stochastic problem comprises a look-up table identifying a probability distribution for the first stochastic problem.

5. The apparatus of claim 3, wherein the information describing the first stochastic problem comprises at least one value of a random variable upon which the first stochastic problem conditionally depends.

6. The apparatus of claim 3, wherein the at least one control circuit is adapted to:
provide information regarding the first stochastic problem to the processing circuit at a first time;
make a selection of a next stochastic problem; and
provide information regarding the next stochastic problem to the processing circuit at a second time.

7. The apparatus of claim 6, wherein the at least one control circuit is adapted to make the selection according to a predetermined order.

8. The apparatus of claim 6, wherein the at least one control circuit is adapted to make the selection randomly.

9. The apparatus of claim 1, further comprising:
at least one memory storing information describing at least one stochastic problem,
wherein the at least one control circuit is adapted to control the provision of information to the processing circuit by selecting a particular stochastic problem and providing information describing the particular stochastic problem from the at least one memory to the processing circuit.

10. The apparatus of claim 9, wherein the at least one control circuit is further adapted to control the provision of information to the processing circuit by:
determining at least one other stochastic problem upon which the particular stochastic problem conditionally depends;
retrieving from the at least one memory a value associated with each of the at least one other stochastic problem; and
providing the values associated with each of the at least one other stochastic problem to the processing circuit.

11. The apparatus of claim 10, wherein the at least one control circuit is adapted to determine the at least one other stochastic problem by examining information regarding the particular stochastic problem stored in the at least one memory.

12. The apparatus of claim 1, wherein the at least one control circuit is adapted to provided at least one junk value to the processing circuit such that the predetermined number of values is provided, and to perform the masking operation by providing at least one indicator to the processing circuit that the at least one junk value is being provided.

13. The apparatus of claim 12, wherein the processing circuit is adapted to ignore the at least one junk value based on the at least one indicator.

14. The apparatus of claim 1, wherein the processing circuit is adapted to detect the masking operation and, when the masking operation is detected, to perform a process based on fewer than the predetermined number of values.

15. The apparatus of claim 1, further comprising a second configurable circuit communicatively coupled to the first configurable circuit,
wherein when the at least one other stochastic problem includes a stochastic problem that the second configurable circuit has been configured to solve, the at least one control circuit is adapted to request a value from a memory of the at least one memory associated with the second configurable circuit.

16. The apparatus of claim 9, wherein the processing unit comprises the at least one memory, and the at least one memory comprises a second configurable circuit arranged to carry out a second technique for solving stochastic problems, the second configurable circuit comprising at least one data store to store information regarding a probability distribution and at least one second control circuit to manipulate the information and to produce a sample based on the information using the second technique, and
wherein the at least one control circuit is adapted to control the processing circuit to request a sample from the second configurable circuit.

17. The apparatus of claim 16, wherein the second configurable circuit is a stochastic memory.

18. The apparatus of claim 16, wherein the processing circuit is adapted to store an observation regarding a first stochastic problem in the second configurable circuit.

19. The apparatus of claim 18, wherein the processing circuit is adapted to determine whether to store the observation according to the technique for solving stochastic problems.

20. The apparatus of claim 16, wherein the processing circuit is adapted to request the second configurable circuit to remove an observation from the information.

21. The apparatus of claim 20, wherein the processing circuit is adapted to determine whether to remove the observation according to the technique for solving stochastic problems.

22. The apparatus of claim 16, wherein the at least one control circuit is adapted to provide to the stochastic memory at least one parameter for the second technique to configure the second configurable circuit to operate according to the second technique.

23. The apparatus of claim 16, wherein the second technique is a same technique as the technique for solving stochastic problems.

24. The apparatus of claim 1, wherein the particular problem is a stochastic fragment, and
wherein the at least one control circuit is adapted to provide, at a first time, information describing a first stochastic fragment to the processing circuit and to provide, at a second time, information describing a second stochastic fragment to the processing circuit.

25. The apparatus of claim 1, further comprising:
a configuration interface to receive configuration information for configuring the configurable circuit.

26. The apparatus of claim 25, further comprising:
at least one memory,
wherein the configuration information comprises information describing at least two stochastic problems to be stored in the at least one memory, and
wherein the at least one control circuit is adapted to provide, at a first time, information describing one of the at least two stochastic problems to the processing circuit and to provide, at a second time, information describing another of the at least two stochastic problems to the processing circuit.

27. The apparatus of claim 26, wherein the configuration information further comprises information regarding an order in which the at least one control circuit will provide information describing the at least two stochastic problems to the processing circuit.

28. The apparatus of claim 25, wherein the configuration information comprises information describing at least one parameter of the technique for solving stochastic problems, and wherein the at least one control circuit is adapted to provide the information describing the at least one parameter to the processing circuit.

29. The apparatus of claim 28, wherein the processing circuit comprises:
 a stochastic memory, the stochastic memory comprising at least one data store to store information regarding a probability distribution and at least one second control circuit to manipulate the information and to produce a sample based on the information, and
 wherein the at least one control circuit is adapted to provide the information describing the at least one parameter to the stochastic memory.

30. The apparatus of claim 1, further comprising:
 a configuration interface to receive configuration information for configuring the configurable circuit; and
 at least one memory,
 wherein the configuration information comprises information describing at least two stochastic problems to be stored in the at least one memory, and
 wherein the configuration information further comprises information regarding an order in which the at least one control circuit will provide information describing the at least two stochastic problems to the processing circuit.

31. The apparatus of claim 30, wherein the apparatus is a single integrated circuit.

32. The apparatus of claim 30, further comprising:
 a second configurable circuit comprising a second processing circuit and at least one second control circuit,
 wherein the configuration interface receives second information for configuring the second configurable circuit,
 wherein the second configuration information comprises second information describing at least two second stochastic problems to be stored in the at least one memory, and
 wherein the second configuration information further comprises information regarding a second order in which the at least one second control circuit will provide information describing the at least two second stochastic problems to the second processing circuit.

33. The apparatus of claim 32, wherein the at least one memory comprises at least a first memory and a second memory, and
 wherein the first configurable circuit comprises the first memory and the second configurable circuit comprises the second memory.

34. The apparatus of claim 33, further comprising at least one interconnection connecting the first configurable circuit to the second configurable circuit in the single integrated circuit.

35. The apparatus of claim 32, further comprising:
 at least one third configurable circuit arranged to implement a second technique for solving a stochastic problem, the at least one third configurable circuit comprising at least one data store to store information regarding a probability distribution and at least one third control circuit to manipulate the information and to produce a sample based on the information, and
 wherein the configuration information comprises at least one parameter to the at least one third configurable circuit.

36. The apparatus of claim 35, wherein the at least one third configurable circuit is a stochastic memory.

37. The apparatus of claim 36, wherein the apparatus is a single integrated circuit.

38. The apparatus of claim 30, wherein the at least one memory stores the information describing the probability distribution for the stochastic problem.

39. The apparatus of claim 30, wherein the apparatus further comprises a deterministic processor, and wherein the deterministic processor provides the configuration information to the configuration interface.

40. The apparatus of claim 39, wherein the deterministic processor transmits an operation code to the configurable interface instructing the first configurable circuit to solve the stochastic problem.

41. The apparatus of claim 1, wherein the processing circuit is arranged to implement a Gibbs Sampling technique.

42. The apparatus of claim 1, wherein the processing circuit is arranged to implement a Metropolis-Hastings technique.

43. The apparatus of claim 1, wherein the processing circuit is arranged to implement a rejection sampling technique.

44. The apparatus of claim 1, wherein the processing circuit comprises a stochastic memory, and wherein the processing circuit is arranged to implement a Chinese Restaurant Process (CRP) technique with a Gibbs Sampling technique.

45. The apparatus of claim 1, further comprising at least one hundred second configurable circuits, each second configurable circuit of the at least one hundred second configurable circuits comprising:
 a second processing circuit comprising at least one stochastic circuit arranged to implement a technique for solving stochastic problems; and
 at least one second control circuit to configure the second processing circuit to solve a particular stochastic problem by controlling a provision of information to the processing circuit, the information comprising a probability distribution from which samples are to be produced to solve the particular stochastic problem.

46. The apparatus of claim 45, wherein the at least one hundred second configurable circuits are operated in parallel to each solve a particular stochastic problem.

47. The apparatus of claim 46, wherein the at least one hundred second configurable circuits are each arranged to process data in words having lengths of 16 bits or less.

48. The apparatus of claim 46, wherein the at least one hundred second configurable circuits are each arranged to process data in 8-bit words.

49. An apparatus comprising:
 a configurable circuit arranged to implement a technique for solving stochastic problems, the configurable circuit comprising:
  at least one memory for storing information to be used in generating a probability distribution for a stochastic problem;
  at least one stochastic circuit element arranged to implement the technique to generate the probability distribution and to produce samples from the probability distribution; and
  at least one control circuit arranged as an interface for the configurable circuit, the at least one control circuit receiving data and instructions and controlling operations of the at least one stochastic circuit based on the data and the instructions, wherein the apparatus further comprises a second configurable circuit arranged to implement the technique for solving stochastic problems, the second configurable comprising:
- at least one second memory for storing second information to be used in generating a second probability distribution for the stochastic problem;
- at least one second stochastic circuit element arranged to implement the technique to generate the second probability distribution and to produce samples from the second probability distribution; and
- at least one second control circuit arranged as an interface for the second stochastic memory, the at least one second control circuit receiving data and instructions and controlling operations of the at least one second stochastic circuit based on the data and the instructions, wherein the at least one control circuit of the configurable circuit is adapted to issue, upon receiving an instruction, a second instruction to the second configurable circuit to control the second configurable circuit based on the instruction.

50. The apparatus of claim 49, wherein the configurable circuit is a stochastic memory.

51. The apparatus of claim 49, wherein the information to be used in generating a probability distribution comprises at least one value calculated based on data received by the at least one control circuit, and
wherein the at least one control circuit is adapted to perform at least one operation to adjust the at least one value based on the received data and instructions.

52. The apparatus of claim 51, wherein the at least one control circuit is adapted to:
- receive an instruction to include new data in the information to be used in generating the probability distribution; and
- adjust, in response to the instruction, the at least one value to reflect the new data.

53. The apparatus of claim 51, wherein the at least one control circuit is adapted to:
- receive an instruction to remove previously-received data from the information to be used in generating the probability distribution; and
- adjust, in response to the instruction, the at least one value such that the at least one value does not reflect the previously-received data.

54. The apparatus of claim 51, wherein the at least one control circuit is adapted to:
- receive an instruction to produce a sample from the probability distribution; and
- in response to the instruction:
  - generate the probability distribution based at least in part on the at least one value,
  - produce a sample from the probability distribution, and
  - output the sample from the configurable circuit.

55. The apparatus of claim 49, wherein the at least one control circuit is adapted to:
- receive an instruction to calculate a probability of a particular sample being generated from the probability distribution; and
- in response to the instruction, to generate the probability for the particular sample and output the probability from the configurable circuit.

56. The apparatus of claim 55, wherein the probability is a logarithmic probability.

57. The apparatus of claim 55, wherein the probability is a normalized probability.

58. The apparatus of claim 49, wherein the at least one control circuit is adapted to:
- receive information regarding at least one parameter of the technique for solving stochastic problems; and
- store the information regarding the at least one parameter in the at least one memory.

59. The apparatus of claim 58, wherein the at least one control circuit is adapted to use a parameter of the at least one parameter in calculating at least some of the information to be used in generating the probability distribution.

60. The apparatus of claim 58, wherein the at least one control circuit is adapted to use a parameter of the at least one parameter in generating a sample from the probability distribution.

61. The apparatus of claim 49, wherein the at least one memory stores first information to be used in generating a first probability distribution for a first stochastic problem and second information to be used in generating a second probability distribution for a second stochastic problem.

62. The apparatus of claim 49, wherein the at least one control circuit of the configurable circuit is adapted to, upon receiving an instruction requesting that a sample be generated:
- issue a second instruction to the second configurable circuit requesting that the second configurable circuit generate a second sample, and
- use the second sample in generating the probability distribution at the configurable circuit.

63. The apparatus of claim 49, wherein the at least one control circuit is adapted to, upon receiving an instruction requesting that new data be incorporated into the information to be used in generating a probability distribution:
- issue a second instruction to the second configurable circuit requesting that the second configurable circuit incorporate the new data.

64. The apparatus of claim 49, wherein the at least one control circuit is adapted to, upon receiving an instruction requesting that previously-received data be removed from the information to be used in generating a probability distribution:
- issue a second instruction to the second configurable circuit requesting that the second configurable circuit remove the previously-received data.

65. The apparatus of claim 49, wherein the configurable circuit is arranged to implement a clustering technique.

66. The apparatus of claim 65, wherein the configurable circuit is arranged to implement a Chinese Restaurant Process (CRP) technique.

67. The apparatus of claim 65, wherein the at least one memory stores information regarding at least one probability distribution for each of at least one property of a cluster of the clustering technique.

68. The apparatus of claim 67, wherein the configurable circuit is adapted to accept as input information describing an element and to produce as output, based on the at least one probability distribution, a probability that the element is in the cluster.

69. The apparatus of claim 51, wherein the at least one control circuit is adapted to:
- receive a first instruction to include new data in the information to be used in generating the probability distribution and adjust, in response to the first instruction, the at least one value to reflect the new data,
- receive a second instruction to produce a sample from the probability distribution and, in response to the second instruction, generate the probability distribution based at least in part on the at least one value, produce a sample from the probability distribution, and output the sample from the configurable circuit.

70. The apparatus of claim 69, further comprising:
at least one processing circuit adapted to carry out a rejection sampling process by:
issuing the second instruction to the configurable circuit to request the sample;
evaluate the sample in accordance with a rejection sampling algorithm; and
if the sample is accepted, issuing the first instruction to the configurable circuit to request that the sample be included as the new data.

71. The apparatus of claim 51, wherein the at least one control circuit is adapted to:
receive a first instruction to include new data in the information to be used in generating the probability distribution and adjust, in response to the first instruction, the at least one value to reflect the new data,
receive a second instruction to produce a sample from the probability distribution and, in response to the second instruction, generate the probability distribution based at least in part on the at least one value, produce a sample from the probability distribution, and output the sample from the configurable circuit, and
receive a third instruction to calculate a probability of a particular sample being generated from the probability distribution and, in response to the third instruction, to generate the probability for the particular sample and output the probability from the configurable circuit.

72. The apparatus of claim 71, further comprising:
at least one processing circuit adapted to carry out an importance sampling process by:
issuing the second instruction to the configurable circuit to request the sample;
issuing the third instruction to the configurable circuit to request the probability of the sample being generated;
upon receiving the probability, evaluate the sample in accordance with an importance sampling algorithm; and
if the sample is accepted, issuing the first instruction to the configurable circuit to request that the sample be included as the new data.

73. The apparatus of claim 51, wherein the at least one control circuit is adapted to:
receive a first instruction to include new data in the information to be used in generating the probability distribution and adjust, in response to the first instruction, the at least one value to reflect the new data,
receive a second instruction to produce a sample from the probability distribution and, in response to the second instruction, generate the probability distribution based at least in part on the at least one value, produce a sample from the probability distribution, and output the sample from the configurable circuit,
receive a fourth instruction to remove previously-received data from the information to be used in generating the probability distribution and adjust, in response to the fourth instruction, the at least one value such that the at least one value does not reflect the previously-received data, and
receive a third instruction to calculate a probability of a particular sample being generated from the probability distribution and, in response to the third instruction, to generate the probability for the particular sample and output the probability from the configurable circuit.

74. The apparatus of claim 73, further comprising:
at least one processing circuit adapted to carry out a Metropolis-Hastings sampling process by:
issuing the second instruction to the configurable circuit to request the sample;
issuing the third instruction to the configurable circuit to request the probability of the sample being generated;
upon receiving the probability, evaluate the sample in accordance with the Metropolis-Hastings sampling algorithm; and
if the sample is accepted, issuing the first instruction to the configurable circuit to request that the sample be included as the new data.

75. The apparatus if claim 73, further comprising:
at least one processing circuit adapted to carry out a Gibbs sampling process by:
issuing the second instruction to the configurable circuit to request the sample;
issuing the third instruction to the configurable circuit to request the probability of the sample being generated;
upon receiving the probability, evaluate the sample in accordance with the Gibbs sampling algorithm; and
if the sample is accepted, issuing the first instruction to the configurable circuit to request that the sample be included as the new data.

76. The apparatus of one of claims 70, 72, 74, and 75, wherein the at least one processing circuit comprises a configurable circuit, the configurable circuit comprising:
a processing unit to produce samples from a probability distribution related to a stochastic problem; and
a controller to configure the processing unit by providing information about the stochastic problem to the processing unit and to cause the processing unit to produce the samples.

77. The apparatus of claim 76, wherein the configurable circuit is a core of a multi-core system,
wherein the controller configures the processing unit to solve the stochastic problem by assigning a processing unit of the core to execute a first thread and providing a first thread stack to the core, the first thread including instructions to produce samples from a first probability distribution, and
wherein the controller reconfigures the processing unit to solve a next stochastic problem by assigning the processing unit of the core to execute a second thread and providing a second thread stack to the core, the second thread including instructions to produce samples from a second probability distribution.

78. The apparatus of claim 76, wherein the configurable circuit comprises a stochastic tile, the stochastic tile comprising at least one stochastic circuit acting as the processing unit, and
wherein the controller configures the processing unit by providing information to the at least one stochastic circuit describing a current state of one or more variables and information describing a probability distribution from which to produce samples.

79. The apparatus of claim 49, wherein the at least one memory stores information comprising sufficient statistics for generating a type of probability distribution.

80. A method of solving a stochastic problem using a configurable circuit, the method comprising:
at a first time, configuring the configurable circuit to operate based on first information describing a first stochastic problem, the first information comprising information describing a first probability distribution;
operating the configurable circuit to generate a first sample from the first probability distribution;

at a second time, configuring the configurable circuit to operate based on second information describing a second stochastic problem, the second information comprising information describing a second probability distribution; and operating the configurable circuit to generate a second sample from the second probability distribution, wherein the configurable circuit is a core of a multi-core system, wherein configuring the configurable circuit to solve the first stochastic problem comprises assigning the core to execute a first thread and providing a first thread stack to the core, the first thread including instructions to produce samples from a first probability distribution, and wherein configuring the configurable circuit to solve the second stochastic problem comprises assigning the core to execute a second thread and providing a second thread stack to the core, the second thread including instructions to produce samples from a second probability distribution.

81. The method of claim 80, wherein configuring the configurable circuit to solve the first stochastic problem comprises making available to the configurable circuit information describing the first stochastic problem.

82. The method of claim 81, wherein making available to the configurable circuit information describing the first stochastic problem comprises controlling the configurable circuit to receive the information from a memory.

83. The method of claim 82, wherein the memory stores first information describing the first stochastic problem and second information describing the second stochastic problem, and wherein configuring the configurable circuit to solve the first stochastic problem comprises making available to the configurable circuit the first information, and configuring the configurable circuit to solve the second stochastic problem comprises making available to the configurable circuit the second information.

84. The method of claim 81, wherein the first stochastic problem is conditionally dependent on another stochastic problem, and wherein the information describing the first stochastic problem comprises a sample from the other stochastic problem.

85. The method of claim 84, wherein the other stochastic problem is the second stochastic problem.

86. The method of claim 84, further comprising:

determining, based on the information describing the first stochastic problem, at least one other stochastic problem on which the first stochastic problem conditionally depends;

retrieving at least one sample previously generated by the other stochastic problem; and providing the at least one sample to the configurable circuit as at least a part of the information describing the first stochastic problem.

87. The method of claim 86, wherein retrieving the at least one sample comprises retrieving the at least one sample from a second configurable circuit.

88. The method of claim 86, wherein retrieving the at least one sample comprises retrieving the at least one sample from a memory of the configurable circuit.

89. The method of claim 88, wherein the at least one sample was generated by the configurable circuit while the configurable circuit was configured to solve the other stochastic problem.

90. The method of claim 80, further comprising:

between the first time and the second time, performing a selection process to select a next stochastic process with which to configure the configurable circuit, the selection process comprising a set of stochastic processes for which information is available to the configurable circuit.

91. The method of claim 90, wherein the set of stochastic processes comprises a set of stochastic fragments of a third stochastic problem, and wherein information describing each stochastic fragment is stored in a memory of the configurable circuit.

92. The method of claim 90, wherein performing the selection process comprises selecting the next stochastic process according to a predetermined order.

93. The method of claim 90, wherein performing the selection process comprises selecting the next stochastic process randomly.

94. The method of claim 90, further comprising:

receiving as configuration input first information describing a selection process to be carried out and second information describing each of the set of stochastic problems.

95. The method of claim 90, wherein performing the selection process comprises selecting the next stochastic problem such that no other stochastic problem on which the next stochastic problem conditionally depends will be solved by a second configurable circuit at a same time that the next stochastic problem will be solved by the configurable circuit.

96. The method of claim 90, wherein performing the selection process comprises selecting the next stochastic problem so as to reduce a likelihood that another stochastic problem on which the next stochastic problem conditionally depends will be solved by a second configurable circuit at a same time that the next stochastic problem will be solved by the configurable circuit.

97. The method of claim 80, wherein the multi-core system is a multi-core processor.

98. The method of claim 97, wherein the core is a low precision core having a small amount of memory, and wherein generating the sample comprises generating the sample with low precision.

99. The method of claim 80, wherein each core of the multi-core system processes data in words having a size less than or equal to 16 bits.

100. The method of claim 99, wherein each core of the multi-core system processes data in 8-bit words.

101. The method of claim 80, wherein the multi-core system comprises hundreds of cores, and wherein the method further comprises:

configuring each core of the hundreds of cores to operate based on second information describing a second stochastic problem, the first information comprising information describing a second probability distribution, wherein each core is configured with different second information; and operating each core of the hundreds of cores to generate a first sample from the first probability distribution.

102. The method of claim 101, wherein the acts of configuring and operating are performed asynchronously for each of the hundreds of cores.

103. The method of claim 80, wherein the multi-core system comprises thousands of cores, and wherein the method further comprises:

configuring each core of the thousands of cores to operate based on second information describing a second stochastic problem, the first information comprising information describing a second probability distribution, wherein each core is configured with different second information; and operating each core of the thousands of cores to generate a first sample from the first probability distribution.

104. The method of claim 103, wherein the acts of configuring and operating are performed asynchronously for each of the thousands of cores.

105. The method of claim 98, wherein the configurable circuit is a stochastic tile comprising at least one stochastic circuit element, and wherein configuring the configurable circuit comprises providing information to the stochastic circuit describing a current state of one or more variables and information describing a probability distribution from which to produce samples.

106. The method of claim 105, wherein providing the information describing the probability distribution comprises providing a look-up table including values of a conditional probability table.

107. The method of claim 105, wherein the configurable circuit comprises at least one hundred second configurable circuits, each of the at least one hundred second configurable circuits comprising a stochastic tile comprising at least one stochastic circuit element, and wherein the method further comprises:
configuring each second configurable circuit of the at least one hundred second configurable circuits to operate based on second information describing a second stochastic problem, the first information comprising information describing a second probability distribution, wherein each second configurable circuit is configured with different second information; and
operating each second configurable circuit of the at least one hundred second configurable circuits to generate a first sample from the first probability distribution.

108. The method of claim 107, wherein each second configurable circuit processes data in words having a size less than or equal to 16 bits.

109. The method of claim 107, wherein each second configurable circuit processes data in 8-bit words.

110. The method of claim 107, wherein the acts of configuring and operating are performed asynchronously for each second configurable circuit.

111. At least one non-transitory computer-readable storage medium encoded with computer-executable instructions that, when executed by a computer, cause the computer to implement a method of solving a stochastic problem using a configurable circuit, the method comprising:
at a first time, configuring the configurable circuit to operate based on first information describing a first stochastic problem, the first information comprising information describing a first probability distribution;
operating the configurable circuit to generate a first sample from the first probability distribution;
at a second time, configuring the configurable circuit to operate based on second information describing a second stochastic problem, the second information comprising information describing a second probability distribution;
operating the configurable circuit to generate a second sample from the second probability distribution; and
between the first time and the second time, performing a selection process to select a next stochastic process with which to configure the configurable circuit, the selection process comprising a set of stochastic processes for which information is available to the configurable circuit,
wherein performing the selection process comprises selecting the next stochastic problem such that no other stochastic problem on which the next stochastic problem conditionally depends will be solved by a second configurable circuit at a same time that the next stochastic problem will be solved by the configurable circuit.

112. The at least one computer-readable storage medium of claim 111, wherein configuring the configurable circuit to solve the first stochastic problem comprises making available to the configurable circuit information describing the first stochastic problem.

113. The at least one computer-readable storage medium of claim 112, wherein making available to the configurable circuit information describing the first stochastic problem comprises controlling the configurable circuit to receive the information from a memory.

114. The at least one computer-readable storage medium of claim 113, wherein the memory stores first information describing the first stochastic problem and second information describing the second stochastic problem, and wherein configuring the configurable circuit to solve the first stochastic problem comprises making available to the configurable circuit the first information, and configuring the configurable circuit to solve the second stochastic problem comprises making available to the configurable circuit the second information.

115. The at least one computer-readable storage medium of claim 112, wherein the first stochastic problem is conditionally dependent on another stochastic problem, and wherein the information describing the first stochastic problem comprises a sample from the other stochastic problem.

116. The at least one computer-readable storage medium of claim 115, wherein the other stochastic problem is the second stochastic problem.

117. The at least one computer-readable storage medium of claim 115, wherein the method further comprises:
determining, based on the information describing the first stochastic problem, at least one other stochastic problem on which the first stochastic problem conditionally depends;
retrieving at least one sample previously generated by the other stochastic problem; and
providing the at least one sample to the configurable circuit as at least a part of the information describing the first stochastic problem.

118. The at least one computer-readable storage medium of claim 117, wherein retrieving the at least one sample comprises retrieving the at least one sample from a second configurable circuit.

119. The at least one computer-readable storage medium of claim 117, wherein retrieving the at least one sample comprises retrieving the at least one sample from a memory of the configurable circuit.

120. The at least one computer-readable storage medium of claim 119, wherein the at least one sample was generated by the configurable circuit while the configurable circuit was configured to solve the other stochastic problem.

121. The at least one computer-readable storage medium of claim 111, wherein the set of stochastic processes comprises a set of stochastic fragments of a third stochastic problem, and wherein information describing each stochastic fragment is stored in a memory of the configurable circuit.

122. The at least one computer-readable storage medium of claim 111, wherein performing the selection process comprises selecting the next stochastic process according to a predetermined order.

123. The at least one computer-readable storage medium of claim 111, wherein performing the selection process comprises selecting the next stochastic process randomly.

124. The at least one computer-readable storage medium of claim 111, wherein the method further comprises:
receiving as configuration input first information describing a selection process to be carried out and second information describing each of the set of stochastic problems.

125. The at least one computer-readable storage medium of claim 111, wherein the configurable circuit is a core of a multi-core system,
wherein configuring the configurable circuit to solve the first stochastic problem comprises assigning the core to execute a first thread and providing a first thread stack to the core, the first thread including instructions to produce samples from a first probability distribution, and
wherein configuring the configurable circuit to solve the second stochastic problem comprises assigning the core to execute a second thread and providing a second thread stack to the core, the second thread including instructions to produce samples from a second probability distribution.

126. The at least one computer-readable storage medium of claim 125, wherein the multi-core system is a multi-core processor.

127. The at least one computer-readable storage medium of claim 126, wherein the core is a low precision core having a small amount of memory, and wherein generating the sample comprises generating the sample with low precision.

128. The at least one computer-readable storage medium of claim 125, wherein each core of the multi-core system processes data in words having a size less than or equal to 16 bits.

129. The at least one computer-readable storage medium of claim 128, wherein each core of the multi-core system processes data in 8-bit words.

130. The at least one computer-readable storage medium of claim 125, wherein the multi-core system comprises hundreds of cores, and wherein the method further comprises:
configuring each core of the hundreds of cores to operate based on second information describing a second stochastic problem, the first information comprising information describing a second probability distribution, wherein each core is configured with different second information; and
operating each core of the hundreds of cores to generate a first sample from the first probability distribution.

131. The at least one computer-readable storage medium of claim 130, wherein the acts of configuring and operating are performed asynchronously for each of the hundreds of cores.

132. The at least one computer-readable storage medium of claim 125, wherein the multi-core system comprises thousands of cores, and wherein the method further comprises:
configuring each core of the thousands of cores to operate based on second information describing a second stochastic problem, the first information comprising information describing a second probability distribution, wherein each core is configured with different second information; and
operating each core of the thousands of cores to generate a first sample from the first probability distribution.

133. The at least one computer-readable storage medium of claim 132, wherein the acts of configuring and operating are performed asynchronously for each of the thousands of cores.

134. The at least one computer-readable storage medium of claim 127, wherein the configurable circuit is a stochastic tile comprising at least one stochastic circuit element, and
wherein configuring the configurable circuit comprises providing information to the stochastic circuit describing a current state of one or more variables and information describing a probability distribution from which to produce samples.

135. The at least one computer-readable storage medium of claim 134, wherein providing the information describing the probability distribution comprises providing a look-up table including values of a conditional probability table.

136. The at least one computer-readable storage medium of claim 134, wherein the configurable circuit comprises at least one hundred second configurable circuits, each of the at least one hundred second configurable circuits comprising a stochastic tile comprising at least one stochastic circuit element, and
wherein the method further comprises:
configuring each second configurable circuit of the at least one hundred second configurable circuits to operate based on second information describing a second stochastic problem, the first information comprising information describing a second probability distribution, wherein each second configurable circuit is configured with different second information; and
operating each second configurable circuit of the at least one hundred second configurable circuits to generate a first sample from the first probability distribution.

137. The at least one computer-readable storage medium of claim 134, wherein each second configurable circuit processes data in words having a size less than or equal to 16 bits.

138. The at least one computer-readable storage medium of claim 134, wherein each second configurable circuit processes data in 8-bit words.

139. The at least one computer-readable storage medium of claim 136, wherein the acts of configuring and operating are performed asynchronously for each second configurable circuit.

140. A method of dividing a stochastic problem so as to be solved using a plurality of configurable circuits, the method comprising:
partitioning the stochastic problem into a plurality of stochastic fragments, a number of the plurality of stochastic fragments being at least one hundred; and
assigning each stochastic fragment to one of the plurality of configurable circuits, the assigning being done such that multiple stochastic fragments are assigned to at least one configurable circuit,
wherein the partitioning of the stochastic problem comprises partitioning the stochastic problem according to random variables of the stochastic problem, such that each stochastic fragment is associated with one random variable, and
wherein the assigning comprises:
identifying, for each random variable, a conditional dependence on other random variables of the stochastic problem so as to identify a conditional dependence between stochastic fragments;
determining an available bandwidth for exchanging information between each of the plurality of configurable circuits; and
assigning to a first configurable circuit a stochastic fragment and a first conditionally dependent stochastic fragment that is conditionally dependent on the stochastic fragment, and assigning to a second configurable circuit a second conditionally dependent stochastic fragment, such that when each of the plurality of configurable circuits is executed in parallel over a plurality of iterations to solve the stochastic problem, the amount of information exchanged between each of the plurality of configurable circuits during an iteration is below the available bandwidth.

141. The method of claim 140, further comprising:
recording, to at least one computer-readable medium, an indication of a configurable circuit to which each stochastic fragment is assigned.

142. The method of claim 140, wherein the partitioning comprises partitioning the stochastic problem into at least one thousand stochastic fragments.

143. The method of claim 142, wherein the partitioning comprises partitioning the stochastic problem into at least ten thousand stochastic fragments.

144. The method of claim 143, wherein the partitioning comprises partitioning the stochastic problem into at least one million stochastic fragments.

145. The method of claim 140, wherein the partitioning comprises partitioning the stochastic problem into a greater number of stochastic fragments than a number of configurable circuits.

146. The method of claim 140, wherein the assigning comprises assigning at least one stochastic fragment to each of at least one hundred configurable circuits.

147. The method of claim 146, wherein the assigning comprises assigning at least one stochastic fragment to each of at least one thousand configurable circuits.

148. The method of claim 147, wherein the assigning comprises assigning at least one stochastic fragment to each of at least one thousand configurable circuits.

149. The method of claim 148, wherein the assigning comprises assigning at least one stochastic fragment to each of at least ten thousand configurable circuits.

150. The method of claim 149, wherein the assigning comprises assigning at least one stochastic fragment to each of at least one million configurable circuits.

151. The method of one of claims 146 to 150, further comprising:
communicating an indication of each assignment of the assigning to one integrated circuit comprising the plurality of configurable circuits.

152. The method of one of claims 146 to 150, further comprising:
communicating an indication of each assignment of the assigning to a single package device comprising the plurality of configurable circuits.

153. The method of claim 140, wherein the partitioning is carried out based on a graph describing the stochastic problem.

154. The method of claim 153, further comprising:
receiving the graph as input describing the stochastic problem.

155. The method of claim 140, further comprising:
calculating a graph based on the stochastic problem.

156. The method of claim 153, wherein the graph is a factor graph related to the stochastic problem.

157. The method of claim 153, wherein the graph is a Markov Random Field related to the stochastic problem.

158. The method of claim 153, wherein the graph is a BUGS program describing the stochastic problem.

159. The method of claim 153, wherein the partitioning is carried out by identifying each node of the graph as a stochastic fragment.

160. The method of claim 159, further comprising, prior to the partitioning:
preliminarily labeling nodes of the graph such that no two nodes that are connected in the graph are labeled with a same label;
counting a number of nodes having each label in the graph; and
merging nodes of the graph until all labels of the graph have a same number of nodes.

161. The method of claim 159, further comprising, prior to the partitioning:
preliminarily identifying each node in the graph as a stochastic fragment;
determining a first amount of memory that may be used to solve each stochastic fragment;
determining a second amount of memory available in each configurable circuit for solving each stochastic fragment; and
merging at least two nodes in the graph such that a total amount of memory that may be used to solve a merged stochastic fragment is less than the second amount of memory.

162. The method of claim 159, further comprising, prior to the partitioning:
preliminarily identifying each node in the graph as a stochastic fragment;
identifying a desired level of precision for solving the stochastic problem;
determining a possible level of precision based on a number of nodes in the graph, a number of configurable circuits, and a bandwidth available for exchanging information between each of the plurality of configurable circuits; and
merging nodes of the graph and repeating the determining until the possible level of precision is at or above the desired level of precision.

163. The method of claim 159, further comprising:
labeling nodes of the graph such that no two nodes that are connected in the graph are labeled with a same label.

164. The method of claim 163, wherein labeling the nodes comprises coloring the nodes.

165. The method of claim 163, wherein the assigning comprises, for each label and for each node of the graph having the label, assigning a node to a configurable circuit of the plurality of configurable circuits according to an order, and repeating the order until all nodes having a label have been assigned to a configurable circuit.

166. The method of claim 165, wherein the order is random.

167. The method of claim 159, wherein each of the at least one configurable circuits is configured with an order in which to solve the multiple stochastic fragments over multiple iterations of operation, where the at least one configurable circuit solves one stochastic fragment per iteration, and
wherein assigning each stochastic fragment comprises assigning a first node and at least one second connected node connected to the first node in the graph such that, when the plurality of configurable circuits are operated in parallel to solve the stochastic problem and the at least one configurable circuit solves the multiple stochastic fragments in the order, a first stochastic fragment related to the first node and at least one second stochastic fragment related to the at least one second connected node are not being solved at a same time.

168. The method of claim 159, wherein each of the at least one configurable circuits is configured with an order in which to solve the multiple stochastic fragments over multiple iterations of operation, where the at least one configurable circuit solves one stochastic fragment per iteration, and wherein assigning each stochastic fragment comprises assigning a first node and at least one second connected node connected to the first node in the graph such that, when the plurality of configurable circuits are operated in parallel to solve the stochastic problem and the at least one configurable circuit solves the multiple stochastic fragments in the order, a likelihood that a first stochastic fragment related to the first node and at least one second stochastic fragment related to the at least one second connected node being solved at a same time is reduced below a threshold.

169. The method of claim 159, wherein each of the at least one configurable circuits is configured with an order in which to solve the multiple stochastic fragments over multiple iterations of operation, where the at least one configurable circuit solves one stochastic fragment per iteration, and wherein assigning each stochastic fragment comprises assigning a first node and at least one second connected node connected to the first node in the graph such that, when the plurality of configurable circuits are operated in parallel to solve the stochastic problem and the at least one configurable circuit solves the multiple stochastic fragments in the order, no more than a threshold number of the at least one second stochastic fragment will be solved at a same time as the first stochastic fragment.

170. The method of one of claims 167 to 166, wherein the order is random.

171. The method of one of claims 167 to 166, wherein the order is sequential.

172. The method of one of claims 167 to 166, further comprising:

assigning to the at least one configurable circuit the order in which to solve the multiple stochastic fragments.

173. The method of one of claims 167 to 166, wherein each of the at least one configurable circuit is preconfigured with the order in which to solve the multiple stochastic fragments.

174. The method of claim 173, wherein the order is specified by hardcoded instructions.

175. The method of claim 140, wherein determining the available bandwidth comprises adjusting a physical bandwidth based on a desired precision for solving the stochastic problem.

176. The method of claim 140, wherein each of the plurality of configurable circuits comprises at least one stochastic circuit element.

177. The method of claim 176, wherein the at least one stochastic circuit element is arranged to implement a particular technique for solving a stochastic problem.

178. The method of claim 177, wherein the particular technique is Gibbs Sampling.

179. The method of claim 176, further comprising:

accepting as input an instruction to solve the stochastic problem using a particular technique for solving a stochastic problem; and arranging the at least one stochastic circuit element so as to implement the particular technique.

180. The method of claim 140, wherein each of the plurality of configurable circuits comprises a core of a multi-core system.

181. The method of claim 180, wherein the partitioning comprises partitioning the stochastic problem into a plurality of threads, each thread being related to a stochastic fragment, and wherein the assigning comprises assigning each thread to a core.

182. The method of claim 140, further comprising;

for each stochastic fragment, providing information describing the stochastic fragment to a configurable circuit, the information describing the stochastic fragment comprising information describing a probability distribution related to the stochastic fragment.

183. The method of claim 140, further comprising:

assigning to each of the at least one configurable circuits an order in which to solve the multiple stochastic fragments over multiple iterations of operation, where the at least one configurable circuit solves one stochastic fragment per iteration.

184. The method of claim 183, wherein the order is sequential.

185. The method of claim 183, wherein the order is random.

186. The method of claim 140, wherein each of the plurality of configurable circuits is adapted to carry out a clustering technique to solve the stochastic problem, and wherein the partitioning is carried out such that each stochastic fragment is related to a portion of the clustering technique.

187. The method of claim 186, wherein the partitioning is carried out such that each stochastic fragment is related to a cluster.

188. The method of claim 186, wherein the partitioning is carried out such that each stochastic fragment is related to a property of the cluster.

189. The method of claim 186, wherein the partitioning is carried out such that each stochastic fragment is related to one of a cluster or a property of a cluster.

190. The method of claim 186, wherein each cluster of the clustering technique shares at least one cluster property, and wherein the partitioning is carried out such that each stochastic fragment is related to one of a cluster or a cluster property.

191. The method of claim 186, further comprising:

providing to each configurable circuit at least one parameter relating to the clustering technique to configure each configurable circuit to implement the clustering technique.

192. The method of claim 186, further comprising:

providing to each configurable circuit an indication of at least one sufficient statistic to be determined for a property of a cluster.

193. The method of claim 186, wherein the clustering technique is a Chinese Restaurant Process (CRP) technique.

194. At least one non-transitory computer-readable storage medium encoded with computer-executable instructions that, when executed by a computer, cause the computer to implement a method of dividing a stochastic problem so as to be solved using a plurality of configurable circuits, the method comprising:

partitioning the stochastic problem into a plurality of stochastic fragments, a number of the plurality of stochastic fragments being at least one hundred; and assigning each stochastic fragment to one of the plurality of configurable circuits, the assigning being done such that multiple stochastic fragments are assigned to at least one configurable circuit, wherein the partitioning is carried out based on a graph describing the stochastic problem, wherein the partitioning is carried out by identifying each node of the graph as a stochastic fragment, wherein each of the at least one configurable circuits is configured with an order in which to solve the multiple stochastic fragments over multiple iterations of operation, where the at least one configurable circuit solves one stochastic fragment per iteration, and wherein assigning each stochastic fragment comprises assigning a first node and at least one second connected node connected to the first node in the graph such that, when the plurality of configurable circuits are operated in parallel to solve the stochastic problem and the at least one configurable circuit solves the multiple stochastic fragments in the order, a first stochastic fragment related to the first node and at least one second stochastic fragment related to the at least one second connected node are not being solved at a same time.

195. The at least one computer-readable storage medium of claim 194, further comprising:

recording, to at least one computer-readable medium, an indication of a configurable circuit to which each stochastic fragment is assigned.

196. The at least one computer-readable storage medium of claim 194, wherein the partitioning comprises partitioning the stochastic problem into at least one thousand stochastic fragments.

197. The at least one computer-readable storage medium of claim 196, wherein the partitioning comprises partitioning the stochastic problem into at least ten thousand stochastic fragments.

198. The at least one computer-readable storage medium of claim 197, wherein the partitioning comprises partitioning the stochastic problem into at least one million stochastic fragments.

199. The at least one computer-readable storage medium of claim 194, wherein the partitioning comprises partitioning the stochastic problem into a greater number of stochastic fragments than a number of configurable circuits.

200. The at least one computer-readable storage medium of claim 194, wherein the assigning comprises assigning at least one stochastic fragment to each of at least one hundred configurable circuits.

201. The at least one computer-readable storage medium of claim 200, wherein the assigning comprises assigning at least one stochastic fragment to each of at least one thousand configurable circuits.

202. The at least one computer-readable storage medium of claim 201, wherein the assigning comprises assigning at least one stochastic fragment to each of at least one thousand configurable circuits.

203. The at least one computer-readable storage medium of claim 202, wherein the assigning comprises assigning at least one stochastic fragment to each of at least ten thousand configurable circuits.

204. The at least one computer-readable storage medium of claim 203, wherein the assigning comprises assigning at least one stochastic fragment to each of at least one million configurable circuits.

205. The at least one computer-readable storage medium of one of claims 200 to 204, wherein the method further comprises:

communicating an indication of each assignment of the assigning to one integrated circuit comprising the plurality of configurable circuits.

206. The at least one computer-readable storage medium of one of claims 200 to 204, wherein the method further comprises:

communicating an indication of each assignment of the assigning to a single package device comprising the plurality of configurable circuits.

207. The at least one computer-readable storage medium of claim 194, wherein the method further comprises:

receiving the graph as input describing the stochastic problem.

208. The at least one computer-readable storage medium of claim 194, wherein the method further comprises:

calculating the graph based on the stochastic problem.

209. The at least one computer-readable storage medium of claim 194, wherein the graph is a factor graph related to the stochastic problem.

210. The at least one computer-readable storage medium of claim 194, wherein the graph is a Markov Random Field related to the stochastic problem.

211. The at least one computer-readable storage medium of claim 194, wherein the graph is a BUGS program describing the stochastic problem.

212. The at least one computer-readable storage medium of claim 194, wherein the method further comprises, prior to the partitioning:

preliminarily labeling nodes of the graph such that no two nodes that are connected in the graph are labeled with a same label;

counting a number of nodes having each label in the graph; and merging nodes of the graph until all labels of the graph have a same number of nodes.

213. The at least one computer-readable storage medium of claim 194, wherein the method further comprises, prior to the partitioning:

preliminarily identifying each node in the graph as a stochastic fragment;

determining a first amount of memory that may be used to solve each stochastic fragment;

determining a second amount of memory available in each configurable circuit for solving each stochastic fragment; and merging at least two nodes in the graph such that a total amount of memory that may be used to solve a merged stochastic fragment is less than the second amount of memory.

214. The at least one computer-readable storage medium of claim 194, further comprising, prior to the partitioning:

preliminarily identifying each node in the graph as a stochastic fragment;

identifying a desired level of precision for solving the stochastic problem;

determining a possible level of precision based on a number of nodes in the graph, a number of configurable circuits, and a bandwidth available for exchanging information between each of the plurality of configurable circuits; and merging nodes of the graph and repeating the determining until the possible level of precision is at or above the desired level of precision.

215. The at least one computer-readable storage medium of claim 194, further comprising:

labeling nodes of the graph such that no two nodes that are connected in the graph are labeled with a same label.

216. The at least one computer-readable storage medium of claim 215, wherein labeling the nodes comprises coloring the nodes.

217. The at least one computer-readable storage medium of claim 215, wherein the assigning comprises, for each label and for each node of the graph having the label, assigning a node to a configurable circuit of the plurality of configurable circuits according to an order, and repeating the order until all nodes having a label have been assigned to a configurable circuit.

218. The at least one computer-readable storage medium of claim 217, wherein the order is random.

219. The at least one computer-readable storage medium of claim 194, wherein each of the at least one configurable circuits is configured with an order in which to solve the multiple stochastic fragments over multiple iterations of operation, where the at least one configurable circuit solves one stochastic fragment per iteration, and
wherein assigning each stochastic fragment comprises assigning a first node and at least one second connected node connected to the first node in the graph such that, when the plurality of configurable circuits are operated in parallel to solve the stochastic problem and the at least one configurable circuit solves the multiple stochastic fragments in the order, a likelihood that a first stochastic fragment related to the first node and at least one second stochastic fragment related to the at least one second connected node being solved at a same time is reduced below a threshold.

220. The at least one computer-readable storage medium of claim 194, wherein each of the at least one configurable circuits is configured with an order in which to solve the multiple stochastic fragments over multiple iterations of operation, where the at least one configurable circuit solves one stochastic fragment per iteration, and
wherein assigning each stochastic fragment comprises assigning a first node and at least one second connected node connected to the first node in the graph such that, when the plurality of configurable circuits are operated in parallel to solve the stochastic problem and the at least one configurable circuit solves the multiple stochastic fragments in the order, no more than a threshold number of the at least one second stochastic fragment will be solved at a same time as the first stochastic fragment.

221. The at least one computer-readable storage medium of one of claims 219 to 220, wherein the order is random.

222. The at least one computer-readable storage medium of one of claims 219 to 220, wherein the order is sequential.

223. The at least one computer-readable storage medium of one of claims 219 to 220, wherein the method further comprises: assigning to the at least one configurable circuit the order in which to solve the multiple stochastic fragments.

224. The at least one computer-readable storage medium of one of claims 219 to 220, wherein each of the at least one configurable circuit is preconfigured with the order in which to solve the multiple stochastic fragments.

225. The at least one computer-readable storage medium of claim 224, wherein the order is specified by hardcoded instructions.

226. The at least one computer-readable storage medium of claim 194, wherein the assigning comprises:
determining an available bandwidth for exchanging information between each of the plurality of configurable circuits; and
assigning to a first configurable circuit a node and a first connected node that is connected to the node in the graph, and assigning to a second configurable circuit a second connected node, such that when each of the plurality of configurable circuits is executed in parallel over a plurality of iterations to solve the stochastic problem, the amount of information exchanged between each of the plurality of configurable circuits during an iteration is below the available bandwidth.

227. The at least one computer-readable storage medium of claim 226, wherein determining the available bandwidth comprises adjusting a physical bandwidth based on a desired precision for solving the stochastic problem.

228. The at least one computer-readable storage medium of claim 194, wherein the partitioning of the stochastic problem comprises partitioning the stochastic problem according to random variables of the stochastic problem, such that each stochastic fragment is associated with one random variable.

229. The at least one computer-readable storage medium of claim 228, wherein the assigning comprises:
identifying, for each random variable, a conditional dependence on other random variables of the stochastic problem so as to identify a conditional dependence between stochastic fragments;
determining an available bandwidth for exchanging information between each of the plurality of configurable circuits; and
assigning to a first configurable circuit a stochastic fragment and a first conditionally dependent stochastic fragment that is conditionally dependent on the stochastic fragment, and assigning to a second configurable circuit a second conditionally dependent stochastic fragment, such that when each of the plurality of configurable circuits is executed in parallel over a plurality of iterations to solve the stochastic problem, the amount of information exchanged between each of the plurality of configurable circuits during an iteration is below the available bandwidth.

230. The at least one computer-readable storage medium of claim 229, wherein determining the available bandwidth comprises adjusting a physical bandwidth based on a desired precision for solving the stochastic problem.

231. The at least one computer-readable storage medium of claim 194, wherein each of the plurality of configurable circuits comprises at least one stochastic circuit element.

232. The at least one computer-readable storage medium of claim 231, wherein the at least one stochastic circuit element is arranged to implement a particular technique for solving a stochastic problem.

233. The at least one computer-readable storage medium of claim 232, wherein the particular technique is Gibbs Sampling.

234. The at least one computer-readable storage medium of claim 231, wherein the method further comprises:
accepting as input an instruction to solve the stochastic problem using a particular technique for solving a stochastic problem; and
arranging the at least one stochastic circuit element so as to implement the particular technique.

235. The at least one computer-readable storage medium of claim 194, wherein each of the plurality of configurable circuits comprises a core of a multi-core system.

236. The at least one computer-readable storage medium of claim 235, wherein the partitioning comprises partitioning the stochastic problem into a plurality of threads, each thread being related to a stochastic fragment, and wherein the assigning comprises assigning each thread to a core.

237. The at least one computer-readable storage medium of claim 194, further comprising:
for each stochastic fragment, providing information describing the stochastic fragment to a configurable circuit, the information describing the stochastic fragment comprising information describing a probability distribution related to the stochastic fragment.

238. The at least one computer-readable storage medium of claim 194, further comprising:

assigning to each of the at least one configurable circuits an order in which to solve the multiple stochastic fragments over multiple iterations of operation, where the at least one configurable circuit solves one stochastic fragment per iteration.

239. The at least one computer-readable storage medium of claim 238, wherein the order is sequential.

240. The at least one computer-readable storage medium of claim 238, wherein the order is random.

241. The at least one computer-readable storage medium of claim 194, wherein each of the plurality of configurable circuits is adapted to carry out a clustering technique to solve the stochastic problem, and wherein the partitioning is carried out such that each stochastic fragment is related to a portion of the clustering technique.

242. The at least one computer-readable storage medium of claim 241, wherein the partitioning is carried out such that each stochastic fragment is related to a cluster.

243. The at least one computer-readable storage medium of claim 241, wherein the partitioning is carried out such that each stochastic fragment is related to a property of the cluster.

244. The at least one computer-readable storage medium of claim 241, wherein the partitioning is carried out such that each stochastic fragment is related to one of a cluster or a property of a cluster.

245. The at least one computer-readable storage medium of claim 241, wherein each cluster of the clustering technique shares at least one cluster property, and wherein the partitioning is carried out such that each stochastic fragment is related to one of a cluster or a cluster property.

246. The at least one computer-readable storage medium of claim 241, further comprising:
providing to each configurable circuit at least one parameter relating to the clustering technique to configure each configurable circuit to implement the clustering technique.

247. The at least one computer-readable storage medium of claim 241, further comprising:
providing to each configurable circuit an indication of at least one sufficient statistic to be determined for a property of a cluster.

248. The at least one computer-readable storage medium of claim 241, wherein the clustering technique is a Chinese Restaurant Process (CRP) technique.

249. A method of generating samples for a stochastic problem, the method comprising:
receiving a representation of the stochastic problem;
partitioning the stochastic problem into a plurality of stochastic fragments;
generating configuration information for each of the stochastic fragments;
providing a plurality of processing units; and
for each stochastic fragment,
assigning the stochastic fragment to a respective processing unit from the plurality of processing units;
providing the configuration information for the stochastic fragment to the respective processing unit; and
using the respective processing unit to generate at least one sample for the stochastic fragment in accordance with the configuration information for the stochastic fragment,
wherein each stochastic fragment is assigned to the respective processing unit by allocating a thread of execution on the respective processing unit for the processing unit and by providing the configuration information on a stack for the thread.

250. The method of claim 249, wherein the number of stochastic fragments is larger than the number of processing units.

251. The method of claim 249, wherein at least one stochastic fragment is assigned to each processing unit and a plurality of stochastic fragments is assigned to at least one of the processing units.

252. The method of claim 249, wherein the respective processing unit for each stochastic fragment iteratively evaluates the stochastic fragment to generate a plurality of samples for the stochastic fragment.

253. The method of claim 249, wherein the samples generated for the stochastic fragments are used to solve the stochastic problem.

254. The method of one of claims 249 to 253, wherein the number of stochastic fragments is greater than 100.

255. The method of claim 254, wherein the number of stochastic fragments is greater than 1000.

256. The method of claim 255, wherein the number of stochastic fragments is greater than 10000.

257. The method of claim 256, wherein the number of stochastic fragments is greater than one million.

258. The method of one of claims 249 to 253, wherein the number of processing units is at least 16.

259. The method of claim 258, wherein the number of processing units is at least 64.

260. The method of claim 259, wherein the number of processing units is greater than 100.

261. The method of claim 260, wherein the number of processing units is greater than ten thousand.

262. The method of claim 261, wherein the number of processing units is greater than one million.

263. The method of claim 258, wherein the processing units are provided by a single packaged circuit device.

264. The method of claim 258, wherein the processing units are provided on a single integrated circuit device.

265. The method of claim 258, wherein each processing unit is a core of a multi-core processor device.

266. The method of claim 249, wherein more than 10 stochastic fragments are assigned to at least one of the processing units.

267. The method of claim 249, wherein more than half of the processing units are each assigned more than one stochastic fragment.

268. The method of claim 249, wherein more than half of the processing units are each assigned more than ten stochastic fragments.

269. The method of claim 249, wherein each processing unit that is assigned more than one stochastic fragment is reconfigured using the configuration information for the respective stochastic fragments to switch between processing the respective stochastic fragments.

270. The method of claim 249, wherein the samples are generated by each processing unit using integer operations.

271. The method of claim 249, wherein the samples are generated by each processing unit using only fixed point operations.

272. The method of claim 249, wherein each of the processing units is a fixed point processing unit.

273. The method of claim 249, wherein the processing units do not include any floating point hardware.

274. The method of claim 249, wherein each of the processing units is 16-bits or less.

275. The method of claim 249, wherein the step of partitioning the stochastic problem into a plurality of stochastic fragments is performed using a processor that has a higher bit count than each of the processing units used to process the stochastic fragments.

276. The method of claim 275, wherein the processor used to partition the stochastic problem is a 64-bit or greater processor.

277. The method of one of claims 275 to 276, wherein the processor used to partition the stochastic problem includes floating point hardware.

278. A method of generating samples for a stochastic problem, the method comprising:
- receiving a representation of the stochastic problem;
- partitioning the stochastic problem into a plurality of stochastic fragments;
- generating configuration information for each of the stochastic fragments;
- providing a plurality of configurable circuits; and
- for each stochastic fragment,
  - assigning the stochastic fragment to a respective configurable circuit from the plurality of configurable circuits;
  - providing the configuration information for the stochastic fragment to the respective configurable circuit; and
  - using the respective configurable circuit to generate at least one sample for the stochastic fragment in accordance with the configuration information for the stochastic fragment,
- wherein each configurable circuit that is assigned more than one stochastic fragment is reconfigured using the configuration information for the respective stochastic fragments to switch between processing the respective stochastic fragments.

279. The method of claim 278, wherein the number of stochastic fragments is larger than the number of configurable circuits.

280. The method of claim 278, wherein at least one stochastic fragment is assigned to each configurable circuit and a plurality of stochastic fragments is assigned to at least one of the configurable circuits.

281. The method of claim 278, wherein the respective configurable circuit for each stochastic fragment iteratively evaluates the stochastic fragment to generate a plurality of samples for the stochastic fragment.

282. The method of claim 278, wherein the samples generated for the stochastic fragments are used to solve the stochastic problem.

283. The method of claim 278, wherein each stochastic fragment is assigned to the respective configurable circuit by loading the configuration information into a memory in the configurable circuit and sending an instruction to the configurable circuit to begin processing the configuration information to generate a sample from a probability distribution.

284. The method of one of claims 278 to 283, wherein the number of stochastic fragments is greater than 100.

285. The method of claim 284, wherein the number of stochastic fragments is greater than 1000.

286. The method of claim 285, wherein the number of stochastic fragments is greater than 10000.

287. The method of claim 286, wherein the number of stochastic fragments is greater than one million.

288. The method of claim 278, wherein the number of configurable circuits is at least 20.

289. The method of claim 288, wherein the number of configurable circuits is at least 100.

290. The method of claim 289, wherein the number of configurable circuits is greater than 1000.

291. The method of claim 290, wherein the number of configurable circuits is greater than one million.

292. The method of 278, wherein the configurable circuits are provided by a single packaged circuit device.

293. The method of claim 278, wherein the configurable circuits are provided on a single integrated circuit device.

294. The method of claim 278, wherein each configurable circuit includes a stochastic circuit.

295. The method of claim 278, wherein each configurable circuit includes a stochastic memory.

296. The method of claim 278, wherein each configurable circuit includes an arithmetic logic unit.

297. The method of claim 278, wherein more than 10 stochastic fragments are assigned to at least one of the configurable circuits.

298. The method of claim 278, wherein more than half of the configurable circuits are each assigned more than one stochastic fragment.

299. The method of claim 278, wherein more than half of the configurable circuits are each assigned more than ten stochastic fragments.

300. The method of claim 278, wherein the samples are generated by each configurable circuit using integer operations.

301. The method of claim 278, wherein the samples are generated by each configurable circuit using only fixed point operations.

302. The method of claim 278, wherein each of the configurable circuits has a fixed point arithmetic logic unit.

303. The method of claim 278, wherein the configurable circuits do not include any floating point arithmetic logic unit.

304. The method of claim 278, wherein each of the configurable circuits stores and processes an integer with a size of less than 16 bits.

305. The method of claim 278, wherein each of the configurable circuits stores and processes an integer with a size of less than 8 bits.

306. The method of claim 278, wherein the step of partitioning the stochastic problem into a plurality of stochastic fragments is performed using a processor that has a higher bit count than each of the configurable circuits used to process the stochastic fragments.

307. The method of claim 306, wherein the processor used to partition the stochastic problem is a 64-bit or greater processor.

308. The method of one of claims 306 to 307, wherein the processor used to partition the stochastic problem includes floating point hardware.

309. The method of claim 278, wherein the processor used to partition the stochastic problem is a host processor of a computer system and the configurable circuits are provided on an integrated circuit device operatively coupled to a peripheral bus of such computer system.

310. The method of claim 278, wherein the processor used to partition the stochastic problem is a processor core on a system-on-chip device and wherein the configurable circuits are formed on the same system-on-chip device.

311. The method of claim 278, wherein the configurable circuits comprise an array of stochastic tiles.

312. The method of claim 311, wherein the array includes at least 100 stochastic tiles.

313. At least one non-transitory computer-readable storage medium encoded with computer-executable instructions that, when executed by a computer, cause the computer to implement a method of generating samples for a stochastic problem, the method comprising:
- receiving a representation of the stochastic problem;
- partitioning the stochastic problem into a plurality of stochastic fragments;

generating configuration information for each of the stochastic fragments;
providing a plurality of processing units; and
for each stochastic fragment,
assigning the stochastic fragment to a respective processing unit from the plurality of processing units;
providing the configuration information for the stochastic fragment to the respective processing unit; and
using the respective processing unit to generate at least one sample for the stochastic fragment in accordance with the configuration information for the stochastic fragment
wherein each processing unit that is assigned more than one stochastic fragment is reconfigured using the configuration information for the respective stochastic fragments to switch between processing the respective stochastic fragments.

314. The at least one computer-readable storage medium of claim 313, wherein the number of stochastic fragments is larger than the number of processing units.

315. The at least one computer-readable storage medium of claim 313, wherein at least one stochastic fragment is assigned to each processing unit and a plurality of stochastic fragments is assigned to at least one of the processing units.

316. The at least one computer-readable storage medium of claim 313, wherein the respective processing unit for each stochastic fragment iteratively evaluates the stochastic fragment to generate a plurality of samples for the stochastic fragment.

317. The at least one computer-readable storage medium of claim 313, wherein the samples generated for the stochastic fragments are used to solve the stochastic problem.

318. The at least one computer-readable storage medium of claim 313, wherein each stochastic fragment is assigned to the respective processing unit by allocating a thread of execution on the respective processing unit for the processing unit and by providing the configuration information on a stack for the thread.

319. The at least one computer-readable storage medium of one of claims 313 to 318, wherein the number of stochastic fragments is greater than 100.

320. The at least one computer-readable storage medium of claim 319, wherein the number of stochastic fragments is greater than 1000.

321. The at least one computer-readable storage medium of claim 320, wherein the number of stochastic fragments is greater than 10000.

322. The at least one computer-readable storage medium of claim 321, wherein the number of stochastic fragments is greater than one million.

323. The method of one of claims 313 to 318, wherein the number of processing units is at least 16.

324. The at least one computer-readable storage medium of claim 232, wherein the number of processing units is at least 64.

325. The at least one computer-readable storage medium of claim 324, wherein the number of processing units is greater than 100.

326. The at least one computer-readable storage medium of claim 325, wherein the number of processing units is greater than ten thousand.

327. The at least one computer-readable storage medium of claim 326, wherein the number of processing units is greater than one million.

328. The at least one computer-readable storage medium of claim 323, wherein the processing units are provided by a single packaged circuit device.

329. The at least one computer-readable storage medium of claim 323, wherein the processing units are provided on a single integrated circuit device.

330. The at least one computer-readable storage medium of claim 323, wherein each processing unit is a core of a multi-core processor device.

331. The at least one computer-readable storage medium of claim 313, wherein more than 10 stochastic fragments are assigned to at least one of the processing units.

332. The at least one computer-readable storage medium of claim 313, wherein more than half of the processing units are each assigned more than one stochastic fragment.

333. The at least one computer-readable storage medium of claim 313, wherein more than half of the processing units are each assigned more than ten stochastic fragments.

334. The at least one computer-readable storage medium of claim 313, wherein the samples are generated by each processing unit using integer operations.

335. The at least one computer-readable storage medium of claim 313, wherein the samples are generated by each processing unit using only fixed point operations.

336. The at least one computer-readable storage medium of claim 313, wherein each of the processing units is a fixed point processing unit.

337. The at least one computer-readable storage medium of claim 313, wherein the processing units do not include any floating point hardware.

338. The at least one computer-readable storage medium of claim 313, wherein each of the processing units is 16-bits or less.

339. The at least one computer-readable storage medium of claim 313, wherein the step of partitioning the stochastic problem into a plurality of stochastic fragments is performed using a processor that has a higher bit count than each of the processing units used to process the stochastic fragments.

340. The at least one computer-readable storage medium of claim 339, wherein the processor used to partition the stochastic problem is a 64-bit or greater processor.

341. The at least one computer-readable storage medium of one of claims 339 to 340, wherein the processor used to partition the stochastic problem includes floating point hardware.

342. At least one non-transitory computer-readable storage medium encoded with computer-executable instructions that, when executed by a computer, cause the computer to implement a method of generating samples for a stochastic problem, the method comprising:
receiving a representation of the stochastic problem;
partitioning the stochastic problem into a plurality of stochastic fragments;
generating configuration information for each of the stochastic fragments;
providing a plurality of configurable circuits; and
for each stochastic fragment,
assigning the stochastic fragment to a respective configurable circuit from the plurality of configurable circuits;
providing the configuration information for the stochastic fragment to the respective configurable circuit; and
using the respective configurable circuit to generate at least one sample for the stochastic fragment in accordance with the configuration information for the stochastic fragment,
wherein each configurable circuit that is assigned more than one stochastic fragment is reconfigured using the configuration information for the respective stochastic fragments to switch between processing the respective stochastic fragments.

343. The at least one computer-readable storage medium of claim 342, wherein the number of stochastic fragments is larger than the number of configurable circuits.

344. The at least one computer-readable storage medium of claim 342, wherein at least one stochastic fragment is assigned to each configurable circuit and a plurality of stochastic fragments is assigned to at least one of the configurable circuits.

345. The at least one computer-readable storage medium of claim 342, wherein the respective configurable circuit for each stochastic fragment iteratively evaluates the stochastic fragment to generate a plurality of samples for the stochastic fragment.

346. The at least one computer-readable storage medium of claim 342, wherein the samples generated for the stochastic fragments are used to solve the stochastic problem.

347. The at least one computer-readable storage medium of claim 342, wherein each stochastic fragment is assigned to the respective configurable circuit by loading the configuration information into a memory in the configurable circuit and sending an instruction to the configurable circuit to begin processing the configuration information to generate a sample from a probability distribution.

348. The at least one computer-readable storage medium of one of claims 342 to 347, wherein the number of stochastic fragments is greater than 100.

349. The at least one computer-readable storage medium of claim 348, wherein the number of stochastic fragments is greater than 1000.

350. The at least one computer-readable storage medium of claim 349, wherein the number of stochastic fragments is greater than 10000.

351. The at least one computer-readable storage medium of claim 350, wherein the number of stochastic fragments is greater than one million.

352. The at least one computer-readable storage medium of claim 342, wherein the number of configurable circuits is at least 20.

353. The at least one computer-readable storage medium of claim 352, wherein the number of configurable circuits is at least 100.

354. The at least one computer-readable storage medium of claim 353, wherein the number of configurable circuits is greater than 1000.

355. The at least one computer-readable storage medium of claim 354, wherein the number of configurable circuits is greater than one million.

356. The at least one computer-readable storage medium of 342, wherein the configurable circuits are provided by a single packaged circuit device.

357. The at least one computer-readable storage medium of claim 342, wherein the configurable circuits are provided on a single integrated circuit device.

358. The at least one computer-readable storage medium of claim 342, wherein each configurable circuit includes a stochastic circuit.

359. The at least one computer-readable storage medium of claim 342, wherein each configurable circuit includes a stochastic memory.

360. The at least one computer-readable storage medium of claim 342, wherein each configurable circuit includes an arithmetic logic unit.

361. The at least one computer-readable storage medium of claim 342, wherein more than 10 stochastic fragments are assigned to at least one of the configurable circuits.

362. The at least one computer-readable storage medium of claim 342, wherein more than half of the configurable circuits are each assigned more than one stochastic fragment.

363. The at least one computer-readable storage medium of claim 342, wherein more than half of the configurable circuits are each assigned more than ten stochastic fragments.

364. The at least one computer-readable storage medium of claim 342, wherein the samples are generated by each configurable circuit using integer operations.

365. The at least one computer-readable storage medium of claim 342, wherein the samples are generated by each configurable circuit using only fixed point operations.

366. The at least one computer-readable storage medium of claim 342, wherein each of the configurable circuits has a fixed point arithmetic logic unit.

367. The at least one computer-readable storage medium of claim 342, wherein the configurable circuits do not include any floating point arithmetic logic unit.

368. The at least one computer-readable storage medium of claim 342, wherein each of the configurable circuits stores and processes an integer with a size of less than 16 bits.

369. The at least one computer-readable storage medium of claim 342, wherein each of the configurable circuits stores and processes an integer with a size of less than 8 bits.

370. The at least one computer-readable storage medium of claim 342, wherein the step of partitioning the stochastic problem into a plurality of stochastic fragments is performed using a processor that has a higher bit count than each of the configurable circuits used to process the stochastic fragments.

371. The at least one computer-readable storage medium of claim 370, wherein the processor used to partition the stochastic problem is a 64-bit or greater processor.

372. The at least one computer-readable storage medium of one of claims 370 to 371, wherein the processor used to partition the stochastic problem includes floating point hardware.

373. The at least one computer-readable storage medium of claim 342, wherein the processor used to partition the stochastic problem is a host processor of a computer system and the configurable circuits are provided on an integrated circuit device operatively coupled to a peripheral bus of such computer system.

374. The at least one computer-readable storage medium of claim 342, wherein the processor used to partition the stochastic problem is a processor core on a system-on-chip device and wherein the configurable circuits are formed on the same system-on-chip device.

375. The at least one computer-readable storage medium of claim 342, wherein the configurable circuits comprise an array of stochastic tiles.

376. The at least one computer-readable storage medium of claim 375, wherein the array includes at least 100 stochastic tiles.

377. An apparatus for generating samples for a stochastic problem, the apparatus comprising:
   a plurality of processing units; and
   at least one control circuit adapted to:
   receive a representation of the stochastic problem;
   partition the stochastic problem into a plurality of stochastic fragments;
   generate configuration information for each of the stochastic fragments; and
   for each stochastic fragment,
   assign the stochastic fragment to a respective processing unit from the plurality of processing units;

provide the configuration information for the stochastic fragment to the respective processing unit; and use the respective processing unit to generate at least one sample for the stochastic fragment in accordance with the configuration information for the stochastic fragment, wherein the at least one control circuit reconfigures each processing unit that is assigned more than one stochastic fragment using the configuration information for the respective stochastic fragments to switch between processing the respective stochastic fragments.

378. The apparatus of claim 377, wherein the number of stochastic fragments is larger than the number of processing units.

379. The apparatus of claim 377, wherein at least one stochastic fragment is assigned to each processing unit and a plurality of stochastic fragments is assigned to at least one of the processing units.

380. The apparatus of claim 377, wherein the respective processing unit for each stochastic fragment iteratively evaluates the stochastic fragment to generate a plurality of samples for the stochastic fragment.

381. The apparatus of claim 377, wherein the samples generated for the stochastic fragments are used to solve the stochastic problem.

382. The apparatus of claim 377, wherein the at least one control circuit assigns each stochastic fragment to the respective processing unit by allocating a thread of execution on the respective processing unit for the processing unit and by providing the configuration information on a stack for the thread.

383. The apparatus of one of claims 377 to 382, wherein the number of stochastic fragments is greater than 100.

384. The apparatus of claim 383, wherein the number of stochastic fragments is greater than 1000.

385. The apparatus of claim 384, wherein the number of stochastic fragments is greater than 10000.

386. The apparatus of claim 385, wherein the number of stochastic fragments is greater than one million.

387. The apparatus of claim 377, wherein the number of processing units is at least 16.

388. The apparatus of claim 387, wherein the number of processing units is at least 64.

389. The apparatus of claim 388, wherein the number of processing units is greater than 100.

390. The apparatus of claim 389, wherein the number of processing units is greater than ten thousand.

391. The apparatus of claim 390, wherein the number of processing units is greater than one million.

392. The apparatus of claim 377, wherein the plurality of processing units are implemented within a single packaged circuit device.

393. The apparatus of claim 377, wherein the plurality of processing units are implemented within a single integrated circuit device.

394. The apparatus of claim 377, wherein each processing unit is a core of a multi-core processor device.

395. The apparatus of claim 377, wherein the at least one control circuit assigns more than 10 stochastic fragments to at least one of the processing units.

396. The apparatus of claim 377, wherein the at least one control circuit assigns more than half of the processing units to more than one stochastic fragment.

397. The apparatus of claim 377, wherein the at least one control circuit assigns more than half of the processing units to more than ten stochastic fragments.

398. The apparatus of claim 377, wherein each processing unit performs integer operations to generated the samples.

399. The apparatus of claim 377, wherein each processing unit performs fixed point operations to generated the samples.

400. The apparatus of claim 377, wherein each of the processing units is a fixed point processing unit.

401. The apparatus of claim 377, wherein the processing units do not include any floating point hardware.

402. The apparatus of claim 377, wherein each of the processing units is 16-bits or less.

403. The apparatus of claim 377, wherein the at least one control circuit comprises a processor that has a higher bit count than each of the processing units used to process the stochastic fragments.

404. The apparatus of claim 403, wherein the processor is a 64-bit or greater processor.

405. The apparatus of one of claims 403 to 404, wherein the processor includes floating point hardware.

* * * * *